(12) United States Patent
Nagai et al.

(10) Patent No.: US 7,031,003 B2
(45) Date of Patent: Apr. 18, 2006

(54) IMAGE PROCESSING APPARATUS, CONTROL METHOD OF IMAGE PROCESSING APPARATUS, AND STORAGE MEDIUM

(75) Inventors: Yuka Nagai, Tokyo (JP); Shinichi Kanematsu, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 934 days.

(21) Appl. No.: 09/742,414

(22) Filed: Dec. 22, 2000

(65) Prior Publication Data
US 2001/0013954 A1 Aug. 16, 2001

(30) Foreign Application Priority Data
Dec. 27, 1999 (JP) .................................. 11-371528
Mar. 7, 2000 (JP) .............................. 2000-061326

(51) Int. Cl.
*G06F 15/00* (2006.01)
(52) U.S. Cl. ................... 358/1.13; 358/1.12; 358/1.16; 358/437; 358/444; 399/81; 399/82
(58) Field of Classification Search ................ 358/444, 358/1.13, 1.16, 1.14, 437; 399/81, 87, 82
See application file for complete search history.

(56) References Cited

U.S. PATENT DOCUMENTS 5,500,717 A * 3/1996 Altrieth, III .................. 399/83
5,669,040 A * 9/1997 Hisatake ....................... 399/83
5,740,496 A * 4/1998 Kawabuchi et al. .......... 399/83
5,907,410 A * 5/1999 Ohtake ........................ 358/468
6,249,658 B1* 6/2001 Inui et al. ...................... 399/82
6,567,180 B1* 5/2003 Kageyama et al. ......... 358/1.15
2001/0035973 A1* 11/2001 Kusumoto ................. 358/1.14
2002/0075510 A1* 6/2002 Martinez ................... 358/1.15
2004/0190036 A1* 9/2004 Shibao ....................... 358/1.13

FOREIGN PATENT DOCUMENTS

| JP | 7-303163 | 11/1995 |
| JP | 8-6745 | 1/1996 |
| JP | 10-233862 | 9/1998 |
| JP | 11-3004 | 1/1999 |

* cited by examiner

*Primary Examiner*—Edward Coles
*Assistant Examiner*—Mark R. Milia
(74) *Attorney, Agent, or Firm*—Fitzpatrick, Cella, Harper & Scinto

(57) ABSTRACT

This invention has as its object to provide an image processing environment which allows the user to stop only a specific job by means of a simple operation, and has high operation efficiency and operability. When the user instructs to stop a job by depressing a stop key on a console during job execution, a job manager (Job Manager) implemented by a CPU pauses all jobs which are being executed, displays a list of all the paused jobs on the console using their job IDs, prompts the user to select any of the jobs displayed in the list, and stops only the selected job.

11 Claims, 60 Drawing Sheets

| Zoom | | | | |
|---|---|---|---|---|
| 78%LGL▶LTR | 100 % | 800%MAX | | Zoom Program |
| 73%11×17▶LGL 11×15▶LTR | − + | 400% | | XYZoom |
| 64%11×17▶LTR | | 200% | | Multiple Enlarge |
| 50% | ☐ Auto | 129%LTR▶11×17 | | |
| 25%MIN | ☐ Entire Image | 121%LGL▶11×17 | | |

Cancel  OK

Paper Select

- [1] LTR
- [2] LGR
- [3] LGL
- [4] LTR
- [5] STMT
- [6] LGL

Stack Bypass
Stack Bypass Size

☐ Auto Paperselect

Cancel  OK

FIG. 29

[Search dialog showing a dropdown 3261 with options: Common Name, Common Name, Address, Country, Owner, Location, Model]

FIG. 30

[Search dialog showing a dropdown 3262 with options: Contains, is, isn't, Contains, doesn't contai]

FIG. 70

JOB MANAGEMENT TABLE

| | | |
|---|---|---|
| Print Job 001 | | |
| Copy Job 002 | | |
| | JOB ID | Copy Job 003 | ~211 |
| | JOB NAME | (none) | ~212 |
| | JOB TYPE | Copy | ~213 |
| Copy Job 003 | OWNER USER ID | U34107 | ~214 |
| | USER NAME | kanematsu | ~215 |
| Print Job 005 | JOB STATE | executing | ~216 |
| | JOB ACCEPT TIME | 98/12/10,15:30:03 | ~217 |
| | JOB EXECUTION TIME | 00/00/00,00:01:24 | ~218 |
| | JOB PRIORITY | 100 | ~219 |
| | PRINTOUT COUNT | 65 | ~220 |
| | ERROR INFORMATION | (none) | ~221 |

| | |
|---|---|
| SELECT JOB TO BE STOPPED | ~301 |
| PRINT JOB 001 | ~302 |
| COPY JOB 002 | ~303 |
| COPY JOB 003 | ~304 |
| PRINT JOB 005 | ~305 |
| OK | ~306 |

FIG. 73

COPY JOB 003 IS STOPPED

FIG. 76

STORAGE MEDIUM SUCH AS FD/CD-ROM, ETC.

| DIRECTORY INFORMATION |
|---|
| FIRST DATA PROCESSING PROGRAM PROGRAM CODE GROUP CORRESPONDING TO STEPS OF FLOW CHART SHOWN IN FIG.71 |
| SECOND DATA PROCESSING PROGRAM PROGRAM CODE GROUP CORRESPONDING TO STEPS OF FLOW CHART SHOWN IN FIG.74 |
| THIRD DATA PROCESSING PROGRAM PROGRAM CODE GROUP CORRESPONDING TO STEPS OF FLOW CHART SHOWN IN FIG.75 |
| FOURTH DATA PROCESSING PROGRAM PROGRAM CODE GROUP CORRESPONDING TO STEPS OF FLOW CHART SHOWN IN FIG.77 |
| FIFTH DATA PROCESSING PROGRAM PROGRAM CODE GROUP CORRESPONDING TO STEPS OF FLOW CHART SHOWN IN FIG.78 |
| SIXTH DATA PROCESSING PROGRAM PROGRAM CODE GROUP CORRESPONDING TO STEPS OF FLOW CHART SHOWN IN FIG.79 |
| SEVENTH DATA PROCESSING PROGRAM PROGRAM CODE GROUP CORRESPONDING TO STEPS OF FLOW CHART SHOWN IN FIG.80 |
| |

MEMORY MAP OF STORAGE MEDIUM

3841 — CANCEL

SCAN JOB

| TYPE | STATE |
|---|---|
| Local Copy | SCAN IN PROGRESS |

PRINT JOB

| TYPE | STATE | DETAILS | NUMBER OF COPIES |
|---|---|---|---|
| Local Copy | PRINT IN PROGRESS | | 5 |
| FAX | STANDBY | ABCDEFG | 1 |
| Remote Copy | PRINT STANDBY | | 10 |
| PDL Print | PRINT STANDBY | document.doc | 2 |

COMMUNICATION

| TYPE | STATE | DETAILS | NUMBER OF COPIES |
|---|---|---|---|
| FAX | SEND IN PROGRESS | 03-0000-1111 | 1 |
| E-mail | SEND IN PROGRESS | Subject:abcdefg | |

# IMAGE PROCESSING APPARATUS, CONTROL METHOD OF IMAGE PROCESSING APPARATUS, AND STORAGE MEDIUM

FIELD OF THE INVENTION

The present invention relates to an image processing apparatus which can receive a plurality of jobs and can parallelly execute them, a control method of the image processing apparatus, and a storage medium.

BACKGROUND OF THE INVENTION

A conventional image processing apparatus such as a copying machine or the like comprises control means which stops or aborts the operation of the apparatus in response to a user's instruction before a copying operation that has started comes to an end.

With this means, even when the image processing apparatus makes operation that the user did not intend due to setting errors of a copying mode or the like, the user can stop the apparatus.

In recent years, various image processing apparatuses have not only a single function, but have a plurality of functions such as a scanner, printer, copying machine, FAX, and the like, and can simultaneously execute the respective functions.

Furthermore, such apparatus not only can simultaneously execute different functions, but can accept a plurality of print operation instructions (jobs), and can sequentially execute the received operation instructions (jobs).

However, in such image processing apparatus that can parallelly execute a plurality of jobs, even when the user wants to stop only a specific job he or she input to the apparatus, since the conventional apparatus comprises only a stop instruction means for the entire apparatus, all jobs of the apparatus are stopped together with the job the user wants to stop. This results in poor use efficiency of the apparatus and poor operability for the user.

Even when the user can select a job to be stopped from all jobs, the process of the job to be stopped progresses while the user is selecting the job to be stopped, and unwanted printouts are formed.

Furthermore, in an arrangement that makes the user select a job to be stopped every time a job is to be stopped, even when execution of only one job is in progress, the user must select that job, resulting in cumbersome operations.

SUMMARY OF THE INVENTION

The present invention has been made to solve the aforementioned problems, and has as its object to provide an image input/output apparatus and its control method, which can facilitate operation for deleting a job which is being executed or queued in a job list, and have high operability. The first aspect of the present invention includes an image processing apparatus including a setting unit that sets one of a plurality of modes according to a user's designation. The modes include a first mode that stops an active job without displaying a list of active jobs in accordance with a designation input to stop an operation in progress, and a second mode that displays a list of active jobs and stops a job selected by the user from the list in accordance with a designation input to stop an operation in progress.

The apparatus also includes a determination unit that determines a mode set by the setting unit in accordance with a designation input to stop an operation in progress; and a control unit that causes active-job stop processing or list display processing based on a determination by said determination unit.

Another aspect of the present invention includes an image processing apparatus including an input unit that inputs a designation to stop an operation in progress; a second display unit that displays a list of jobs existing in the image processing apparatus in a case where a scanning operation is not in progress at the time of a designation input by the input unit; and a stop unit that stops a scanning operation without displaying a list of jobs by the second display unit in a case where the scanning operation is in progress at the time of a designation input by the input unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 19 shows an enlargement/reduction setting sub-window displayed on the LCD display of the console shown in FIG. 3;

FIG. 20 shows a paper select sub-window displayed on the LCD display of the console shown in FIG. 3;

FIG. 29 shows a search attribute list displayed on the LCD display of the console shown in FIG. 3;

FIG. 30 shows a search condition list displayed on the LCD display of the console shown in FIG. 3;

FIG. 70 shows the format of job management data managed by a job manager;

FIG. 72 shows an example of a stop job select window displayed on the LCD display of the console shown in FIG. 3;

FIG. 73 shows an example of a message window of a job stop message displayed on the LCD display of the console shown in FIG. 3;

FIG. 76 is a view for explaining a memory map of a storage medium that stores various data processing programs which can be read out by the image processing apparatus according to the present invention;

FIG. 81 shows an example of a job list.

DETAILED DESCRIPTION OF THE PREFERRED EMBODIMENTS

[First Embodiment]

An image processing apparatus according to the present invention and its operation will be described in detail hereinafter.

[Hardware]

[Overall Arrangement]

<Controller Unit>

Figure 1:
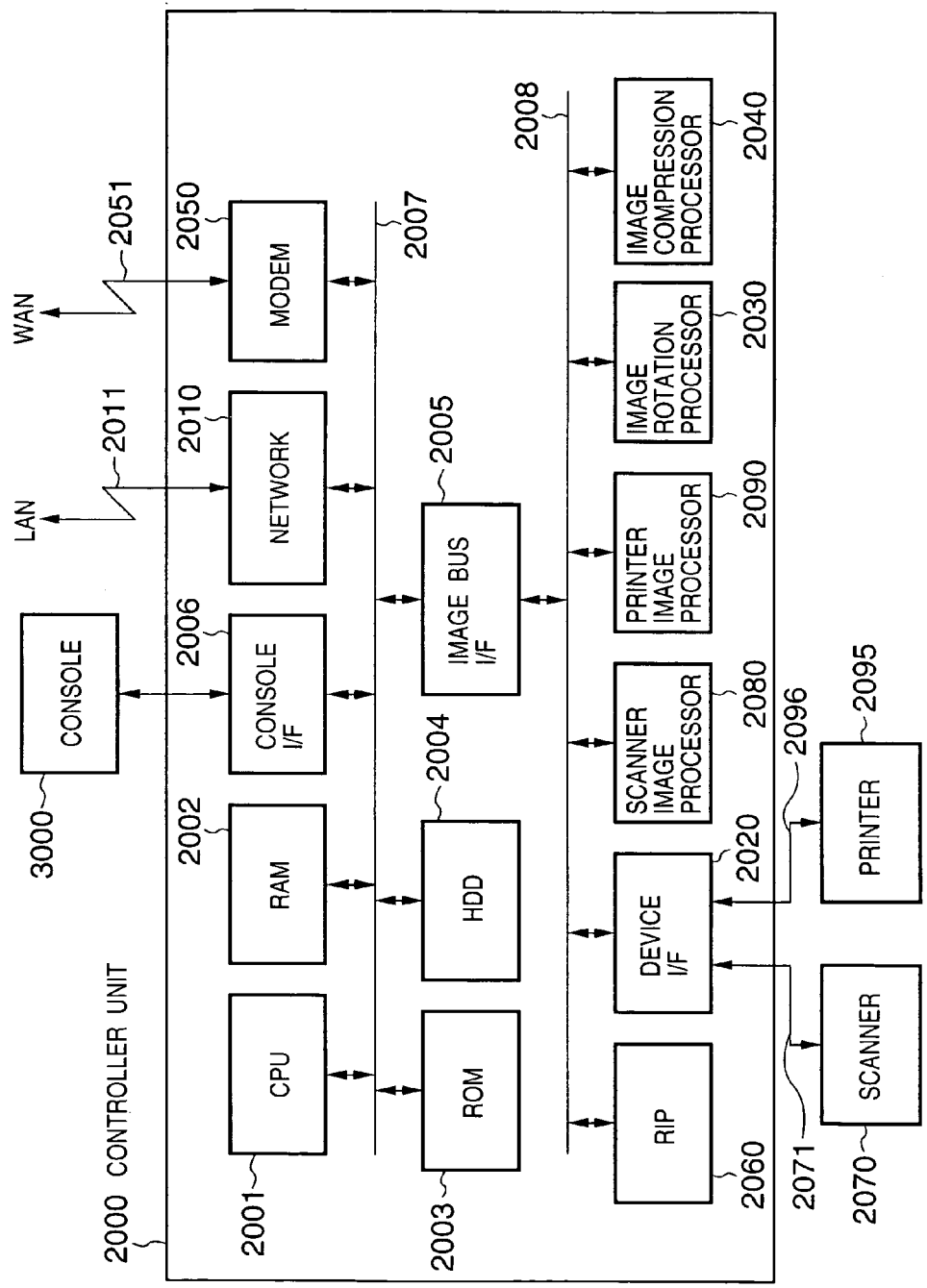
FIG. 1 is a block diagram for explaining the arrangement of a controller unit to which an image processing apparatus according to the first embodiment of the present invention can be applied.

FIG. 1 is a block diagram for explaining the arrangement of a controller unit to which an image processing apparatus according to the first embodiment of the present invention can be applied.

Referring to FIG. 1, reference numeral 2000 denotes a controller unit which is connected to a scanner 2070 as an image input device and a printer 2095 as an image output device, and is also connected to a LAN 2011 and public line (WAN) 2051 to exchange image information and device information.

Reference numeral 2001 denotes a CPU for controlling the entire system on the basis of programs stored in a ROM 2003 or another storage medium (not shown). Reference numeral 2002 denotes a RAM which serves as a system work memory used upon operating the CPU 2001, and also serves as an image memory for temporarily storing image data. The ROM 2003 is a boot ROM which stores a boot program of the system.

Reference numeral 2004 denotes an HDD (hard disk drive) which stores system software, image data, and the like. Reference numeral 2006 denotes a console I/F which interfaces with a console (UI) 3000, and outputs image data to be displayed on the console 3000 to it. Also, the I/F 2006 sends information input by the user of this system at the console 3000 to the CPU 2001.

Reference numeral 2010 denotes a network controller (Network) which is connected to the LAN 2011 to exchange information.

Reference numeral 2050 denotes a modem (Modem) which is connected to the public line 2051 to exchange information. These devices are connected to a system bus 2007.

Reference numeral 2005 denotes an image bus interface (Image Bus I/F) which is a bus bridge for connecting the system bus 2007 and an image bus 2008 which transfers image data at high speed to convert the data structure. The image bus 2008 comprises a PCI bus or IEEE1394.

The following devices are connected to the image bus 2008.

Reference numeral 2060 denotes a raster image processor (RIP) which rasterizes a code (PDL code) described in a page description language to a bitmap image. Reference numeral 2020 denotes a device I/F which connects the scanner 2070 as the image input device and the printer 2095 as the image output device to the controller unit 2000 to convert image data between synchronous and asynchronous systems.

Reference numeral 2080 denotes a scanner image processor for correcting, modifying, and editing input image data. Reference numeral 2090 denotes a printer image processor which performs printer correction, resolution conversion, and the like of print output image data. Reference numeral 2030 denotes an image rotation processor for rotating image data. Reference numeral 2040 denotes an image compression processor which compresses/expands multi-valued image data by JPEG and binary image data by JBIG, MMR, or MH.

<Image Input/output Units (Scanner, Printer)>

Figure 2:
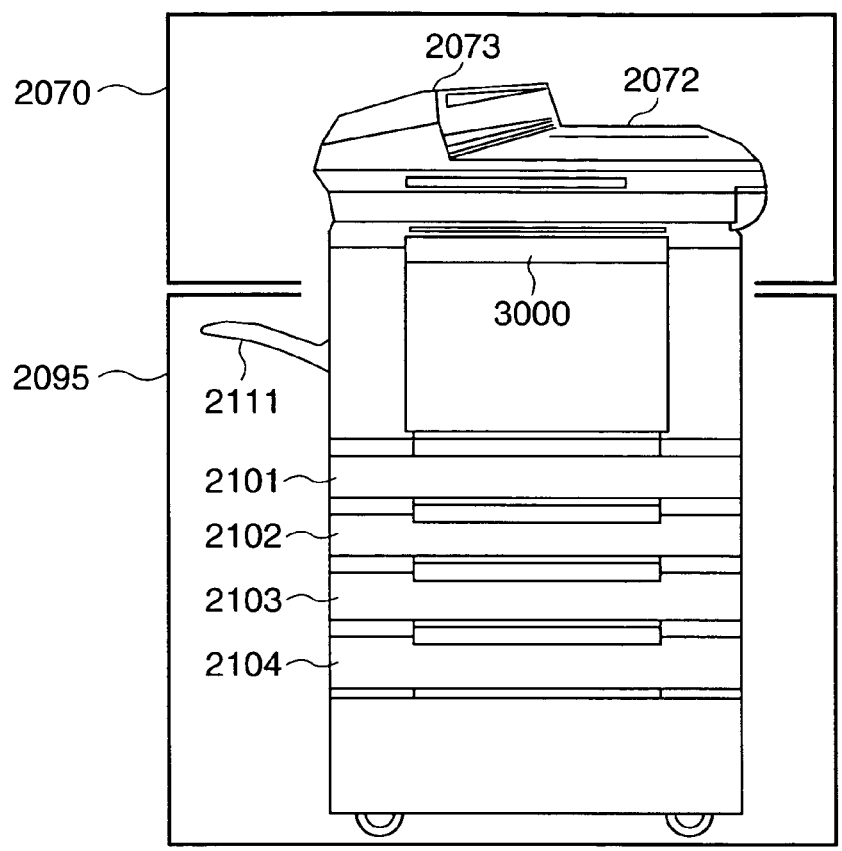
FIG. 2 is a view showing image input/output devices (a scanner and printer shown in FIG. 1) to which an image processing apparatus of the present invention can be applied.

FIG. 2 shows image input/output devices (the scanner 2070 and printer 2095 shown in FIG. 1) to which the image processing apparatus of the present invention can be applied.

The scanner 2070 as the image input device illuminates an image on paper as a document, and scans a CCD line sensor to convert that image into an electrical signal as raster image data.

Reference numeral 2072 denotes a document feeding device (document feeder) which feeds document sheets set on a tray 2073 one by one to scan a document image.

The scan operation of a document image will be explained below.

When the device user sets document sheets on the tray 2073 of the document feeder 2072 and inputs a scan start instruction at the console 3000 shown in FIG. 1, the CPU 201 supplies an instruction (2071 shown in FIG. 1) to the scanner 2070 and the feeder 2072 feeds document sheets one by one to scan a document image.

The printer 2095 as the image output device converts raster image data 2096 into an image on a paper sheet, and can use as its conversion method any of an electrophotography method using a photosensitive drum or photosensitive belt, an ink-jet method for ejecting ink from a small nozzle array to directly print an image on a paper sheet, a sublimation method, a thermal transfer method, and the like.

Reference numerals 2101 to 2104 denote paper cassettes which store paper sheets having different paper sizes or directions, and the like. The printer 2095 has a plurality of paper feed stages to be able to select different paper sizes or directions, and is set with the corresponding paper cassettes 2101 to 2104. Reference numeral 2111 denotes an exhaust tray for receiving paper sheets that have undergone a print process.

The print operation will be explained below.

The print operation starts in response to an instruction (2096 shown in FIG. 1) from the CPU 2001 shown in FIG. 1, prints on a paper sheet fed from one of the paper cassettes 2101 to 2104, and exhausts the paper sheet onto the exhaust tray 2111.

<Console>

Figure 3:
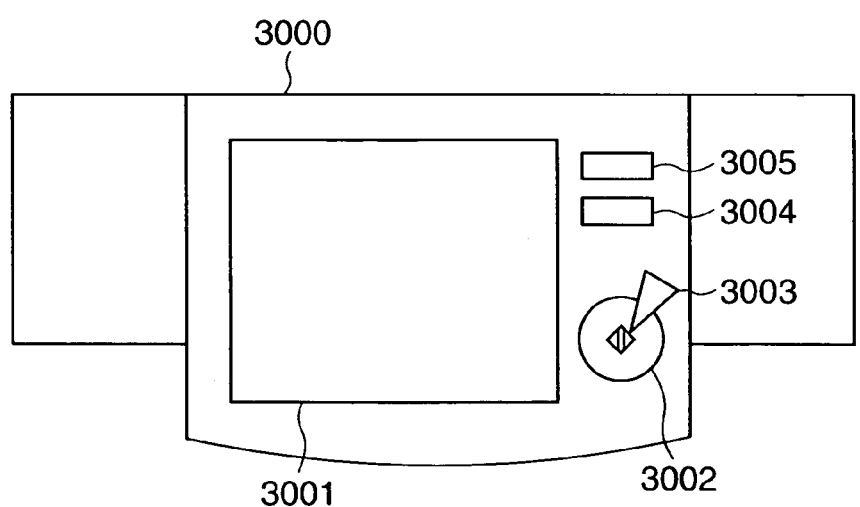
FIG. 3 is a plan view showing the arrangement of a console shown in FIG. 1.

FIG. 3 is a plan view for explaining the arrangement of the console 3000 shown in FIG. 1.

Referring to FIG. 3, reference numeral 3001 denotes an LCD display, which is prepared by adhering a touch panel sheet on an LCD, displays operation windows of the system, and sends position information of a given displayed key when it is pressed.

Reference numeral 3002 denotes a start key which is used to start, e.g., the scan operation of a document image. Two color LEDs, i.e., green and red LEDs are provided to the central portion of the start key 3002, and indicate depending on the color if the start key 3002 is ready to be used.

Reference numeral 3003 denotes a stop key which is used to stop the operation which is in progress. Reference numeral 3004 denotes an ID key used to input the user ID of the user. Reference numeral 3005 denotes a reset key which is used to reset settings from the console 3000.

<Scanner Image Processor>

Figure 4:
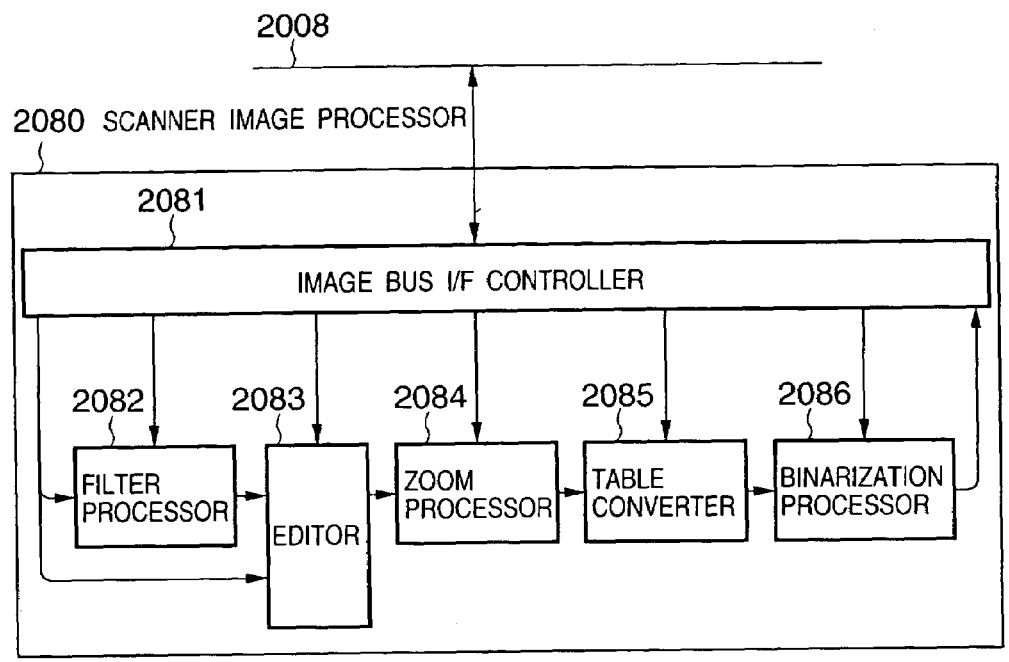
FIG. 4 is a block diagram for explaining the arrangement of a scanner image processor shown in FIG. 1.

FIG. 4 is a block diagram for explaining the arrangement of the scanner image processor 2080 shown in FIG. 1, and the same reference numerals in FIG. 4 denotes the same parts as in FIG. 1.

Referring to FIG. 4, reference numeral 2081 denotes an image bus I/F controller, which is connected to the image bus 2008 to control its bus access sequence, and controls and generates timings of respective devices in the scanner image processor 2080.

Reference numeral 2082 denotes a filter processor which makes convolution operations using a spatial filter. Reference numeral 2083 denotes an editor which recognizes a closed region bounded by a marker pen from input image data, and performs image modification processes such as shading, hatching, negative-positive inversion, and the like of image data in that closed region.

Reference numeral 2084 denotes a zoom processor for enlarging/reducing by making interpolation operations in the main scan direction of a raster image when the resolution of the scanned image is to be changed. Zooming in the sub-scan direction is attained by changing the scan speed of a line sensor (not shown) for scanning an image.

Reference numeral 2085 denotes a table converter for converting image data as scanned luminance data into density data. Reference numeral 2086 denotes a binarization processor for binarizing multi-valued grayscale image data by error diffusion, a screen process, or the like. The image data that has undergone the binarization process of the binarization processor 2086 is transferred onto the image bus 2008 via the image bus controller 2081 again.

<Printer Image Processor>

Figure 5:
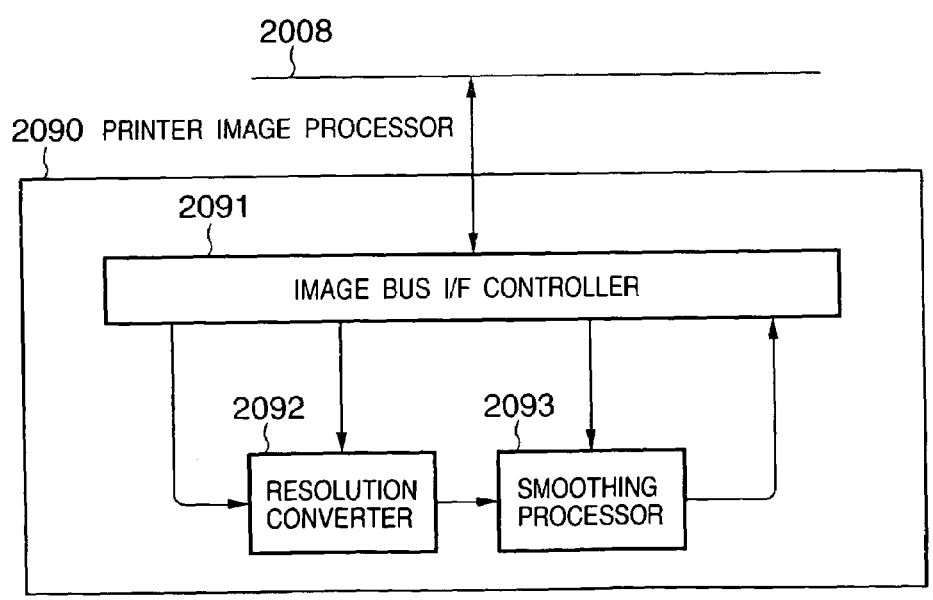
FIG. 5 is a block diagram for explaining the arrangement of a printer image processor shown in FIG. 1.

FIG. 5 is a block diagram for explaining the arrangement of the printer image processor 2090 shown in FIG. 1, and the same reference numerals in FIG. 5 denotes the same parts as in FIG. 1.

Referring to FIG. 5, reference numeral 2091 denotes an image bus I/F controller which is connected to the image bus 2008 to control its bus access sequence, and controls and generates timings of respective devices in the printer image processor 2091.

Reference numeral 2092 denotes a resolution converter which performs resolution conversion for converting image data coming from the Network 2011 or public line 2051 into the resolution of the printer 2095. Reference numeral 2093 denotes a smoothing processor which performs a process for smoothing jaggy (staircasing of an image that appears at a black and white boundary such as an oblique line) of image data after resolution conversion.

<Image Compression Section>

Figure 6:
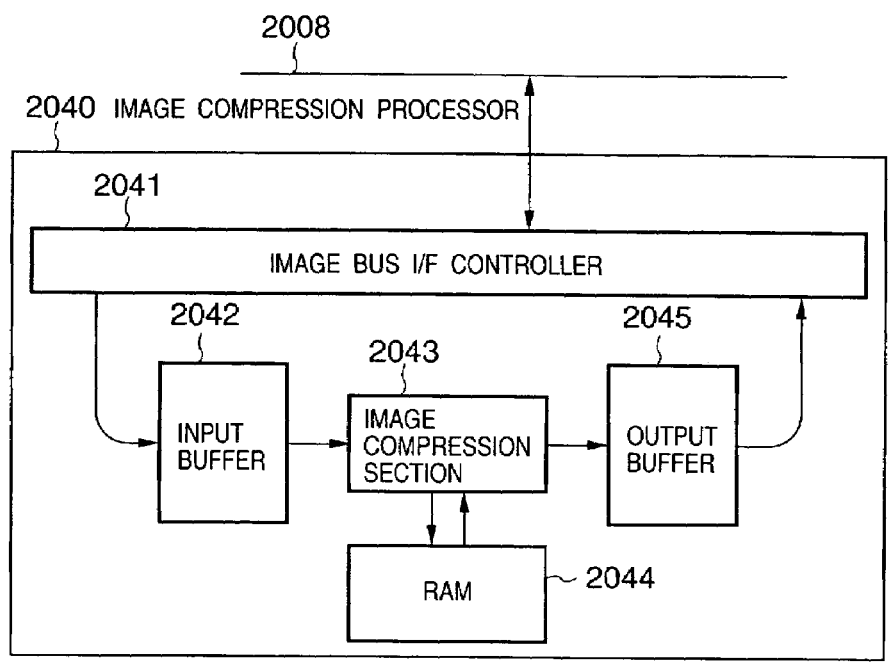
FIG. 6 is a block diagram for explaining the arrangement of an image compression processor shown in FIG. 1.

FIG. 6 is a block diagram for explaining the arrangement of the image compression processor 2040 shown in FIG. 1, and the same reference numerals in FIG. 6 denote the same parts as in FIG. 1.

Referring to FIG. 6, reference numeral 2041 denotes an image bus I/F controller which is connected to the image bus 2008 controls its bus access sequence, and makes timing control to exchange data with input and output buffers 2042 and 2045 and control such as mode setting and the like for an image compression section 2043.

The image compression process operation will be explained below.

The CPU 2001 makes setting for image compression control in the image bus I/F controller 2041 via the image bus 2008. With this setting, the image bus I/F controller 2041 makes settings (e.g., settings of MMR compression, JBIG expansion, and the like) required for image compression in the image compression section 2043. After the required settings, the CPU 2001 grants permission of image data transfer to the image bus I/F controller 2041.

With this permission, the image bus I/F controller 2041 starts image data transfer from the RAM 2002 or a device on the image bus 2008. The received image data is temporarily stored in the input buffer 2042, and is transferred at a given speed in response to an image data request from the image compression section 2043.

In this case, the input buffer 2042 checks whether or not image data can be transferred between the image bus I/F controller 2041 and image compression section 2043, and controls to inhibit data transfer if a read of image data from the image bus 2008 and a write of image data to the image compression section 2043 are disabled (such control will be referred to as handshake hereinafter).

The image compression section 2043 temporarily stores the received image data in a RAM 2044. This is because data for several lines are required to implement image compression depending on the image compression process to be executed, i.e., the first line of image data can be compressed only after image data for several lines have been prepared.

The image data that has undergone image compression is immediately sent to the output buffer 2045. The output buffer 2045 makes handshake between the image bus I/F controller 2041 and image compression section 2043, and transfers the image data to the image bus I/F controller 2041. The image bus I/F controller 2041 transfers the transferred compressed (or expanded) image data to the RAM 2002 or a device on the image bus 2008.

Such series of processes repeat themselves until the CPU 2001 ceases to issue a process request (upon completion of processes of a required number of pages) or until the image compression section issues a stop request (upon generation of errors in compression and expansion).

<Image Rotation Processor>

Figure 7:
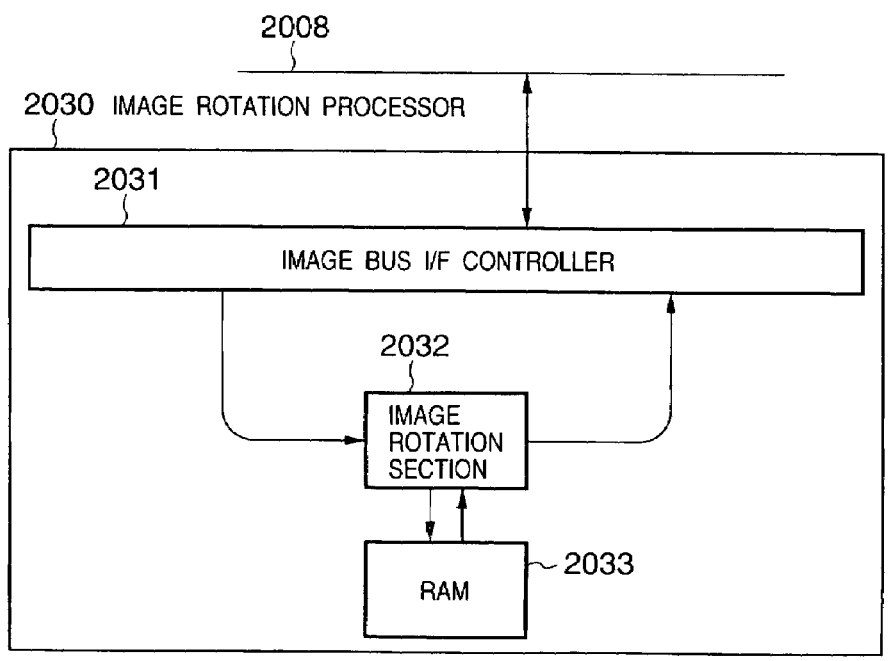
FIG. 7 is a block diagram for explaining the arrangement of an image rotation processor shown in FIG. 1.

FIG. 7 is a block diagram for explaining the arrangement of the image rotation processor 2030 shown in FIG. 1, and the same reference numerals in FIG. 7 denote the same parts as in FIG. 1.

Referring to FIG. 7, reference numeral 2031 denotes an image bus I/F controller which is connected to the image bus 2008 to control its bus sequence, and makes control for setting a mode and the like in an image rotation section 2032 and timing control to transfer image data to the image rotation section 2032.

The image rotation process operation will be explained below.

The CPU 2001 makes setting for image rotation control in the image bus I/F controller 2031 via the image bus 2008. With this setting, the image bus I/F controller 2031 makes setting required for image rotation (e.g., sets the image size, rotation direction, angle, and the like) in the image rotation section 2032. Upon completion of the required setting, the CPU 2001 grants permission of image data transfer to the image bus I/F controller 2031.

With this permission, the image bus I/F controller 2031 begins to transfer image data from the RAM 2002 or a device on the image bus 2008. Assume that the image data transfer size from the RAM 2002 or a device on the image bus 2008 by the image bus I/F controller 2031 is 32 bits, and the image size which is to undergo rotation is 32×32 (bits). Also, image transfer is done in units of 32 bits upon transferring image data onto the image bus 2008 (assume that a binary image is to be processed).

In order to obtain a 32×32 (bit) image, as described above, data transfer in units of 32 bits must be done 32 times, and image data must be transferred from discontinuous addresses (see FIG. 8 to be described later).

Figure 9:
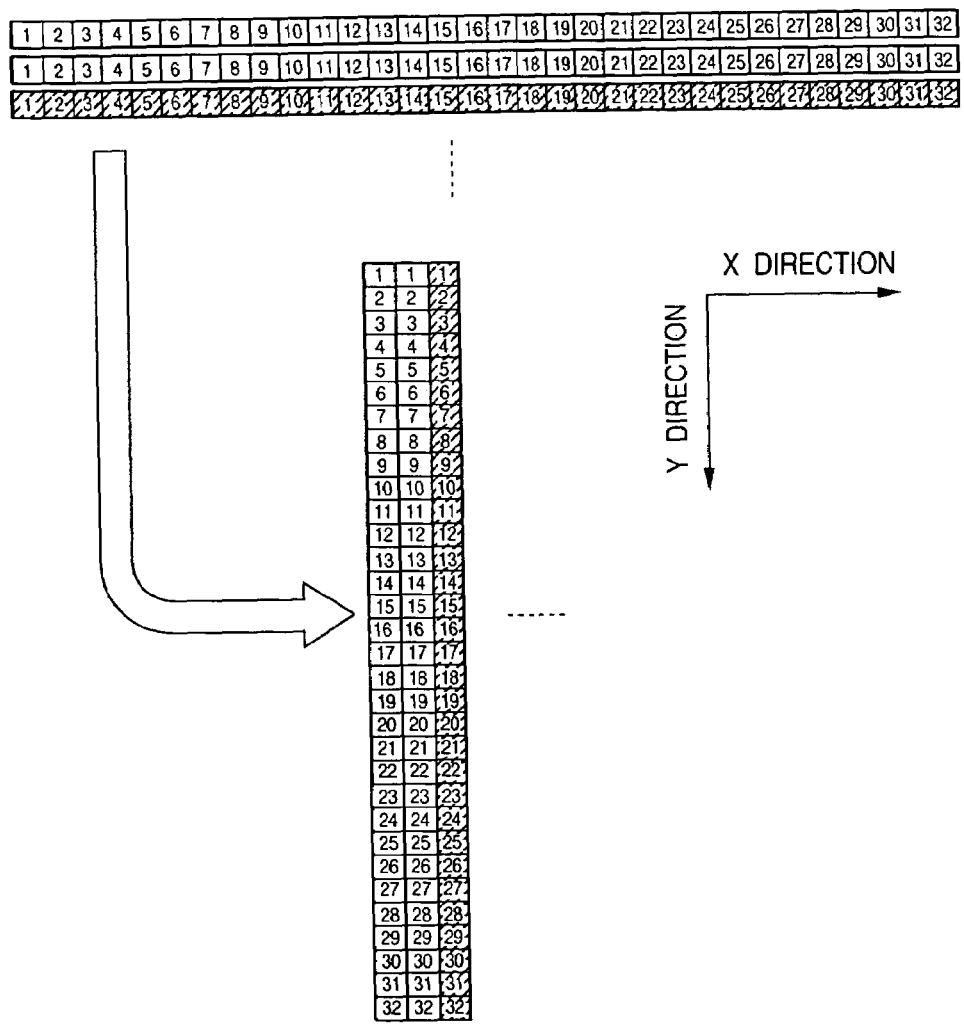
FIG. 9 is a view for explaining an image rotation process by an image rotation section shown in FIG. 7.

Image data transferred by discontinuous addressing is written in a RAM 2033 so as to rotate through a desired angle when it is read out. For example, in case of 90° counterclockwise rotation, initially transferred 32-bit image data is written in the Y-direction, as shown in FIG. 9 (to be described later). The written image data is read out in the X-direction to rotate the image.

Upon completion of 32×32 (bit) image rotation (write to the RAM 2033), the image rotation section 2032 reads out image data from the RAM 2033 by the aforementioned read method, and transfers that image to the image bus I/F controller 2031.

Upon receiving the image data which has rotated, the image bus I/F controller 2031 transfers data to the RAM 2002 or a device on the image bus 2009 by continuous addressing.

Such series of processes repeat themselves until the CPU 2001 ceases to issue a process request (upon completion of processes of a required number of pages).

Figure 8:
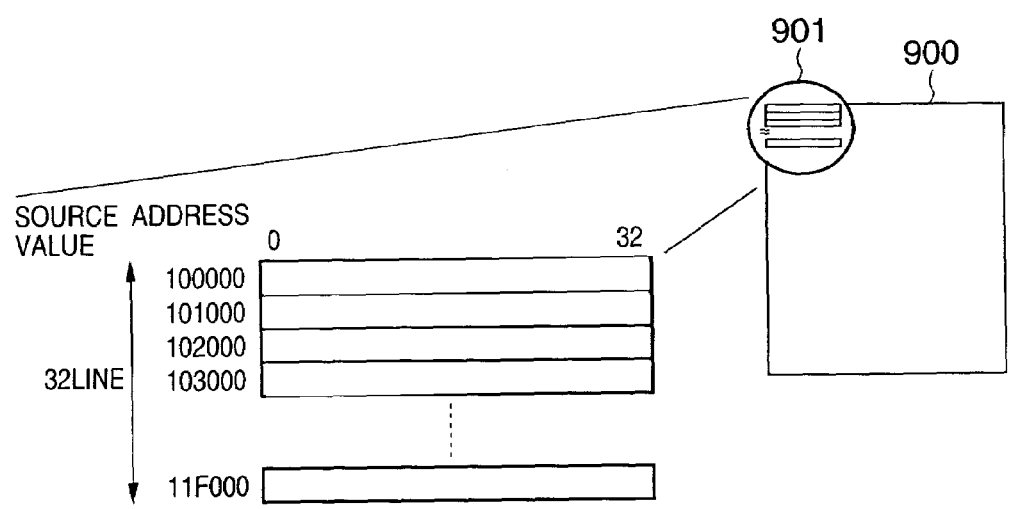
FIG. 8 is a view for explaining image data transfer from discontinuous addresses by an image bus I/F controller shown in FIG. 7.

FIG. 8 is a view for explaining image data transfer from discontinuous addresses by the image bus I/F controller 2031 shown in FIG. 7.

Referring to FIG. 8, reference numeral 900 denotes a source memory; and 901, 32×32 (bit) image data in the memory 900.

As shown in FIG. 8, in order to obtain a 32×32 (bit) image, data transfer in units of 32 bits repeats 32 times from discontinuous addresses like 32 bits (32 bits in the X-direction) from a source address value "100000h (h for hexadecimal notation)", 32 bits from a source address value "101000h", 32 bits from a source address value "102000h", 32 bits from a source address value "103000h, . . . , 32 bits from a source address value "11F000h".

FIG. 9 is a view for explaining the image rotation process by the image rotation section 2032 shown in FIG. 7.

As shown in FIG. 9, image data transferred by discontinuous addressing is written in the RAM 2033 so as to rotate through a desired angle when it is read out. For example, in case of 90° counterclockwise rotation, initially transferred 32-bit image data is written in the Y-direction. The next transferred 32-bit image data is written in the Y-direction from an address "1" larger than the address from which the initially transferred image data is written, and this process is repeated. Upon completion of transfer of all image data, the written image data is read out in the X-direction, thus rotating an image.

<Device I/F>

Figure 10:
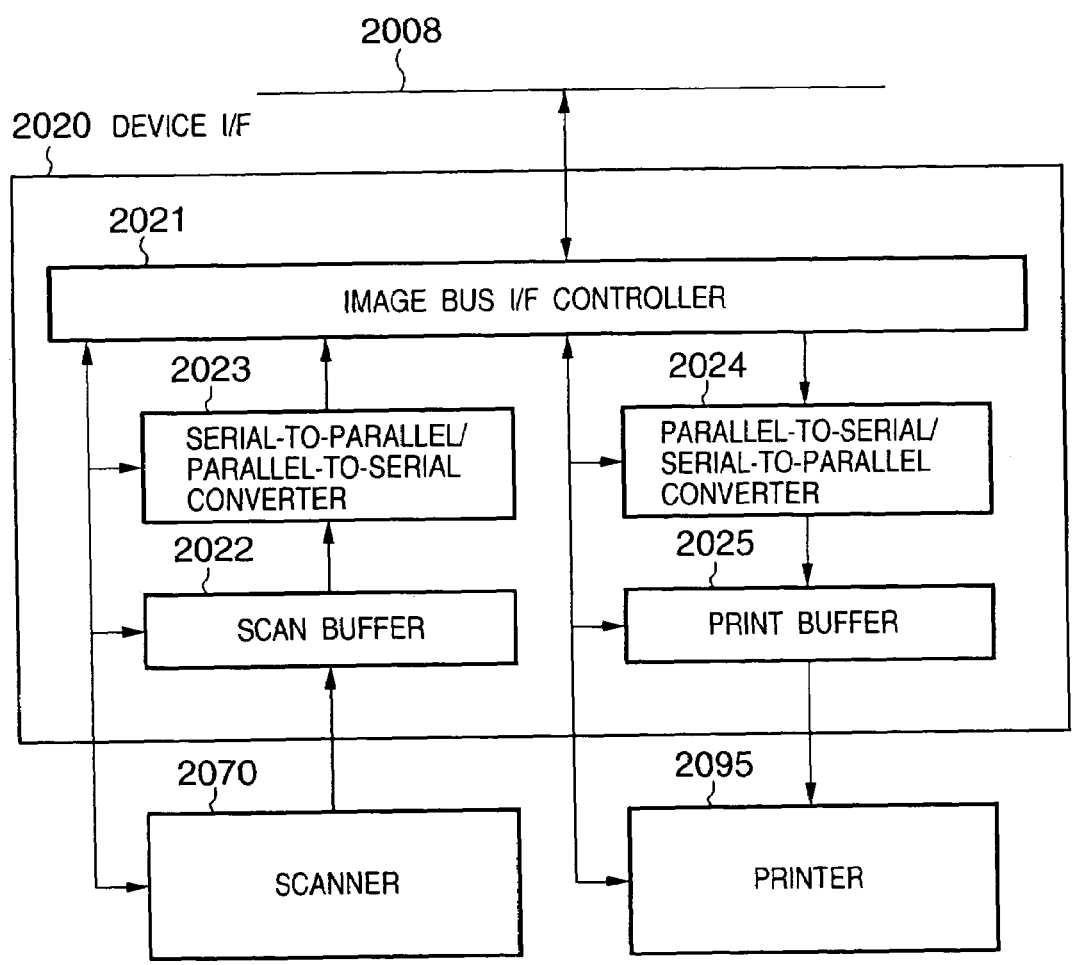
FIG. 10 is a block diagram for explaining the arrangement of a device I/F shown in FIG. 1.

FIG. 10 is a block diagram for explaining the arrangement of the device I/F 2020 shown in FIG. 1, and the same reference numerals in FIG. 10 denote the same parts as in FIG. 1.

Referring to FIG. 10, reference numeral 2021 denotes an image bus I/F controller which is connected to the image bus 2008 to control its bus access sequence, and controls and generates timings of devices in the device I/F 2020. Also, the controller 2021 generates control signals to the external scanner 2070 and printer 2095.

Reference numeral 2022 denotes a scan buffer which temporarily saves image data sent from the scanner 2070, and synchronously outputs image data onto the image bus 2008. Reference numeral 2023 denotes a serial-to-parallel/parallel-to-serial converter for converting image data saved in the scan buffer 2022 into the data width of image data that can be transferred onto the image bus 2008 by arranging the image data in a given order or breaking it up. Reference numeral 2024 denotes a parallel-to-serial/serial-to-parallel converter for converting image data transferred from the image bus 2008 into the data width of image data that can be saved in a print buffer 2025 by breaking up the image data or arranging it in a given order.

The print buffer 2025 temporarily saves image data sent from the image bus 2008, and synchronously outputs image data to the printer 2095.

The processing sequence upon image scan will be explained below.

Image data sent from the scanner 2070 is saved in the scan buffer 2022 in synchronism with a timing signal sent from the scanner 2070. If the image bus 2008 comprises a PCI bus, when 32 bits or more image data are stored in the buffer, the image data for 32 bits are sent from the buffer to the serial-to-parallel/parallel-to-serial converter 2023 by FIFO to be converted into 32-bit image data, and the converted image data is transferred onto the image bus 2008 via the image bus I/F controller 2021.

On the other hand, if the image bus 2008 comprises IEEE1394, image data in the buffer are sent from the buffer to the serial-to-parallel/parallel-to-serial converter 2023 by FIFO to be converted into serial image data, and the serial image data is transferred onto the image bus 2008 via the image bus I/F controller 2021.

The processing sequence upon image print will be explained below.

If the image bus 2008 comprises a PCI bus, 32-bit image data sent from the image bus 2008 is received by the image bus I/F controller 2021, is sent to the parallel-to-serial/serial-to-parallel converter 2024, is broken up into image data corresponding to the number of input data bits of the printer 2095, and is saved in the print buffer 2025.

If the image bus 2008 comprises IEEE1394, serial data sent from the image bus 2008 is received by the image bus I/F controller 2021, is sent to the parallel-to-serial/serial-to-parallel converter 2024, is converted into image data corresponding to the number of input data bits of the printer 2095, and is saved in the print buffer 2025.

Image data in the buffer is sent to the printer 2095 by FIFO in synchronism with a timing signal sent from the printer 2095.

[Software]

<Overall System>

Figure 11:
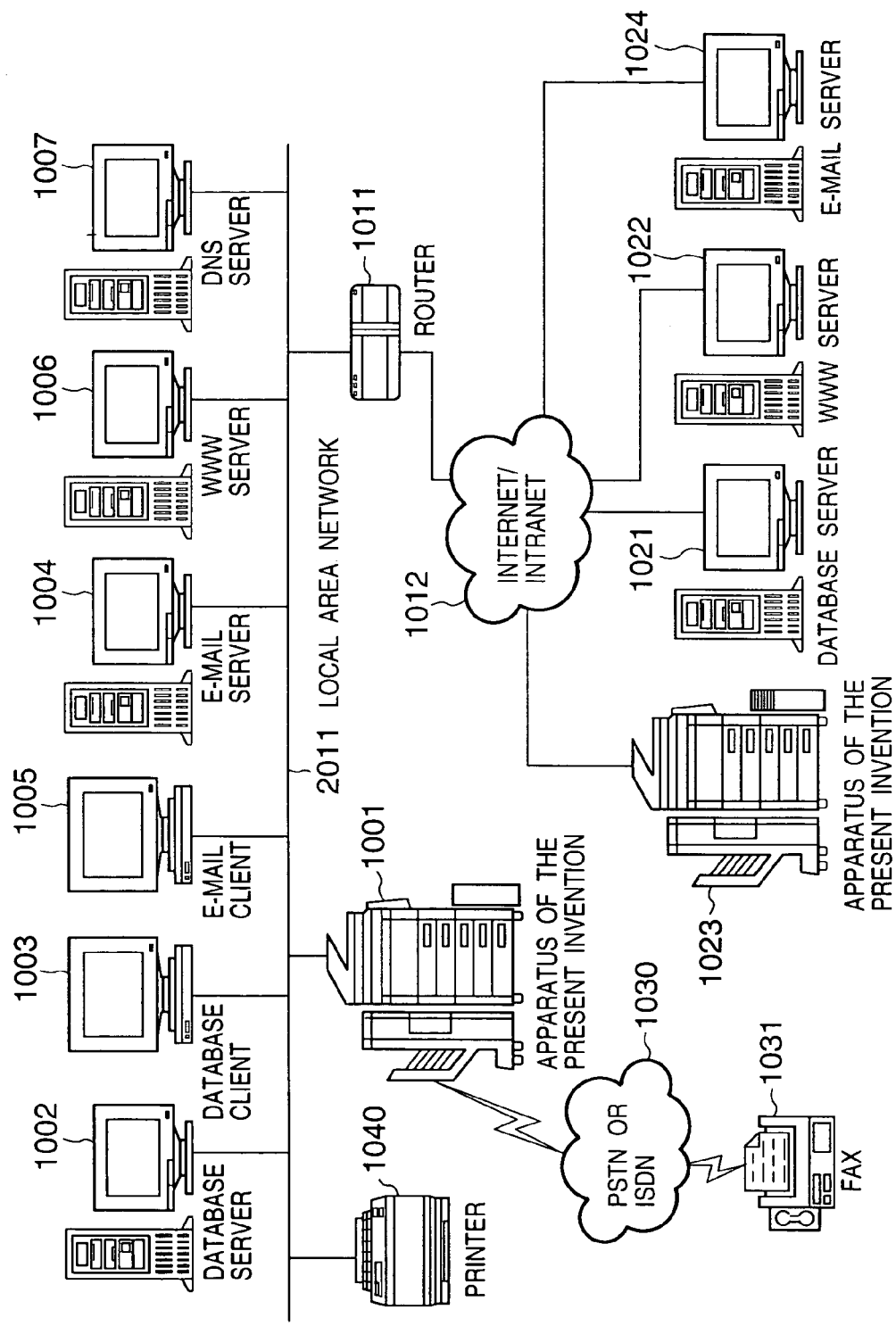
FIG. 11 is a diagram for explaining the arrangement of the overall network system to which the image processing apparatus of the present invention can be applied.

FIG. 11 is a diagram for explaining the arrangement of the entire network system to which the image processing apparatus of the present invention can be applied.

Reference numeral 1001 denotes an image input/output apparatus to which the image processing apparatus of the present invention can be applied, and comprises the scanner 2070 and printer 2095 shown in FIG. 1. The apparatus 1001 can output an image scanned by the scanner 2070 onto the local area network (to be abbreviated as LAN hereinafter) 2011, and can print out an image received from the LAN by the printer 2095.

Also, the apparatus 1001 can send an image scanned by the scanner 2070 onto PSTN or ISDN 1030 by a FAX transmission means (not shown), or can print out an image received from the PSTN or ISDN 1030 by the printer 2095.

Reference numeral 1002 denotes a database server which manages binary and multi-valued images scanned by the image input/output apparatus 1001 as a database. Reference numeral 1003 denotes a database client of the database server 1002, which can browse and search image data saved in the database server 1002. Reference numeral 1004 denotes an e-mail server which can receive an image scanned by the image input/output apparatus 1001 as an attachment to an e-mail. Reference numeral 1005 denotes an e-mail client which can receive and browse mails received by the e-mail server 1004 and can send e-mails.

Reference numeral 1006 denotes a WWW server which provides an HTML document to the LAN, and the image input/output apparatus 1001 can print out an HTML document provided by the WWW server. Reference numeral 1011 denotes a router which connects the LAN 2011 to an Internet/intranet 1012.

To the Internet/intranet 1012, apparatuses 1021, 1022, 1023, and 1024 which are respectively the same as the database server 1002, WWW server 1006, e-mail server 1004, and image input/output apparatus 1001 to which the image processing apparatus of the present invention can be applied, are connected.

On the other hand, the image input/output apparatus 1001 can communicate with a FAX apparatus 1031 via the PSTN or ISDN 1030.

A printer 1040 is also connected to the LAN 2011, and can print out an image scanned by the image input/output apparatus 1001.

<Overall Arrangement of Software Blocks>

Figure 12:
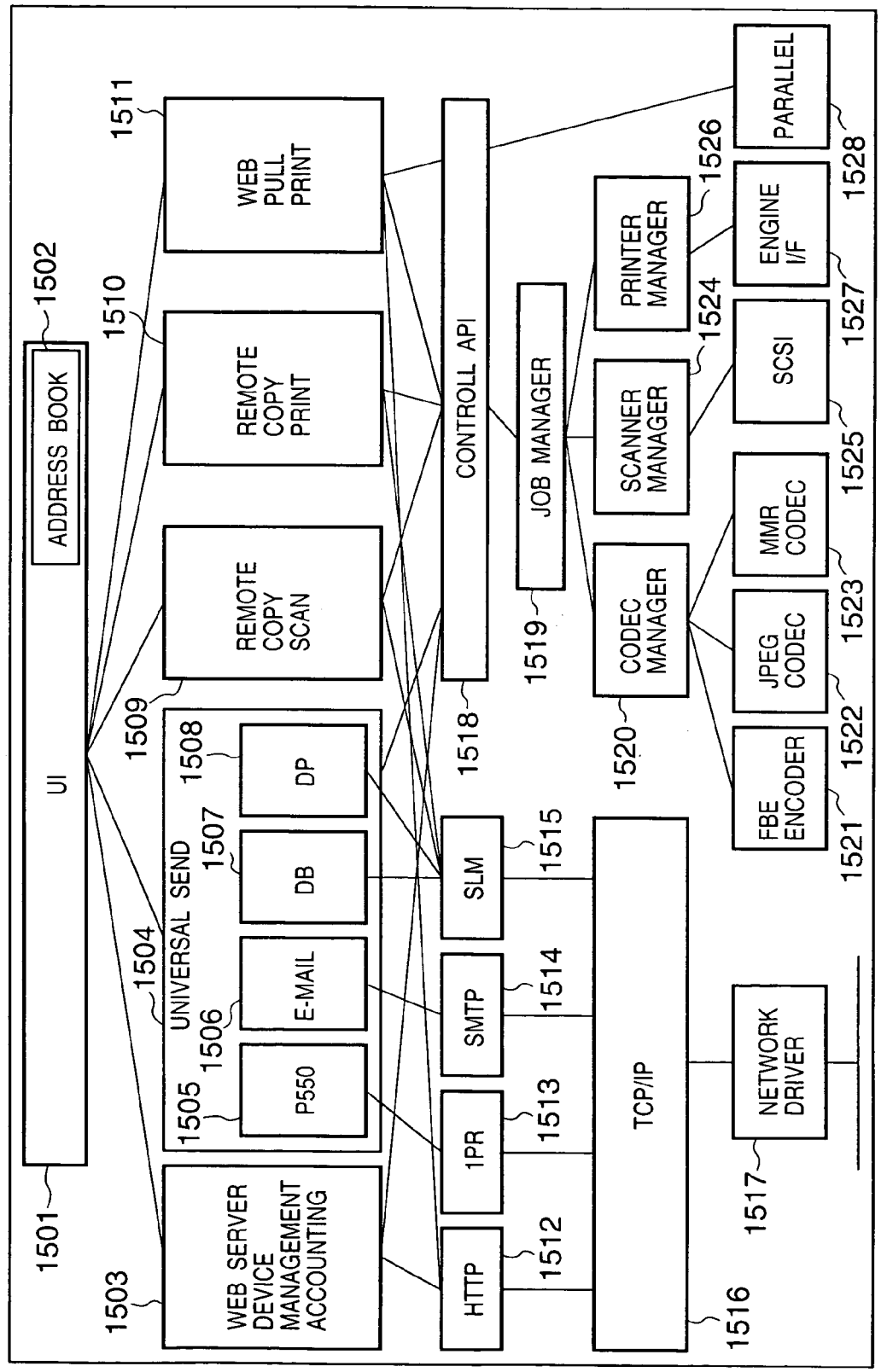
FIG. 12 is a software block diagram of a hybrid machine to which the image processing apparatus of the present invention can be applied.

FIG. 12 is a software block diagram of a hybrid machine to which the image processing apparatus of the present invention can be applied.

Referring to FIG. 12, reference numeral 1501 denotes a user interface module (UI), which provides a user interface, and mediates between the operator and devices when the operator makes various operations and settings of this hybrid machine. This module transfers input information to various modules (to be described below) in accordance with operator's operations to issue a process request, set data, and so forth.

Reference numeral 1502 denotes an address-book module (Address-Book), which is a database module that manages the sending addresses, communication destinations, and the like of data. The contents of this Address-Book 1502 undergo addition, deletion, and retrieval of data by operations from the UI 1501, and this module is used to supply sending address/communication destination information of data to respective modules (to be described later) in accordance with operator's operations.

Reference numeral 1503 denotes a web server module (Web-Server), which is used to inform a Web client (not shown) of management information of this hybrid machine in response to a request from that Web client. The management information is read via a Control-API 1518 (to be described later), and is sent to the Web client via an HTTP 1512, TCP/IP 1516, and Network-Driver 1517 (to be described later).

Reference numeral 1504 denotes a universal send module (Universal-Send), which controls data distribution, and distributes data designated by the operator via the UI 1501 to a communication (output) destination similarly designated by the operator. Also, when the operator designates generation of distribution data using the scanner function of this machine, the Universal-Send 1504 operates the machine via the Control-API 1518 (to be described later) to generate data.

Reference numeral 1505 denotes a printer module (P550), which is executed when a printer is designated as an output destination in the Universal-Send 1504.

Reference numeral 1506 denotes an e-mail module (E-Mail), which is executed when an e-mail address is designated as a communication destination in the Universal-Send 1504.

Reference numeral 1507 denotes a database module (DB), which is executed when a database is designated as an output destination in the Universal-Send 1504. Reference numeral 1508 denotes a DP, which is executed when a hybrid machine similar to the machine of the present invention is designated as an output destination in the Universal-Send 1504.

Reference numeral 1509 denotes a remote copy scan module (Remote-Copy-Scan), which uses the scanner function of this hybrid machine, and executes a process equivalent to the copy function implemented by this hybrid machine alone to have another hybrid machine connected via a network or the like as an output destination.

Reference numeral 1510 denotes a remote copy print module (Remote-Copy-Print) which uses the printer function of this hybrid machine, and executes a process equivalent to the copy function implemented by this hybrid machine alone to have another hybrid machine connected via a network or the like as an input source.

Reference numeral 1511 denotes a web pull print module (Web-Pull-Print), which reads out information of various home pages on the Internet or intranet, and prints the readout information.

Reference numeral 1512 denotes an HTTP module (HTTP), which is used when this hybrid machine communicates by HTTP, and provides a communication environment to the aforementioned Web-Server 1503 and Web-Pull-Print 1511 together with the TCP/IP 1516 (to be described later).

Reference numeral 1513 denotes an lpr module (lpr), which provides a communication environment to the printer module 1505 in the Universal-Send 1504 together with the TCP/IP 1516 (to be described later).

Reference numeral 1514 denotes an SMTP module (SMTP) which provides a communication environment to the E-Mail 1506 in the Universal-Send 1504 together with the TCP/IP 1516 (to be described later).

Reference numeral 1515 denotes a solution manager module (SLM: Salutation-Manager), which provides a communication environment to the DB 1507 and DP 1508 in the Universal-Send 1504, the Remote-Copy-Scan 1509, and the Remote-Copy-Print 1510 mentioned above together with the TCP/IP 1516 (to be described below).

Reference numeral 1516 denotes a TCP/IP communication module (TCP/IP), which provides a network communication environment to the aforementioned modules via the Network-Driver 1517 (to be described below).

Reference numeral 1517 denotes a network driver (Network-Driver), which controls portions physically connected to the network. Reference numeral 1518 denotes a control API (Control-API), which provides an interface with downstream modules such as a Job-Manager 1519 and the like (to be described later) to upstream modules such as the Universal-Send 1504 and the like, and improves versatility of respective modules by reducing dependency among the upstream and downstream modules.

Reference numeral 1519 denotes a job manager module (Job-Manager), which interprets processes instructed by the aforementioned modules via the Control-API 1518, and supplies instructions to modules to be described below. This module simultaneously manages hardware processes executed in this hybrid machine.

Reference numeral 1520 denotes a CODEC manager module (CODEC-Manager), which manages and controls various compression/expansion processes of data among processes instructed by the Job-Manager 1519.

Reference numeral 1521 denotes an FBE encoder module (FBE-Encoder), which compresses data scanned by a scan process that is implemented by the Job-Manager 1519 and a Scanner-Manager 1524 by the FBE format.

Reference numeral 1522 denotes a JPEG-CODEC module (JPEG-CODEC), which executes a JPEG compression process of scanned data and a JPEG expansion process of print data in the scan process that is implemented by the Job-Manager 1519 and Scanner-Manager 1524 and a print process implemented by a Printer-Manager 1526.

Reference numeral 1523 denotes an MMR-CODEC module (MMR-CODEC), which executes an MMR compression process of scanned data and an MMR expansion process of print data in the scan process that is implemented by the Job-Manager 1519 and Scanner-Manager 1524 and the print process implemented by the Printer-Manager 1526.

Reference numeral 1524 denotes a scan manager module (Scanner-Manager), which manages and controls the scan process instructed by the Job-Manager 1519.

Reference numeral 1525 denotes a SCSI driver (SCSI), which communicates with the Scanner-Manager 1524 and a scanner unit internally connected to this hybrid machine.

Reference numeral 1526 denotes a printer manager (Printer-Manager), which manages and controls the print process instructed by the Job-Manager 1519.

Reference numeral 1527 denotes an engine interface driver (Engine-I/F), which provides an I/F between the Printer-Manager 1526 and a print engine.

Reference numeral 1528 denotes a parallel port driver (Parallel), which provides an I/F used when the Web-Pull-Print 1511 outputs data to an output device (not shown) via a parallel port.

<Application>

An example of built-in applications of the image processing apparatus of the present invention will be explained below with reference to FIG. 13.

Figure 13:
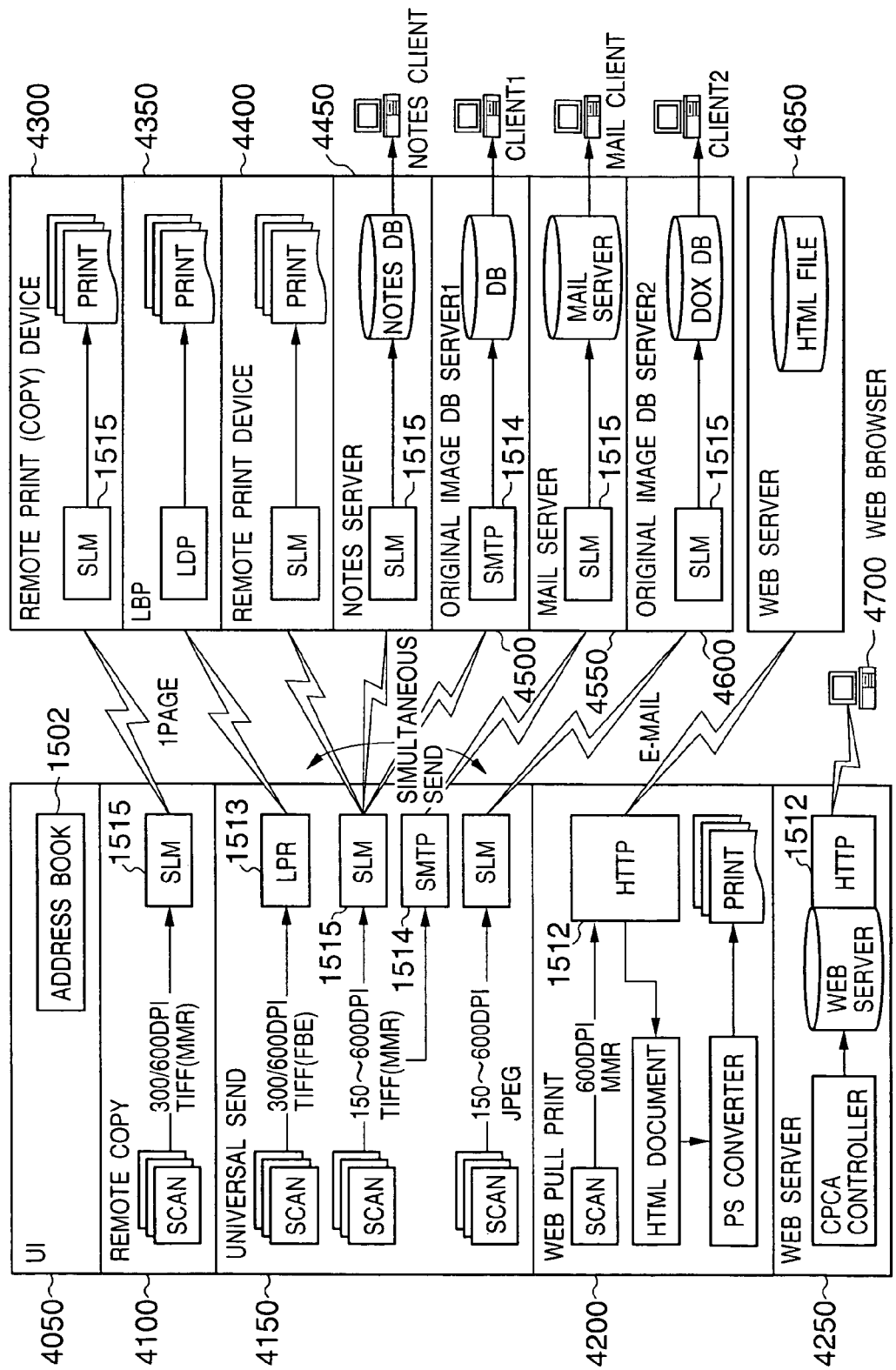
FIG. 13 is a block diagram showing built-in application blocks that pertain to distribution in the image processing apparatus of the present invention.

FIG. 13 is a block diagram showing built-in application blocks that pertain to distribution in the image processing apparatus of the present invention.

Referring to FIG. 13, reference numeral 4050 denotes a block which indicates a console application of the console 3000 shown in FIG. 3, and corresponds to the UI 1501 shown in FIG. 12. Reference numeral 4100 denotes a block which indicates the sending side of a remote copy application, and corresponds to the Remote-Copy-Scan 1509 shown in FIG. 12. Reference numeral 4150 denotes a block which indicates the sending side of universal send, and corresponds to the Universal-Send 1504 shown in FIG. 12.

Reference numeral 4200 denotes a block which indicates a Web-Pull-Print module, and corresponds to the Web-Pull-Print 1511 shown in FIG. 12. Reference numeral 4250 denotes a block which indicates a Web Server module and corresponds to the Web-Server 1503 shown in FIG. 12.

Reference numeral 4300 denotes a block which indicates the receiving side (print side) of remote copy, and corresponds to the Remote-Copy-Print 1510 shown in FIG. 12. Reference numeral 4350 denotes a block which receives and prints an image sent by universal send using a versatile printer, and corresponds to the printer module (P550) 1505 shown in FIG. 12. Reference numeral 4400 denotes a block which indicates the receiving side (print side) of remote print, and corresponds to the DP 1508 shown in FIG. 12.

Reference numeral 4450 denotes a block which receives and stores an image sent by universal send using a known Notes Server, and corresponds to the DB 1507 shown in FIG. 12. Reference numeral 4500 denotes a block which receives and stores a binary image sent by universal send, and corresponds to the DB 1507 shown in FIG. 12. Reference numeral 4550 denotes a block which receives and stores an image sent by universal send using a known Mail Server, and corresponds to the E-Mail 1506 shown in FIG. 12.

Reference numeral 4600 denotes a block which receives and stores a multi-valued image sent by universal send using a known mail server, and corresponds to the DB 1507 shown in FIG. 12. Reference numeral 4650 denotes a block which indicates a known Web Server including information contents, and corresponds to the Web-Server 1503 shown in FIG. 12. Reference numeral 4700 denotes a known web browser which accesses the Web Server and like of the present invention.

These applications will be described in detail below with reference to the blocks.

User Interface Application

Details of the User Interface (UI) indicated by block 4050 have been explained above, and the Address-Book 1502 will be described below. The Address-Book 1502 is saved in a nonvolatile storage device (nonvolatile memory, hard disk, or the like) in the image processing apparatus of the present invention, and describes features of devices connected to the network. For example, the Address-Book 1502 includes features listed below for a device:

formal or alias name of the device;

network address of the device;

network protocol that the device supports;

document format that the device can process;

compression type that the device can process;

image resolution that the device can process;

information of available paper size and paper feed stage in case that the device is a printer device; and document folder name that can store a document in case that the device is a server (computer) device.

The applications to be described below can discriminate features of a destination on the basis of information described in the Address-Book 1502.

The Address-Book 1502 is editable, and can be downloaded and used or can be directly referred to when it is saved in a server computer or the like in the network.

Remote Copy Application

The remote copy application indicated by block 4100 discriminates resolution information of a device designated as a destination from the Address-Book 1502, compresses a binary image scanned by the scanner using known MMR compression in accordance with the discriminated resolution information, converts the compressed image into TIFF (Tagged Image File Format), and sends that image to a printer device on the network via the SLM 1515. The SLM 1515 is a kind of network protocols, which includes device control information called a known Salutation Manager (or Smart Link Manager), although a detailed description thereof will be omitted.

Universal Send Application

The universal send application indicated by block 4150 can send an image to a plurality of destinations by a single image scan unlike the remote copy application. The destinations are not limited to printer devices, but an image can be directly sent to a so-called server computer.

The following explanation will be given in turn in correspondence with destinations.

When it is determined based on the Address-Book 1502 that the destination device can process LPD (Line Printer Daemons) as a known network protocol and known LIPS as printer control commands, an image is scanned in accordance with an image resolution similarly determined based on the Address-Book 1502, and the image itself is compressed using known FBE (First Binary Encoding) in this embodiment. Furthermore, the compressed image is converted into LIPS codes, and is sent to a partner device by LPR as a known network printer protocol.

When the destination device is a server device that can communicate by the SLM 1515, the server address and a designated folder in the server are detected from the Address-Book 1502, a binary image scanned by the scanner is compressed using known MMR compression like in the remote copy application. The compressed image is converted into known TIFF (Tagged Image File Format), and that image can be stored in a specific folder in the server device on the network via the SLM 1515.

In the device of this embodiment, when it is determined that a server as a partner device can process a multi-valued image that has been compressed by known JPEG, a multi-valued image scanned in the same manner as the binary image is converted into a known JFIF image using known JPEG compression, and that image can be stored in a specific folder in the server device on the network via the SLM.

When the destination device is a known E-Mail server, a mail address described in the Address-Book 1502 is detected, and a binary image scanned by the scanner is compressed using known MMR compression. The compressed image is converted into known TIFF (Tagged Image File Format), and is sent to the E-Mail server using the known SMTP (Simple Mail Transfer Protocol) 1514. The subsequent sending process is implemented by the Mail Server indicated by block 4550.

Web Pull Print Application.

Since the Web Pull-Print Application indicated by block 4200 is not directly related to this embodiment, a description thereof will be omitted.

Web Server Application

Since the Web Server application is not directly related to this embodiment, a description thereof will be omitted.

Operation windows displayed on the LCD display 3100 of the console 3000 shown in FIG. 3 will be described in detail below with reference to FIGS. 14 to 59.

[Operation Window]

Figure 14:
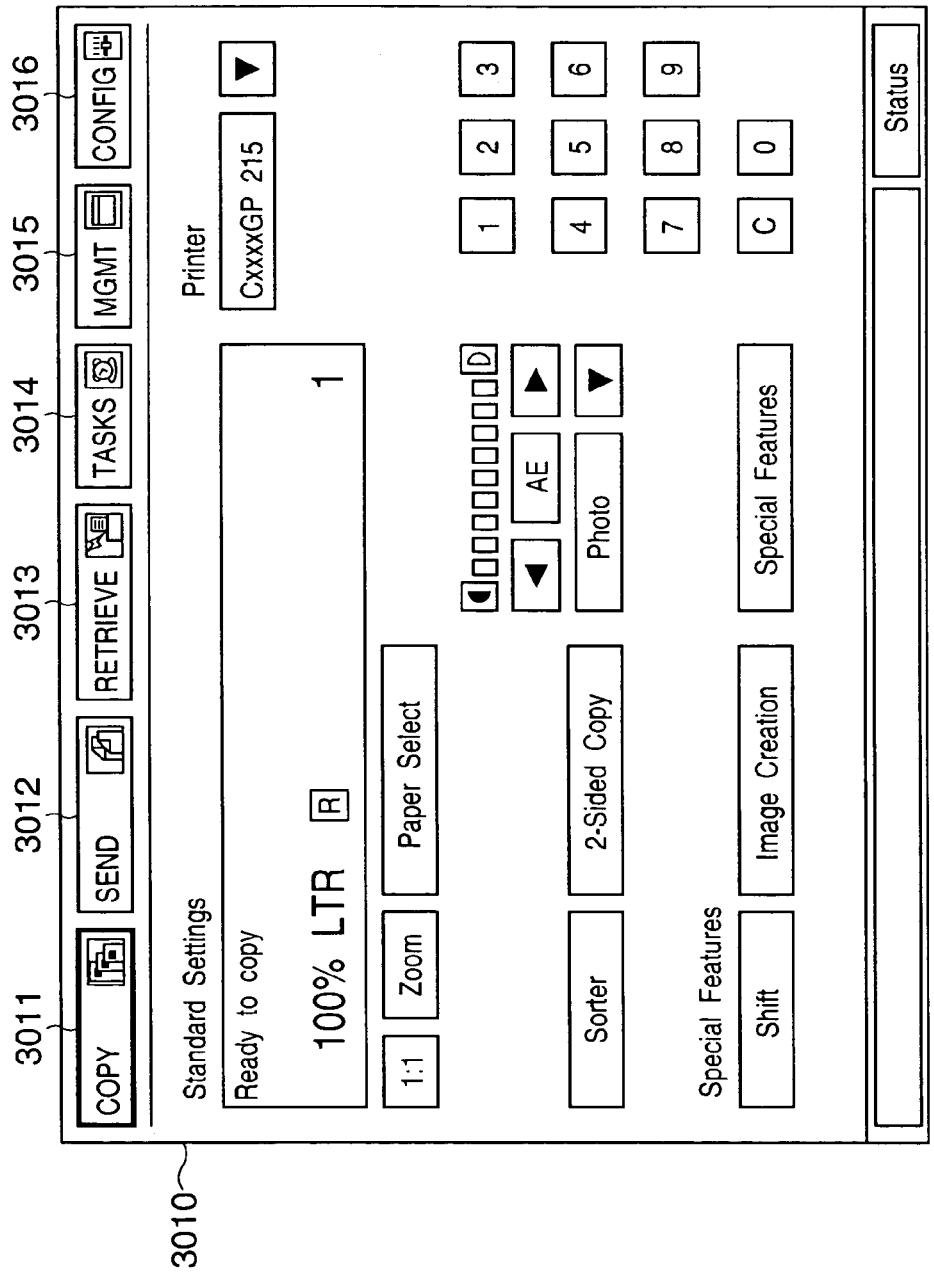
FIG. 14 shows an operation window displayed on an LCD display of the console shown in FIG. 3.

FIG. 14 shows an operation window displayed on the LCD display 3100 of the console 3000 shown in FIG. 3.

Referring to FIG. 14, reference numeral 3010 denotes a scan window which is displayed on the LCD display 3001 of the console 3000. The functions provided by the image processing apparatus of the present invention are classified into six major categories, i.e., Copy, Send, Retrieve, Tasks, Management, and Configuration, which correspond to six main tabs (COPY 3011, SEND 3012, RETRIEVE 3013, TASKS 3014, MGMT 3015, and CONFIG 3016) displayed on the upper portion on the operation window 3010.

By clicking one of these main tabs, a window of the corresponding category can be selected. When a given category is not allowed to be selected, the display color of the corresponding main tab changes, and no reaction is obtained if the user clicks that tab.

Copy includes a function of performing a normal document copying process using the scanner and printer of the own machine, and a function (remote copy) of copying a document using the scanner of the own machine and a printer connected via the network.

Send is a function of transferring a document set on the scanner of the own machine as an e-mail, an image to a remote printer, a FAX document, and a file (FTP), and to a database, and a plurality of destinations can be designated.

Retrieve is a function of retrieving a document from an external device, and printing the retrieved document by the printer of the own machine. As the document retrieval means, WWW, e-mail, file transfer, and FAX can be used.

Tasks is a function of generating and managing tasks for automatically processing an externally sent document such as a FAX document, Internet print, or the like, and periodically retrieving documents.

Management is a function of managing jobs, an address book, bookmarks, documents, account information, and the like.

Configuration is a function of performing setting for the own machine (network, timepiece, and the like).

A method of setting these functions will be explained below using examples of windows displayed on the LCD display 3001.

[ID Input Window]

Figure 15:
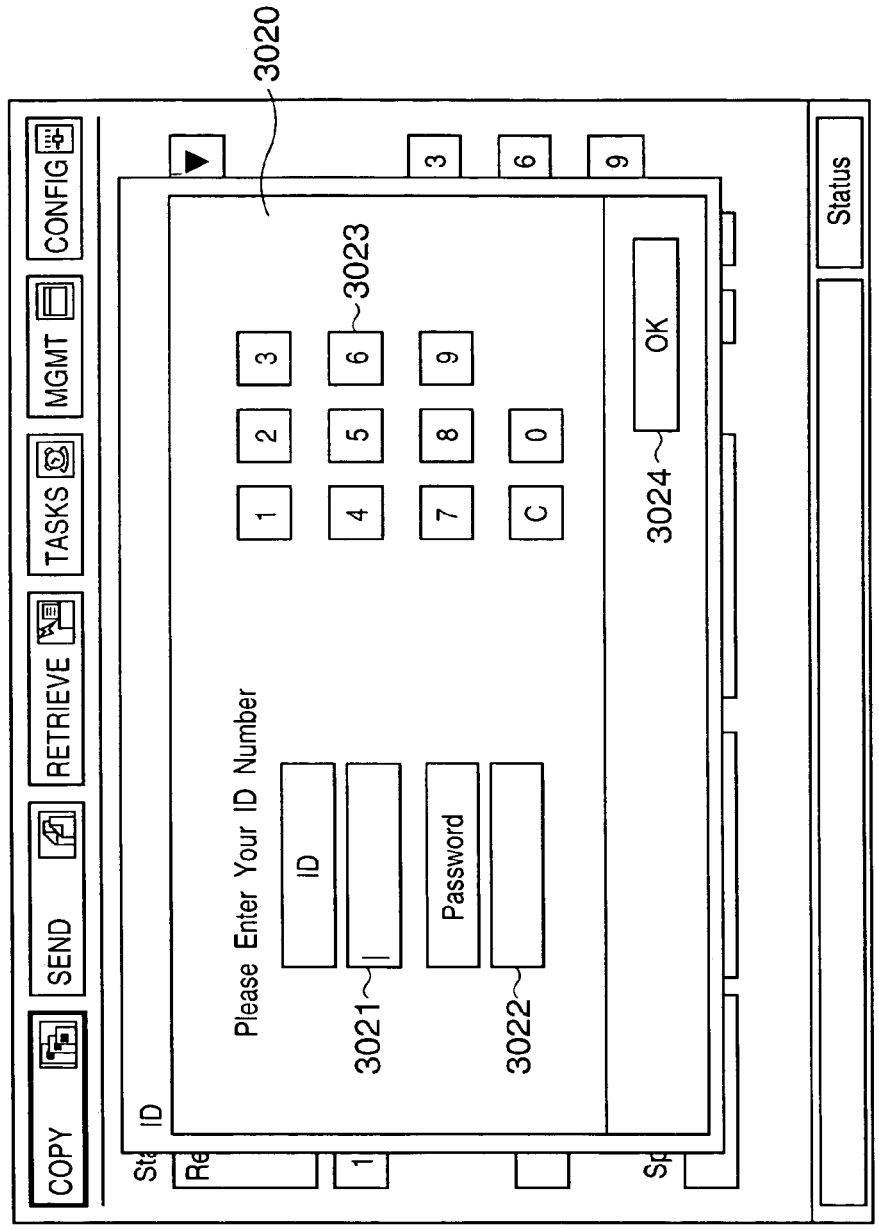
FIG. 15 shows an ID input window displayed on the LCD display of the console shown in FIG. 3.

FIG. 15 shows an ID input window displayed on the LCD display 3001 of the console 3000 shown in FIG. 3.

Referring to FIG. 15, reference numeral 3020 denotes an ID window which is displayed immediately after power ON and upon depression of the ID key 3004 shown in FIG. 3.

Reference numeral 3021 denotes an ID input area for inputting a user ID. Reference numeral 3022 denotes a password input area for inputting a password.

Reference numeral 3024 denotes an OK button. When the user inputs the correct user ID and password on the ID input window and then clicks this OK button 3024, the operation window 3010 shown in FIG. 14 is displayed to allow operations.

One of the ID input area 3021 and password input area 3022 can be selected by directly clicking a desired input area.

[COPY Window]

Figure 16:
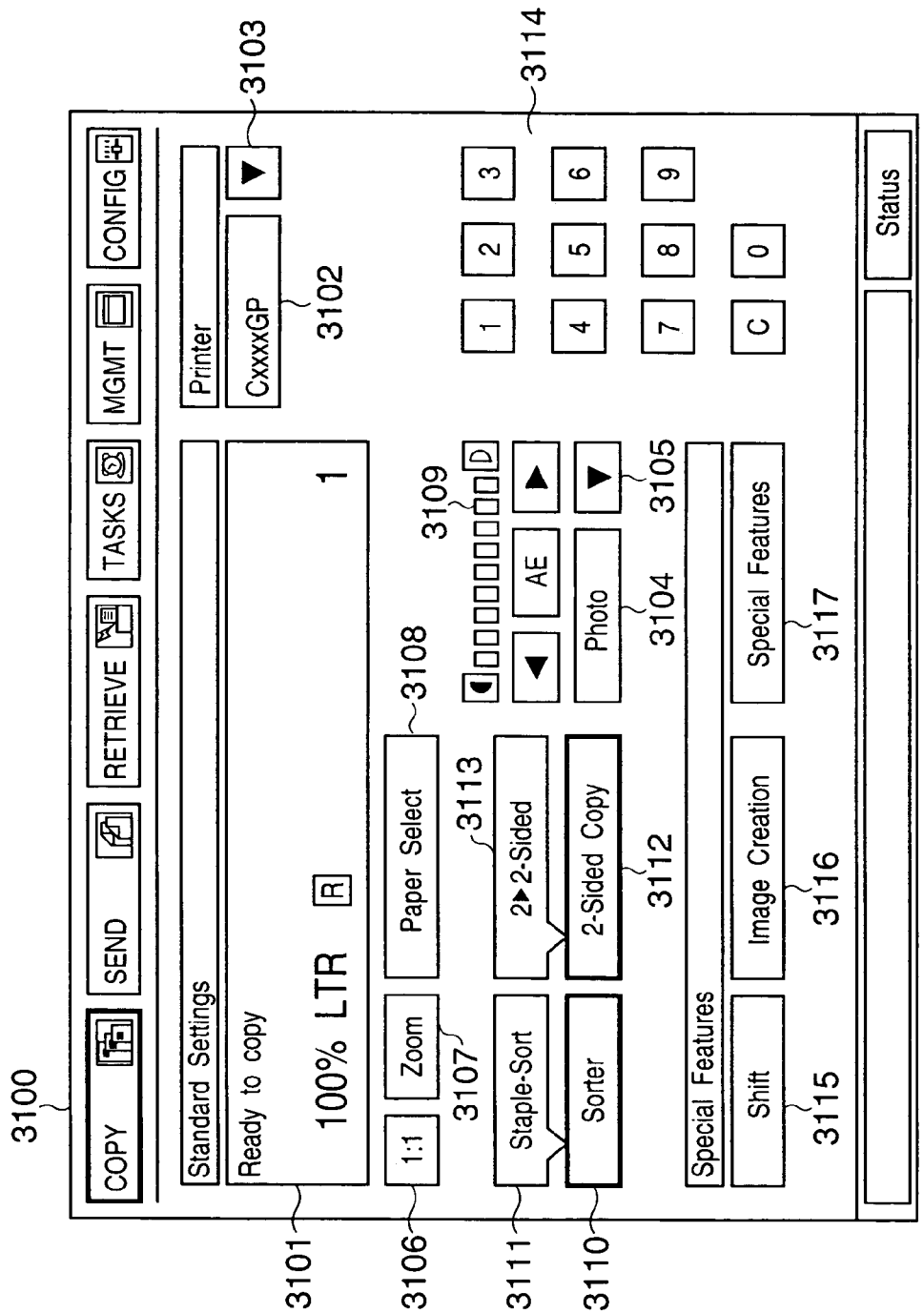
FIG. 16 shows an ID input window displayed on the LCD display of the console shown in FIG. 3.
Figure 17:
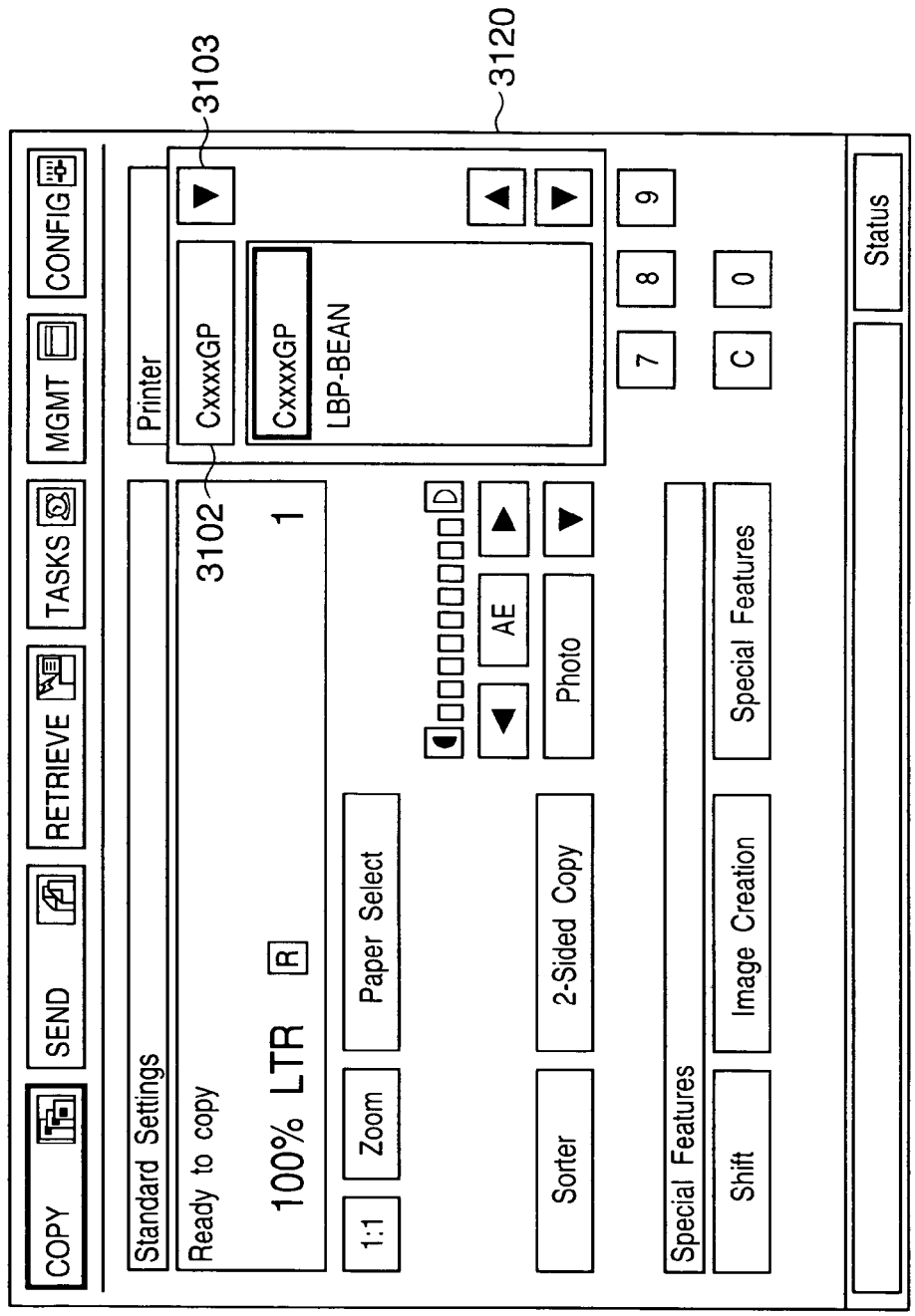
FIG. 17 shows an ID input window displayed on the LCD display of the console shown in FIG. 3.
Figure 18:
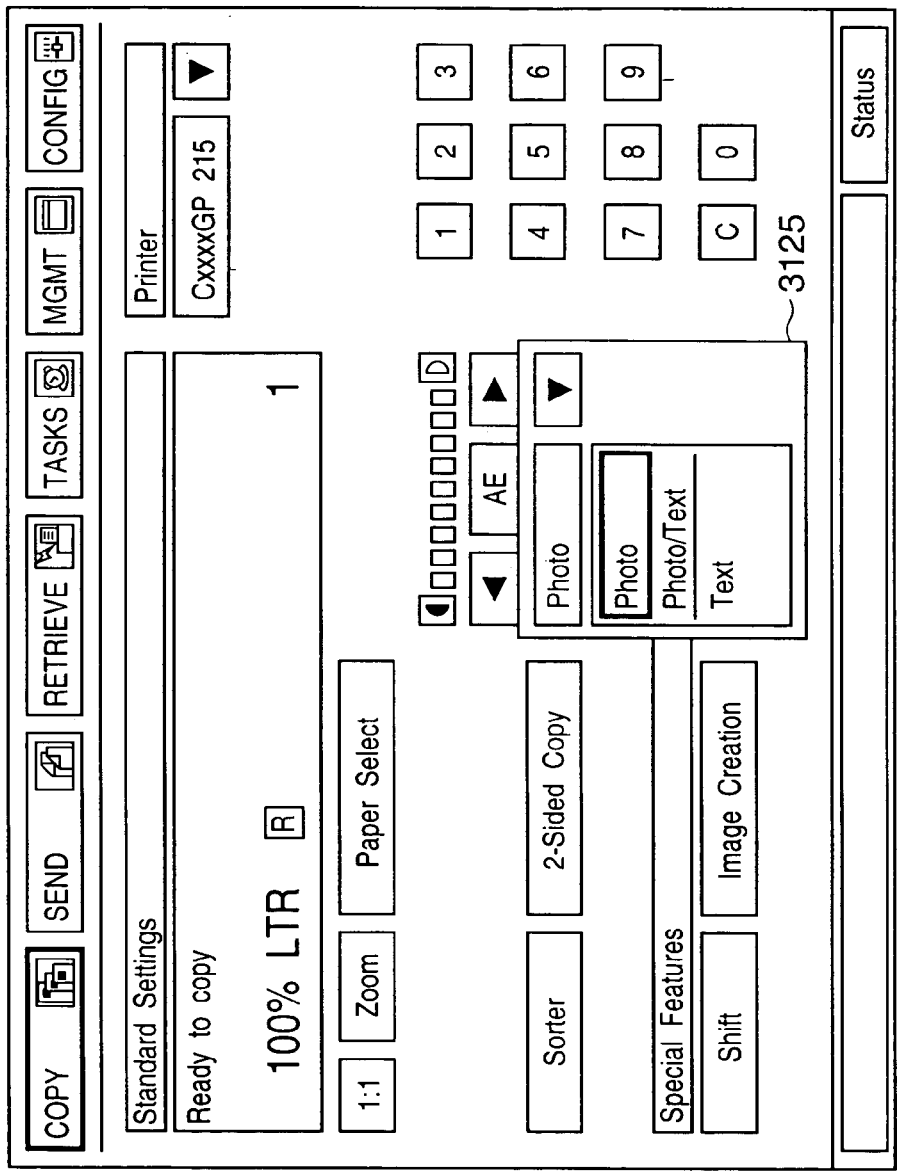
FIG. 18 shows an ID input window displayed on the LCD display of the console shown in FIG. 3.

FIGS. 16 to 18 show an ID input window displayed on the LCD display 3001 of the console 3000 shown in FIG. 3.

Referring to FIG. 16, reference numeral 3100 denotes a COPY main window, which is displayed when the user clicks the corresponding main tab (COPY 3011) shown in FIG. 14.

When the user presses the start button 3002 shown in FIG. 3 while this COPY main window 3100 is displayed, the scanner operates, and the selected printer outputs a copy according to setting parameters displayed on the window.

As shown in FIG. 16, the COPY main window 3100 includes a printer select button 3103 and printer display area 3102, an Image Quality select button 3105 and Image Quality display area 3104, a copy parameter indication 3101 as in the conventional copying machine, enlargement/reduction setting buttons 3106 and 3107, a paper select button 3108, a sorter setting button 3110, a two-sided copy setting button 3112, density indicator and density setting buttons 3109, and ten keys 3114.

Upon clicking the printer select button 3103, a list 3120 (FIG. 17) of available printers (the printer of the own machine and those connected via the network) is displayed as a pulldown window. When the user selects a desired printer from the list, the list disappears, and the selected printer name is displayed in the printer display area 3102.

Upon clicking the Image Quality setting button 3105, an Image Quality list 3125 (FIG. 18) is displayed, and the user selects a desired Image Quality from that list.

Upon clicking one of copy parameter setting buttons (the enlargement/reduction setting buttons 3106 and 3107, paper select button 3108, sorter setting button 3110, two-sided copy setting button 3112, and density indicator and density setting buttons 3109), a corresponding one of sub-windows (an enlargement/reduction setting sub-window 3130 shown in FIG. 19, a paper select sub-window 3140 shown in FIG. 20, a sorter setting sub-window 3150 shown in FIG. 21, and a two-sided copy setting sub-window 3160 shown in FIG. 22) is displayed, and parameters can be set as in the conventional copying machine. Also, the density can be set as in the conventional copying machine.

FIG. 19 shows the enlargement/reduction setting sub-window 3130 displayed on the LCD display 3001 of the console 3000 shown in FIG. 3.

FIG. 20 shows the paper select sub-window 3140 displayed on the LCD display 3001 of the console 3000 shown in FIG. 3.

Figure 21:
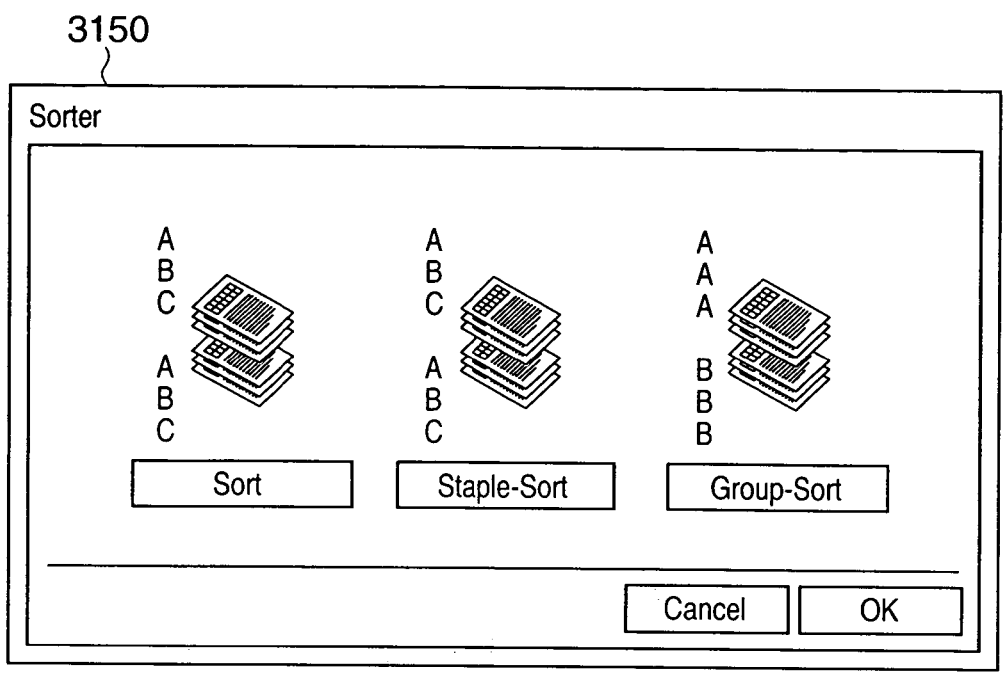
FIG. 21 shows a sorter setting sub-window displayed on the LCD display of the console shown in FIG. 3.

FIG. 21 shows the sorter setting sub-window 3150 displayed on the LCD display 3001 of the console 3000 shown in FIG. 3.

Figure 22:
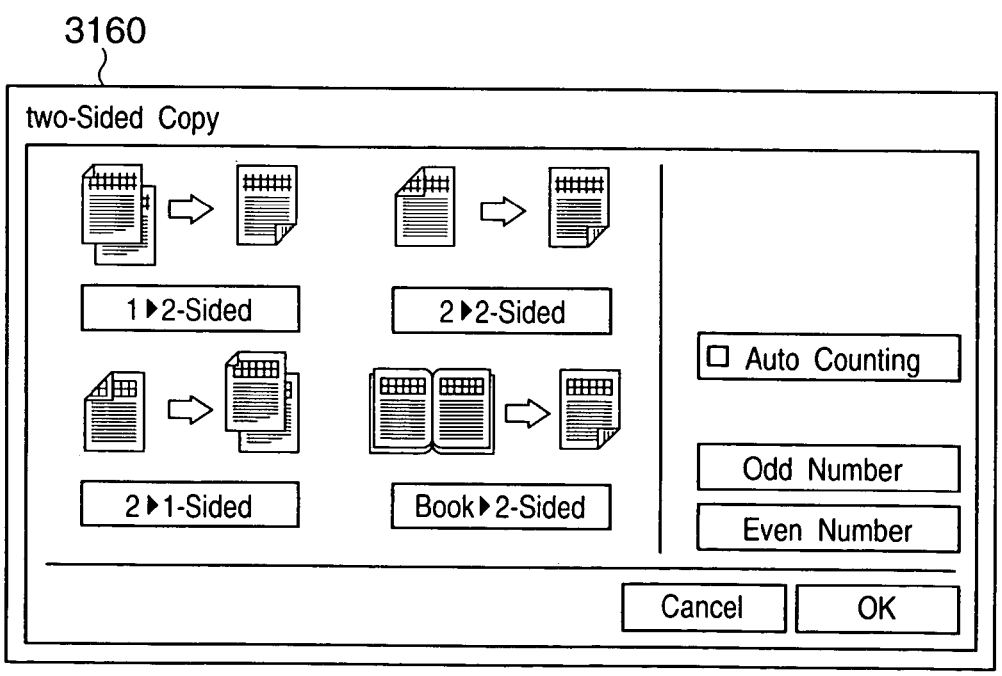
FIG. 22 shows a two-sided copy setting sub-window displayed on the LCD display of the console shown in FIG. 3.

FIG. 22 shows the two-sided copy setting sub-window 3160 displayed on the LCD display 3001 of the console 3000 shown in FIG. 3.

[SEND Window]

Figure 23:
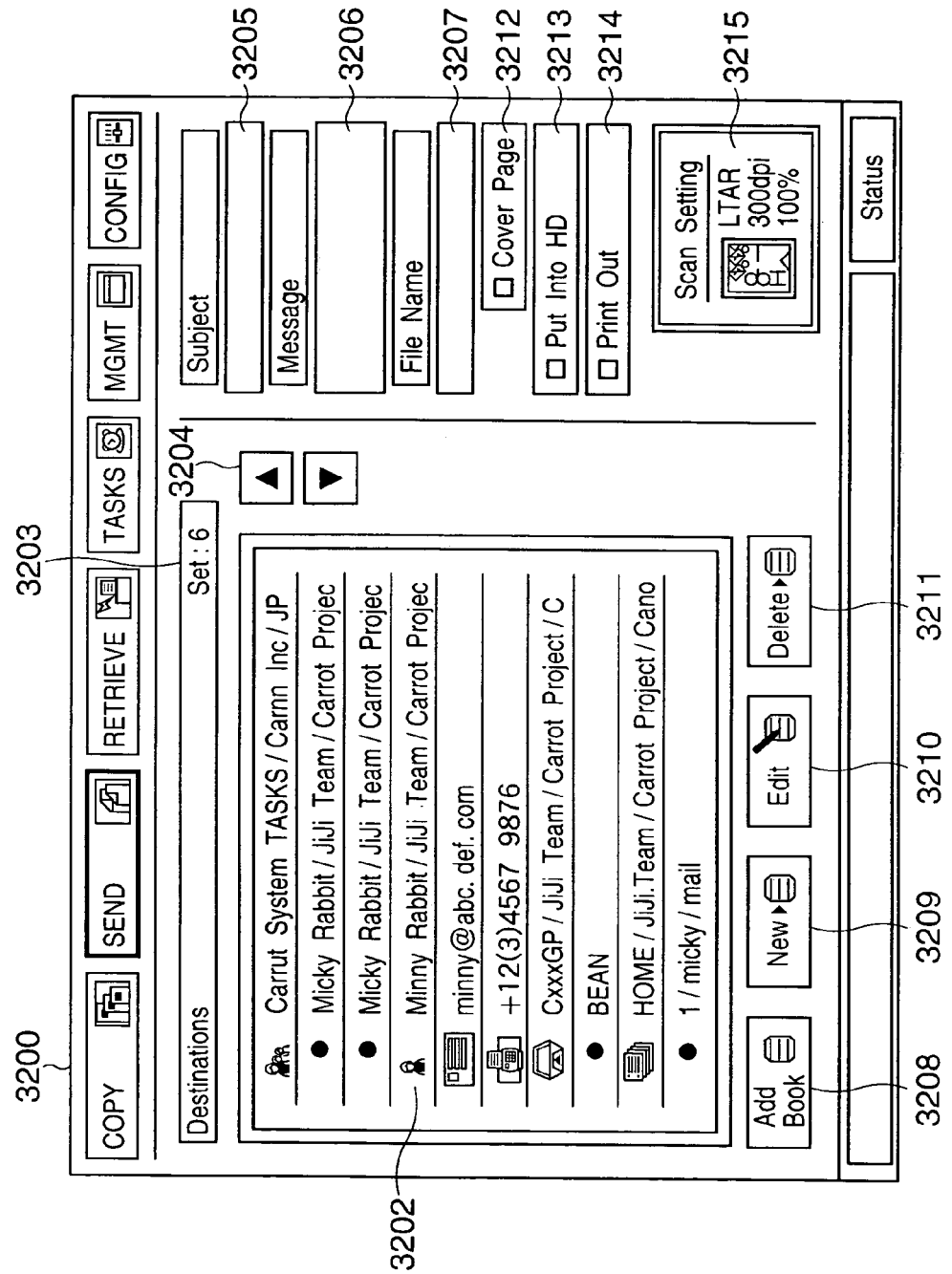
FIG. 23 shows a SEND main window displayed on the LCD display of the console shown in FIG. 3.

FIG. 23 shows a SEND main window displayed on the LCD display 3001 of the console 3000 shown in FIG. 3.

Referring to FIG. 23, reference numeral 3200 denotes a SEND main window, which is displayed upon clicking the corresponding main tab (SEND 3012) shown in FIG. 14.

When the user presses the start button 3002 shown in FIG. 3 while this SEND main window 3200 is displayed, the scanner operates, and a process for sending scanned image data to a selected destination by a designated sending method starts.

The SEND main window 3200 includes a destination display area 3202, detailed destination count display area 3203, destination scroll buttons 3204, address book button 3208, New button 3209, Edit button 3210, Delete button 3211, Subject input area 3205, Message input area 3206, File Name input area 3207, Cover page check button 3212, Put Into HD check button 3213, Print Out check button 3214, and Scan Setting button 3215.

Figure 24:
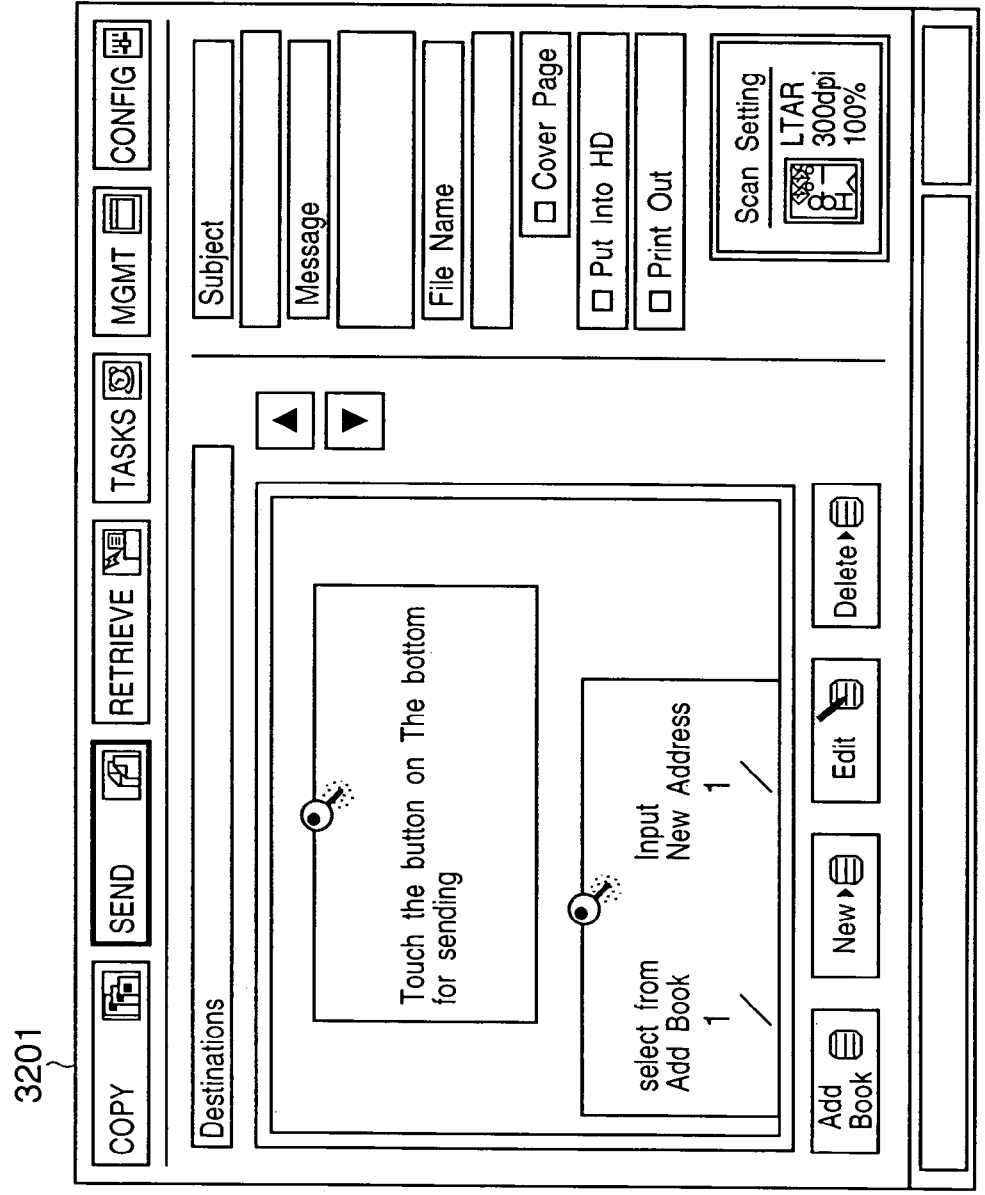
FIG. 24 shows a SEND initial window displayed on the LCD display of the console shown in FIG. 3.

In an initial state (including a reset state), no destinations are displayed on the destination displayed field, and operation guidance messages are displayed, like a SEND initial window 3201 shown in FIG. 24.

The destination display area 3202 displays a list of input destinations. A new input is added to the end of the list. The detailed destination count display area 3203 displays the number of destinations which are set currently. When the user selects a given destination from the destination display area and then clicks the Delete button 3211, the selected destination is deleted.

When the user clicks one of the Subject input area 3205, Message input area 3206, and File Name input area 3207, a full keyboard is displayed to allow input.

Figure 25:
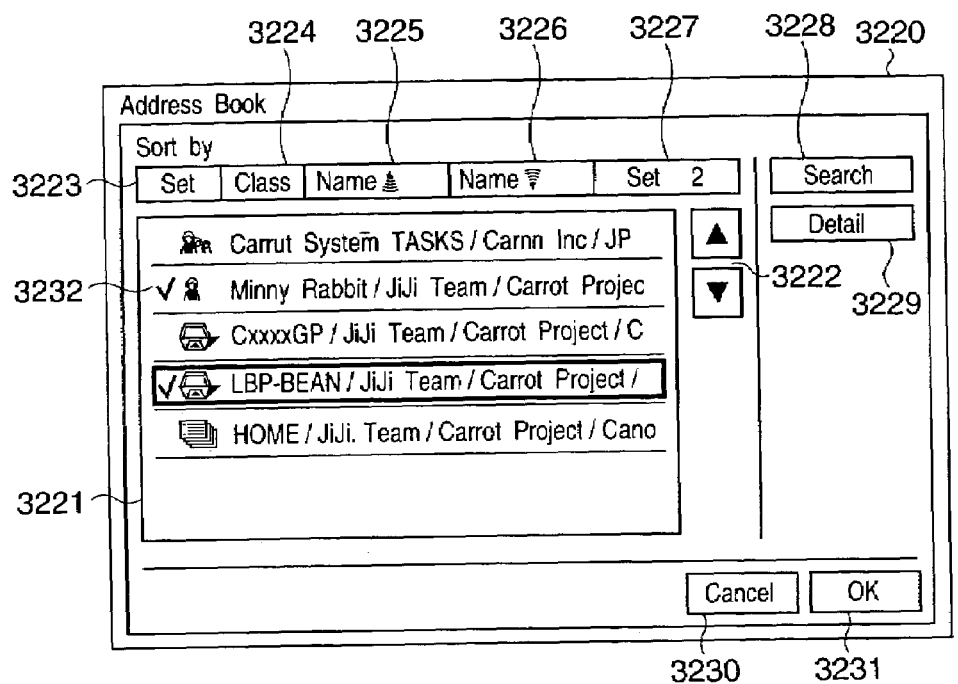
FIG. 25 shows a SEND initial window displayed on the LCD display of the console shown in FIG. 3.

Upon clicking the Address Book button 3208, an address book sub-window 3220 shown in FIG. 25 is displayed.

Figure 35:
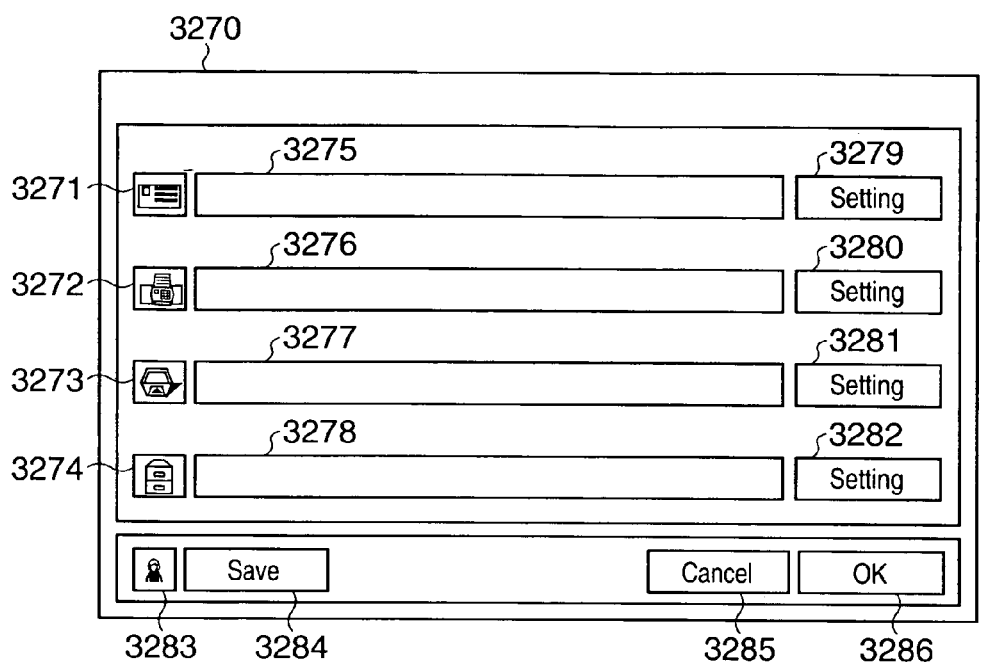
FIG. 35 shows a Person class detailed sub-window displayed on the LCD display of the console shown in FIG. 3.

Upon clicking the New button 3209, a Person class detailed sub-window 3270 shown in FIG. 35 is displayed, and a new destination can be set.

Figure 36:
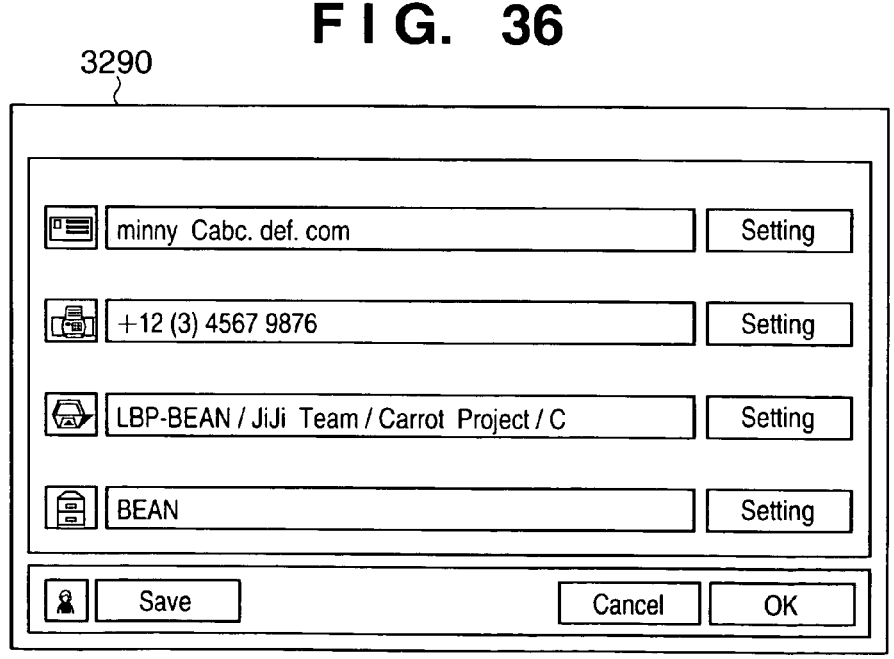
FIG. 36 shows a Person class detailed sub-window displayed on the LCD display of the console shown in FIG. 3.

When the user clicks the Edit button 3210 while a destination belonging to a Person class is selected, a Person class detailed sub-window 3290 shown in FIG. 36 is displayed.

Figure 37:
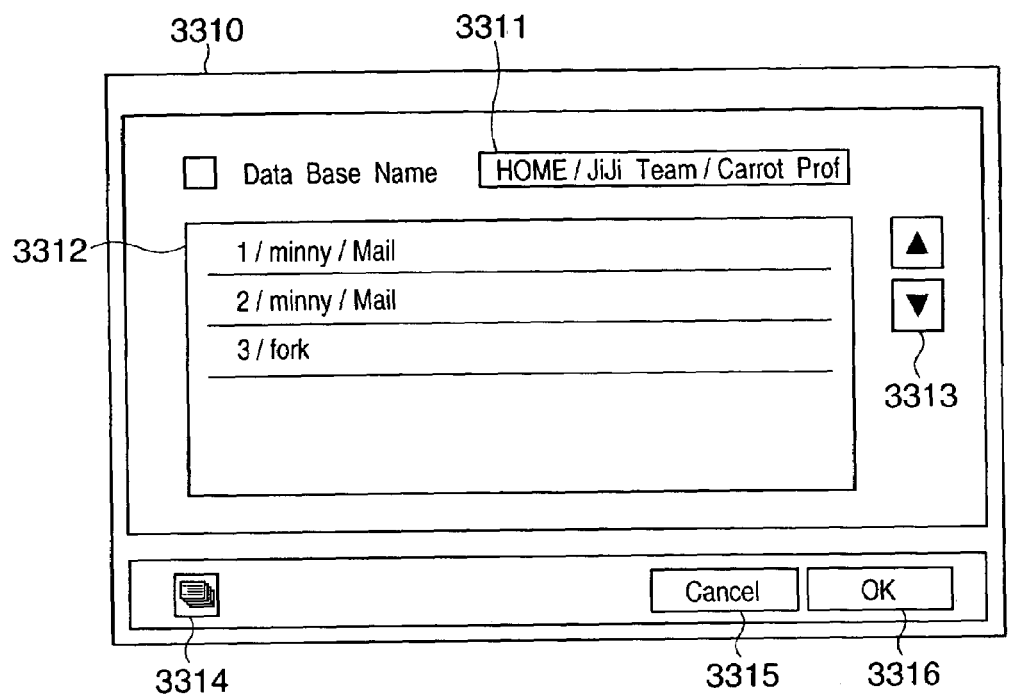
FIG. 37 shows a Data Base class detailed sub-window displayed on the LCD display of the console shown in FIG. 3.

Furthermore, when the user clicks the Edit button 3210 while a destination belonging to a Data Base class is selected, a Data Base class detailed sub-window 3310 shown in FIG. 37 is displayed.

Figure 38:
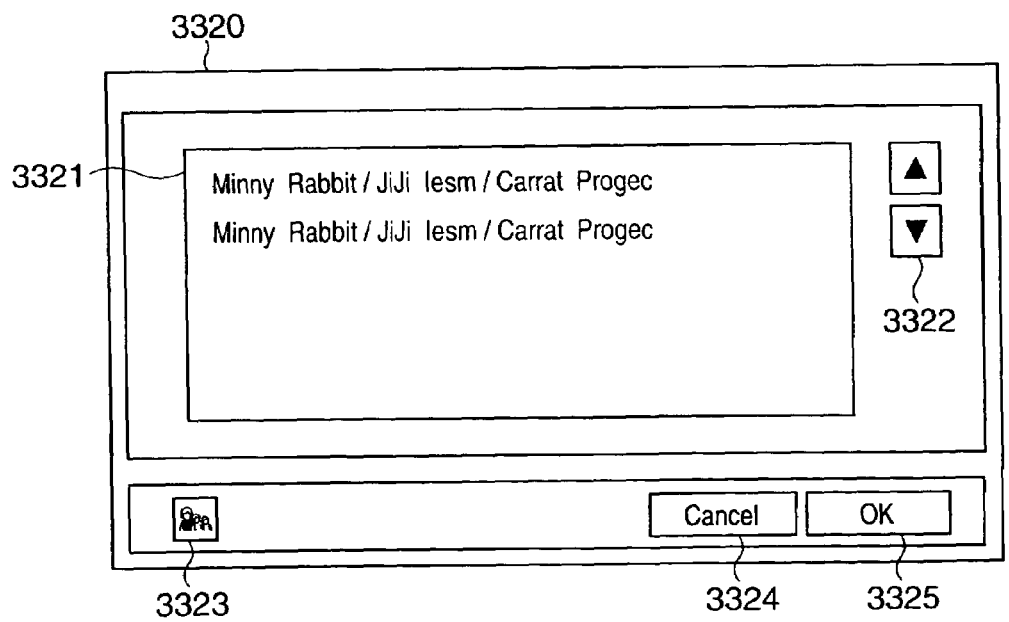
FIG. 38 shows a Group class detailed sub-window displayed on the LCD display of the console shown in FIG. 3.

When the user clicks the Edit button 3210 while a destination belonging to a Group class is selected, a Group class detailed sub-window 3320 shown in FIG. 38 is displayed.

Figure 39:
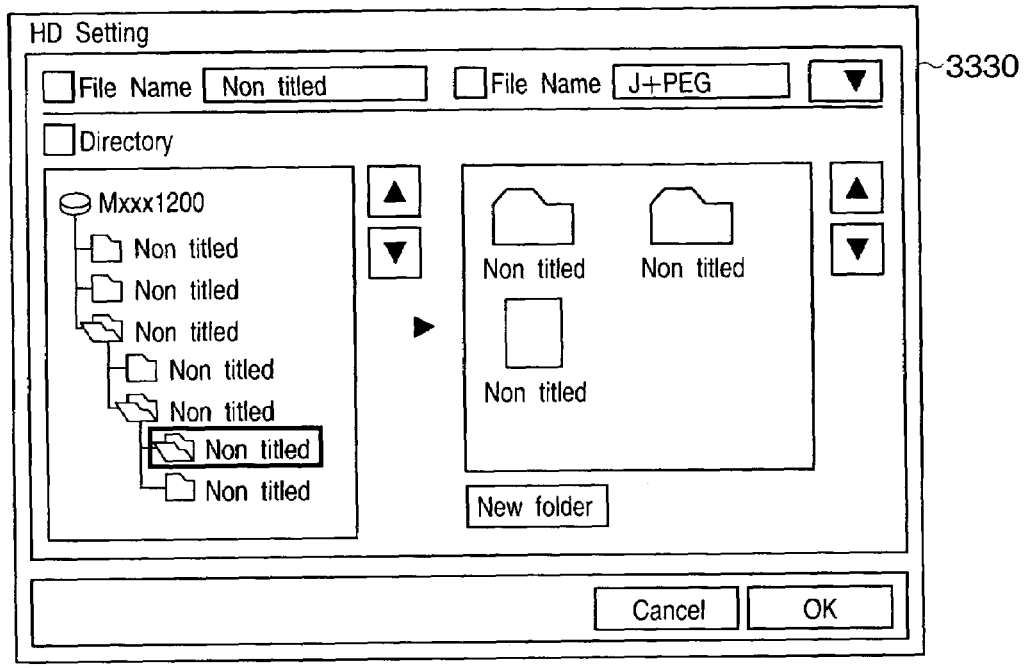
FIG. 39 shows an HD SETTING sub-window displayed on the LCD display of the console shown in FIG. 3.

When the user clicks the Put Into HD check button 3213, an HD SETTING sub-window 3330 shown in FIG. 39, which is used to make settings for sending information to a hard disk, is displayed.

Figure 40:
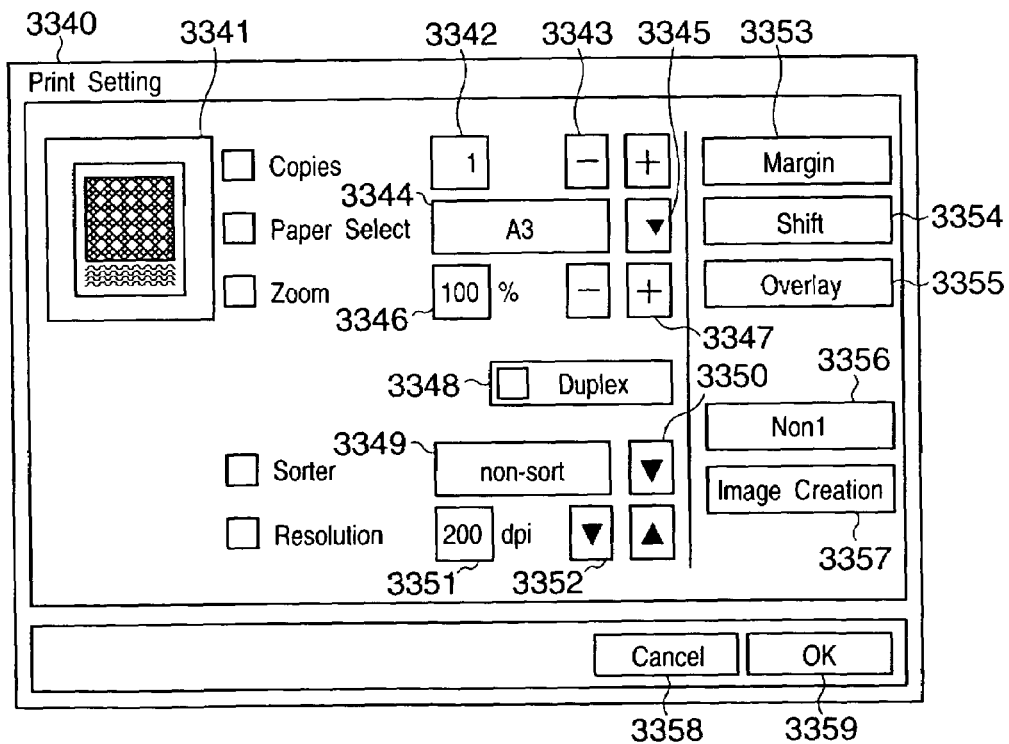
FIG. 40 shows a printout sub-window displayed on the LCD display of the console shown in FIG. 3.

When the user clicks the Print Out check button 3214, a print out sub-window 3340 shown in FIG. 40 is displayed.

Figure 43:
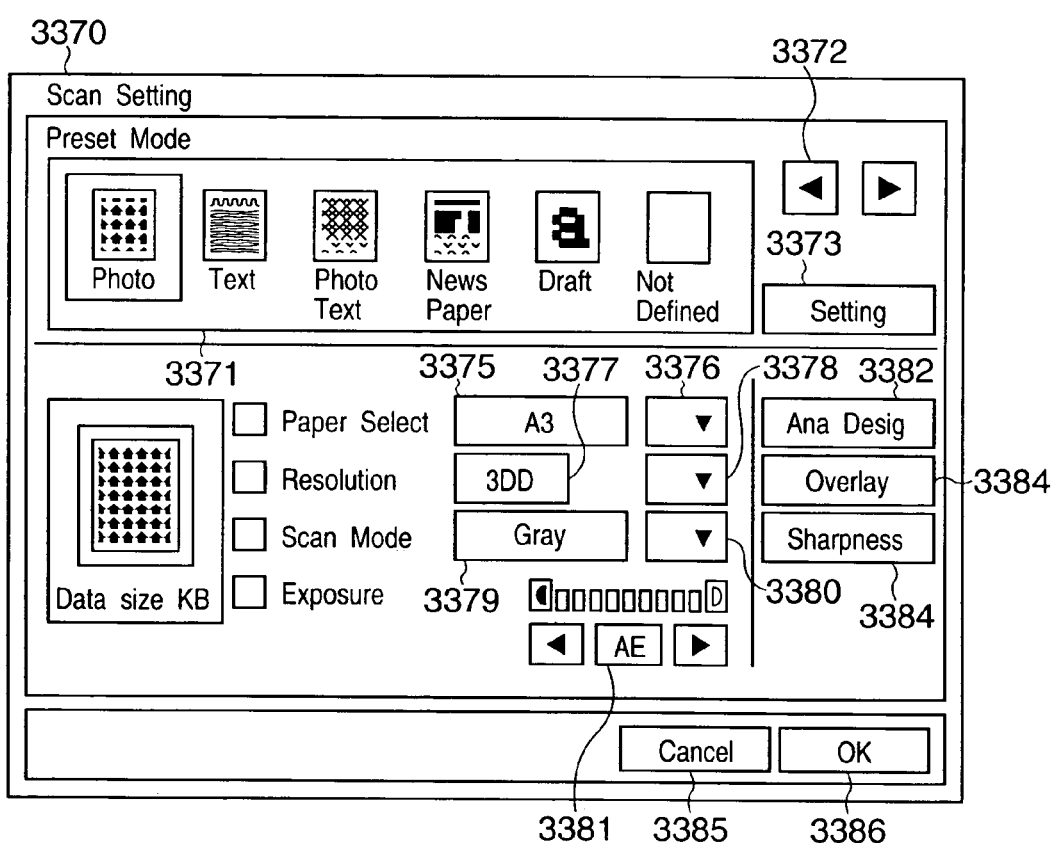
FIG. 43 shows a Scan setting sub-window displayed on the LCD display of the console shown in FIG. 3.

When the user clicks the Scan Setting button 3215, a Scan setting sub-window 3370 shown in FIG. 43 is displayed.

FIG. 24 shows the SEND initial window 3201 displayed on the LCD display 3001 of the console 3000 shown in FIG. 3.

[Address Book Sub-window]

FIG. 25 shows the address book sub-window 3220 displayed on the LCD display 3001 of the console 3000 shown in FIG. 3.

As shown in FIG. 25, a destination with a select mark 3232 on an address book display area 3221 is added to the destination display area 3202 on the SEND main window upon clicking an OK button 3231.

The contents of the address book are sorted in units of classes and in ascending or descending order of names upon clicking sort item setting buttons 3224 to 3226. An item select count display area 3227 displays the number of items with select marks.

Upon clicking the OK button 3231 or a cancel button 3230, the address book sub-window is closed, and the SEND main window is displayed.

Figure 26:
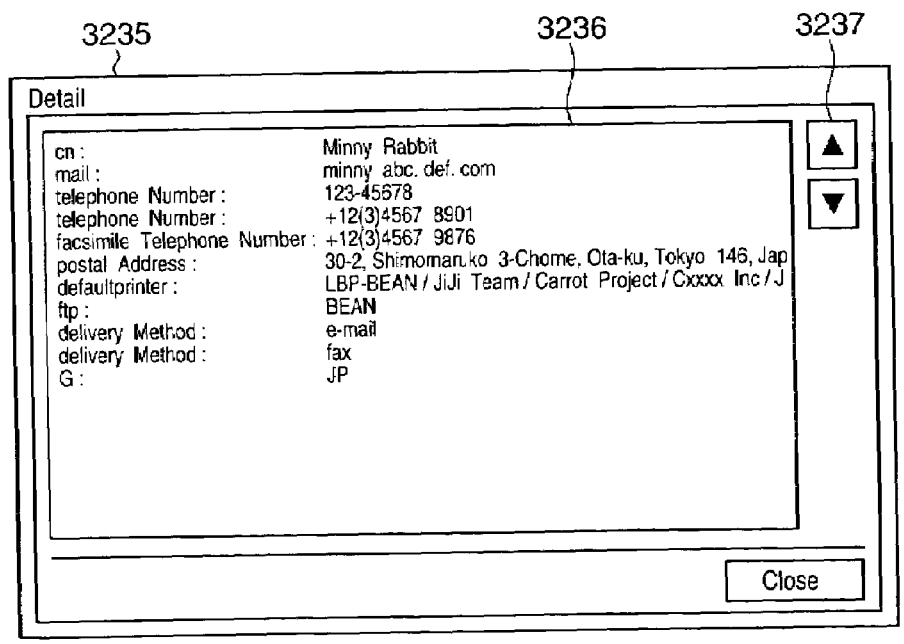
FIG. 26 shows a Detail sub-window (detailed information window) displayed on the LCD display of the console shown in FIG. 3.

When the user clicks a Detail button 3229 while one of items in the address book display area 3221 is selected, a Detail sub-window (detailed information window) 3235 shown in FIG. 26 is displayed.

Figure 27:
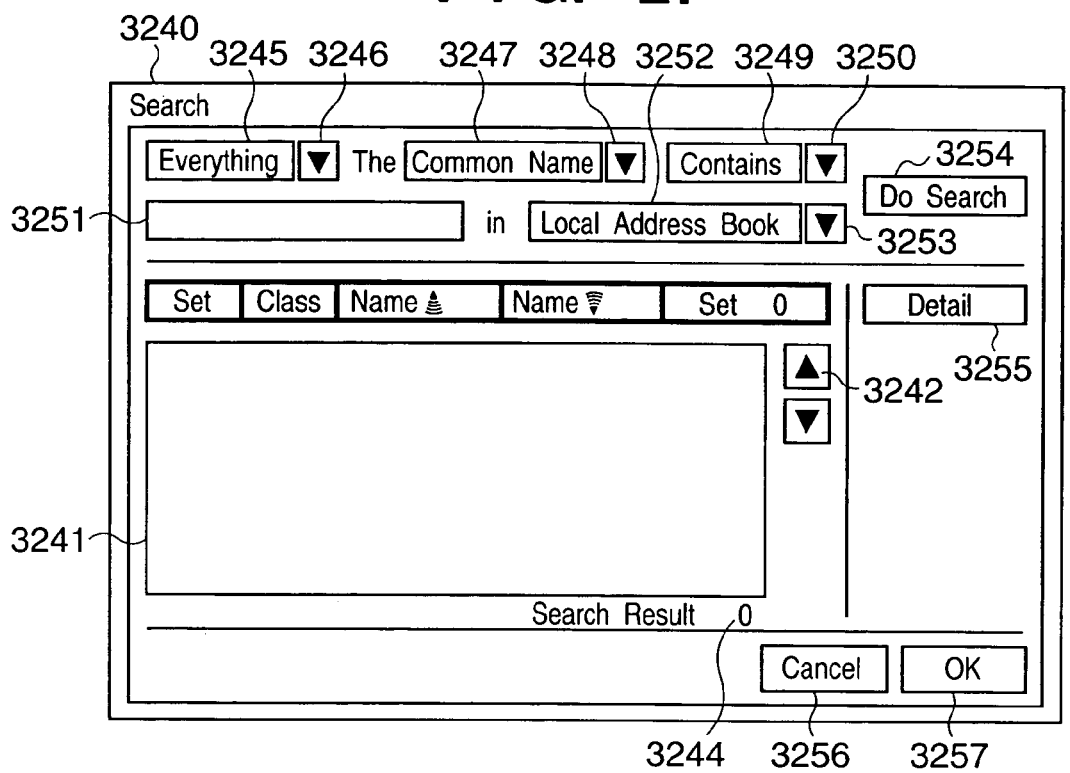
FIG. 27 shows a search sub-window displayed on the LCD display of the console shown in FIG. 3.

Upon clicking a Search button 3228, a search sub-window 3240 shown in FIG. 27 is displayed to search for a destination from a local address book or an external address server.

FIG. 26 shows the Detail sub-window (detailed information window) 3235 displayed on the LCD display 3001 of the console 3000 shown in FIG. 3.

As shown in FIG. 26, the Detail sub-window 3235 displays all kinds of information 3236 obtained from the address book as those of the selected item. Reference numeral 3237 denotes scroll buttons.

[Search Sub-window]

FIG. 27 shows the search sub-window 3240 displayed on the LCD display 3001 of the console 3000 shown in FIG. 3.

Figure 28:
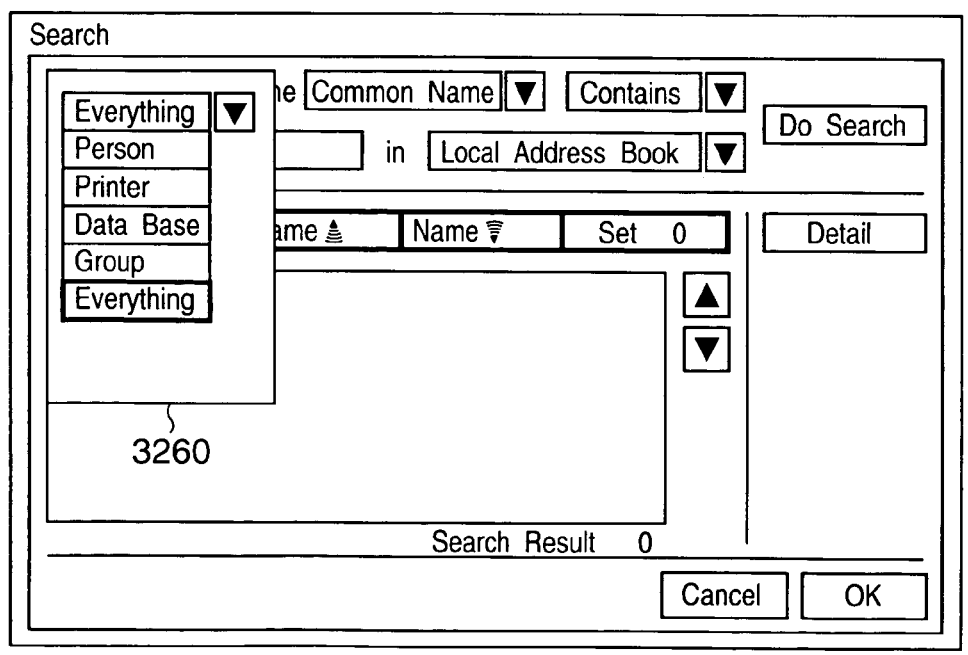
FIG. 28 shows a search class list displayed on the LCD display of the console shown in FIG. 3.

As shown in FIG. 27, the upper portion of the search sub-window 3240 is a search condition setting portion. A search class display area 3245, search attribute display area 3247, search condition display area 3249, and search address book display area 3252 display current choices. Upon clicking a search class setting button 3246, a search class list 3260 shown in FIG. 28 is displayed. A class selected from this list is displayed on the search class display area 3245.

Upon clicking a search attribute setting button 3248, a search attribute list 3261 shown in FIG. 29 is displayed. The attributes displayed in this list change as follows depending on the selected search class:

Class: Person
  Common Name, Address, Country

Class: Printer
  Common Name, Owner, Location, Model, Type, Resolution, Color, Finisher Class Class: Group
  Common Name, Member Class: Everything
  All attributes (Common Name, Address, Country, Owner, Location, Model, Type, Resolution, Color, Finisher, Member)

Upon clicking a search condition setting button 3250, a search condition list 3262 shown in FIG. 30 is displayed, and the user can select a condition from that list.

Figure 31:
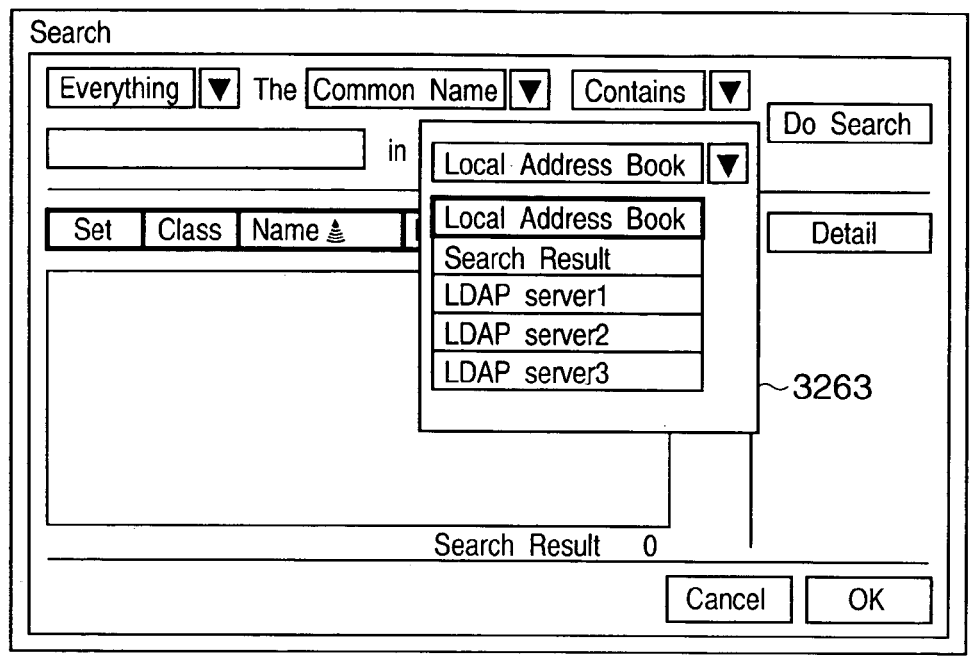
FIG. 31 shows a search address book list displayed on the LCD display of the console shown in FIG. 3.

Upon clicking a search address book setting button 3253, a search address book list 3263 shown in FIG. 31 is displayed, and the user can select an address book from that list.

Figure 33:
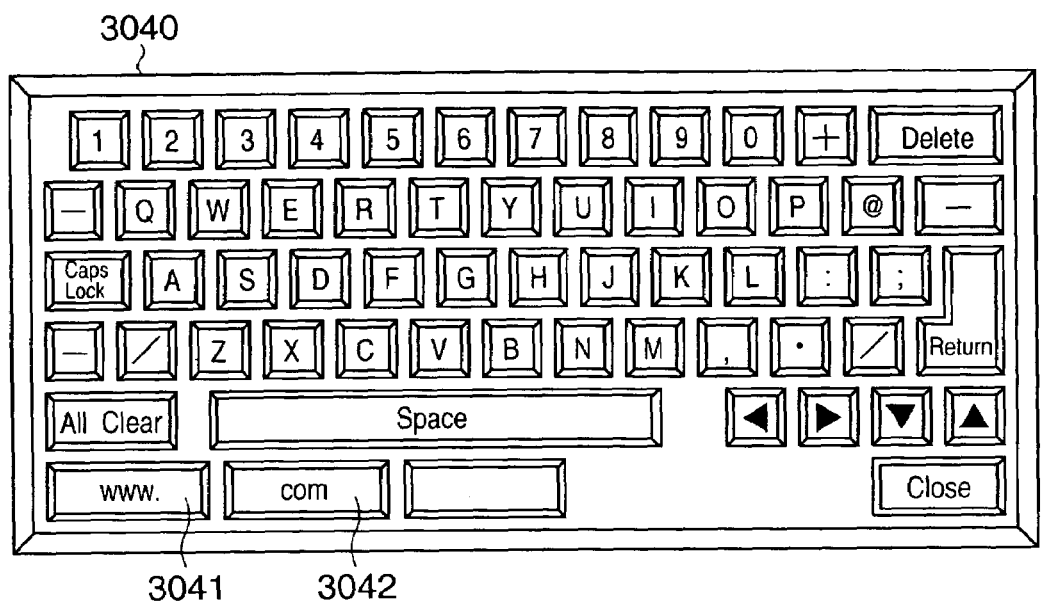
FIG. 33 shows a full keyboard displayed on the LCD display of the console shown in FIG. 3.

Upon clicking a search attribute value input area 3251, a full keyboard 3040 shown in FIG. 33 is displayed, and the user can input values.

Upon clicking a Do Search button 3254, a search is made according to the set search conditions. Search results are displayed on a search result display area 3241, and the number of hits is displayed on a search result count display area 3244.

When the user clicks a Detail button 3255 while one of items on the search result display area is selected, detailed information 3235 (FIG. 26) of that item is displayed.

Figure 32:
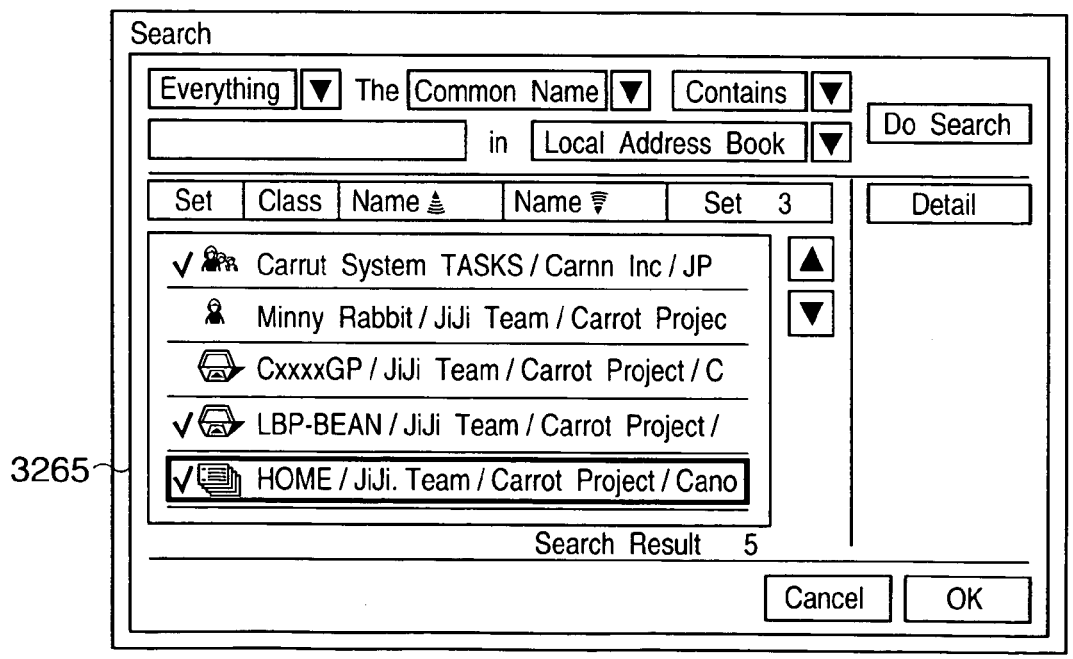
FIG. 32 shows an example of a search result displayed on the LCD display of the console shown in FIG. 3.

Items which are displayed in the search result display area and are to be added as destinations are added with select marks as in a search result example shown in FIG. 32.

Upon clicking an OK button 3257, the search sub-window is closed to display the SEND main window, and items with select marks are added as destinations. Upon clicking a cancel button 3256, the search sub-window is closed to display the SEND main window 3200, but destinations remain the same.

FIG. 28 shows the search class list 3260 displayed on the LCD display 3001 of the console 3000 shown in FIG. 3.

FIG. 29 shows the search attribute list 3261 displayed on the LCD display 3001 of the console 3000 shown in FIG. 3.

FIG. 30 shows the search condition list 3262 displayed on the LCD display 3001 of the console 3000 shown in FIG. 3.

FIG. 31 shows the search address book list 3263 displayed on the LCD display 3001 of the console 3000 shown in FIG. 3.

FIG. 32 shows the display result example 3265 displayed on the LCD display 3001 of the console 3000 shown in FIG. 3.

[Full Keyboard]

FIG. 33 shows the full keyboard 3040 displayed on the LCD display 3001 of the console 3000 shown in FIG. 3, and the full keyboard 3040 is displayed when the user clicks a text input area.

As shown in FIG. 33, upon clicking a www. button 3041 or com button 3042, characters "www." or "com" are input. Since other keys have the same functions as those of the conventional keyboard, a description thereof will be omitted.

[Ten-key Pad]

Figure 34:
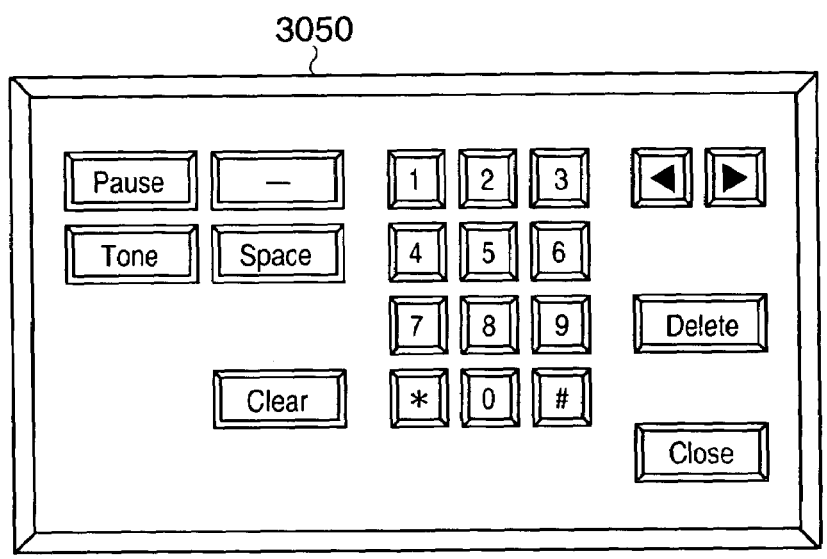
FIG. 34 shows a ten-key pad displayed on the LCD display of the console shown in FIG. 3.

FIG. 34 shows a ten-key pad 3050 displayed on the LCD display 3001 of the console 3000 shown in FIG. 3, and the ten-key pad 3050 is displayed when the user clicks a numerical value input area or month input area. A description of keys will be omitted.

[Detailed Destination Sub-window]

FIG. 35 shows the Person class detailed sub-window 3270 displayed on the LCD display 3001 of the console 3000 shown in FIG. 3, and this window is displayed when the user clicks the New button 3209 on the SEND main window 3200 shown in FIG. 23.

As shown in FIG. 35, upon clicking a sending method select button (3271, 3272, 3273, 3274) or a detailed destination input area (3275, 3276, 3277, 3278) corresponding to a sending method (e-mail, FAX, printer, FTP), the ten-key pad 3050 shown in FIG. 34 for FAX or the full keyboard 3040 shown in FIG. 33 for other methods is displayed, and a destination can be input.

Reference numerals 3279 to 3282 denote buttons for selecting sending options of the corresponding sending methods, but a detailed description thereof will be omitted.

FIG. 36 shows the Person class detailed sub-window 3290 displayed on the LCD display 3001 of the console 3000 shown in FIG. 3, and this window is displayed when the user clicks the Edit button 3210 while a destination belonging to the Person class is selected on the SEND main window 3200 shown in FIG. 23.

Details of the selected destination are displayed on fields corresponding to the detailed destination input areas 3275 to 3278 shown in FIG. 35, and can be edited when the ten-key pad or keyboard is displayed by the aforementioned method.

FIG. 37 shows the Data Base class detailed sub-window 3310 displayed on the LCD display 3001 of the console 3000 shown in FIG. 3, and this window is displayed when the user clicks the Edit button 3210 while a destination belonging to the Data Base class is selected on the SEND main window 3200 shown in FIG. 23.

As shown in FIG. 37, the Data Base class detailed sub-window displays a database name 3311 and folder list 3312.

FIG. 38 shows the Group class detailed sub-window 3310 displayed on the LCD display 3001 of the console 3000 shown in FIG. 3, and this window is displayed when the user clicks the Edit button 3210 while a destination belonging to the Group class is selected on the SEND main window 3200 shown in FIG. 23.

As shown in FIG. 38, the Group class detailed sub-window displays group members 3321.

[HD SETTING Sub-window]

FIG. 39 shows the HD SETTING sub-window 3330 displayed on the LCD display 3001 of the console 3000 shown in FIG. 3. Note that a detailed description of this window will be omitted.

[Print Out Sub-window]

FIG. 40 shows the print out sub-window 3340 displayed on the LCD display 3001 of the console 3000 shown in FIG. 3.

As shown in FIG. 40, the user can set a print count, paper size, zoom ratio, two-sided print, sort, resolution, and the like on the print out sub-window.

Figure 41:
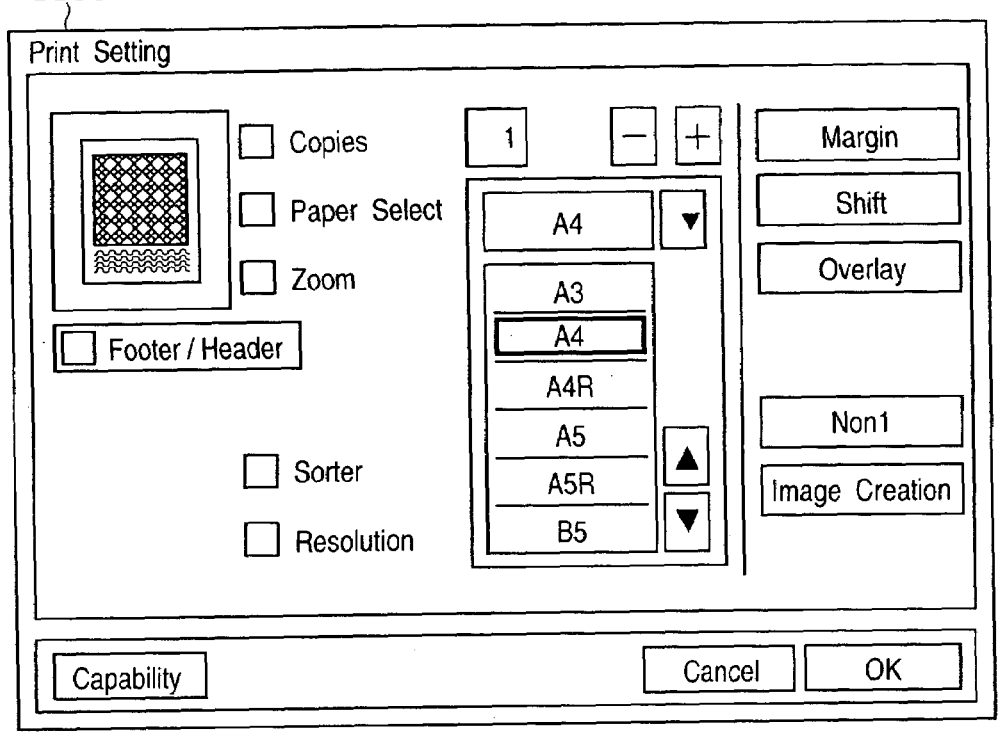
FIG. 41 shows a paper size list displayed on the LCD display of the console shown in FIG. 3.

Upon clicking a paper size select button 3345, a paper size list 3360 shown in FIG. 41 is displayed, and the user can select a desired size from there. Upon clicking a sorter select button 3350, an available sorter list 3365 shown in FIG. 42 is displayed.

FIG. 41 shows the paper size list 3360 displayed on the LCD display 3001 of the console 3000 shown in FIG. 3.

Figure 42:
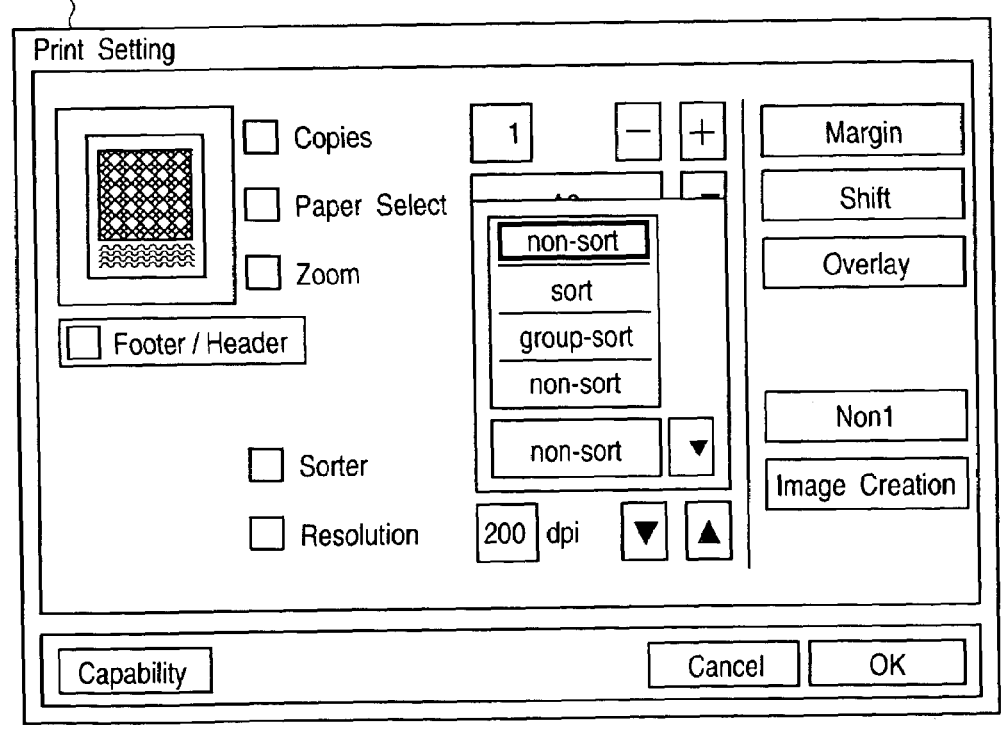
FIG. 42 shows a paper size list displayed on the LCD display of the console shown in FIG. 3.

FIG. 42 shows the sorter list 3365 displayed on the LCD display 3001 of the console 3000 shown in FIG. 3.

[Scan Setting Sub-window]

FIG. 43 shows the Scan Setting sub-window 3370 displayed on the LCD display 3001 of the console 3000 shown in FIG. 3.

As shown in FIG. 43, when the user selects one of scan settings from a Preset mode select field 3371 in the Scan Setting sub-window 3370, the preset paper size, resolution, scan mode, and density corresponding to the selected setting are respectively displayed on display areas 3375, 3377, 3379, and 3381. The user can manually edit the values of these items.

Figure 44:
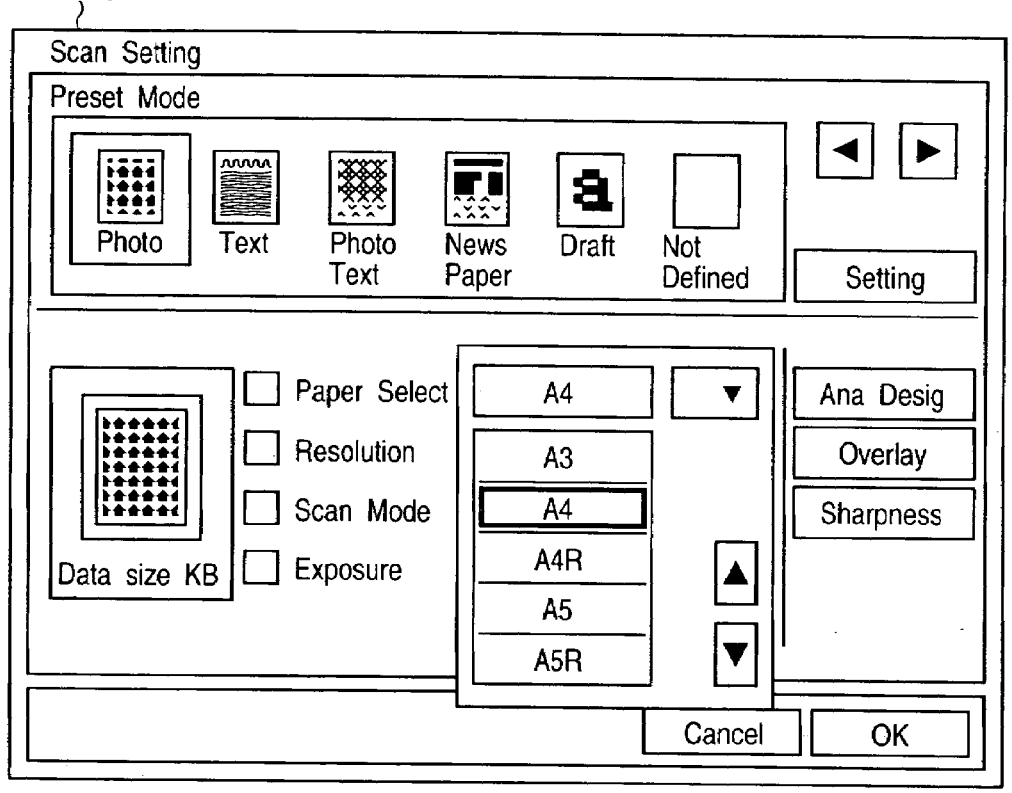
FIG. 44 shows a paper size select list displayed on the LCD display of the console shown in FIG. 3.
Figure 45:
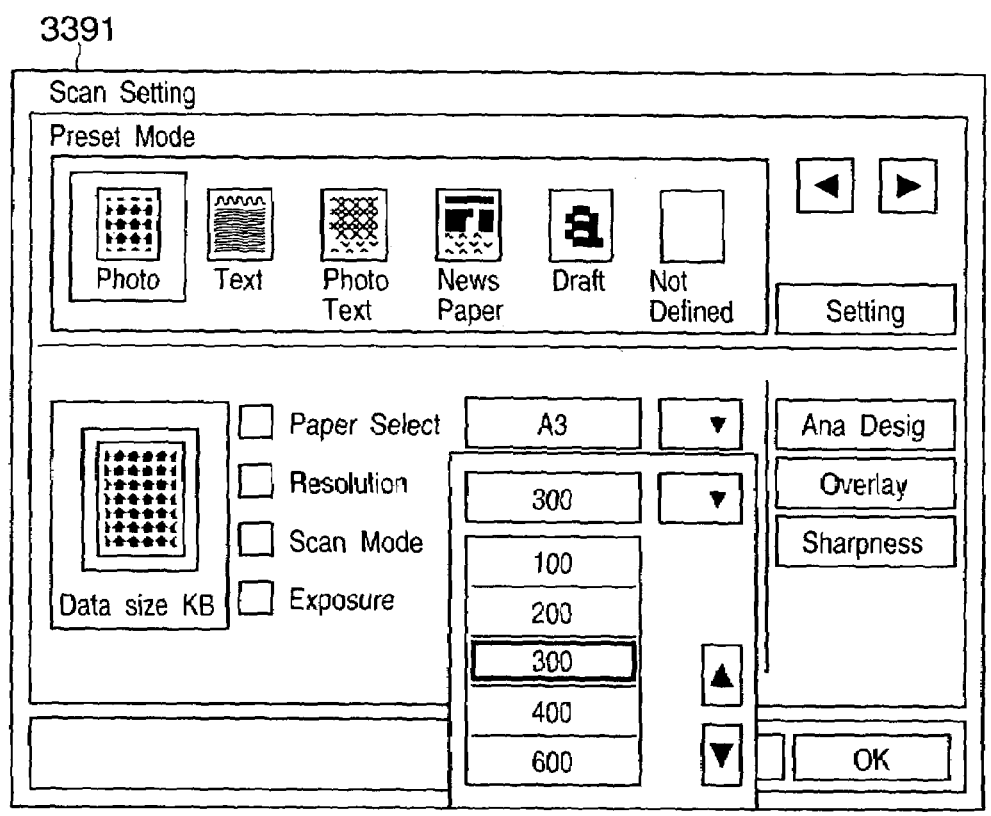
FIG. 45 shows a resolution list displayed on the LCD display of the console shown in FIG. 3.

In FIG. 43, reference numeral 3376 denotes a paper size setting button. Upon clicking the button 3376, a paper size select list 3390 shown in FIG. 44 is displayed. Reference numeral 3378 denotes a resolution setting button. Upon clicking the button 3378, a resolution list 3390 shown in FIG. 45 is displayed. Reference numeral 3380 denotes a scan mode setting button. Upon clicking the button 3380, a scan mode list 3392 shown in FIG. 46 is displayed.

FIG. 44 shows the paper size select list 3390 displayed on the LCD display 3001 of the console 3000 shown in FIG. 3, and corresponds to a window in a state wherein the paper size select list is displayed as a pulldown window on the Scan Setting sub-window 3370. The user selects the size and direction of paper to be used from this paper size select list.

FIG. 45 shows the resolution list 3391 displayed on the LCD display 3001 of the console 3000 shown in FIG. 3, and corresponds to a window in a state wherein the resolution list is displayed as a pulldown window on the Scan Setting sub-window 3370. The user selects the resolution used from this resolution list.

Figure 46:
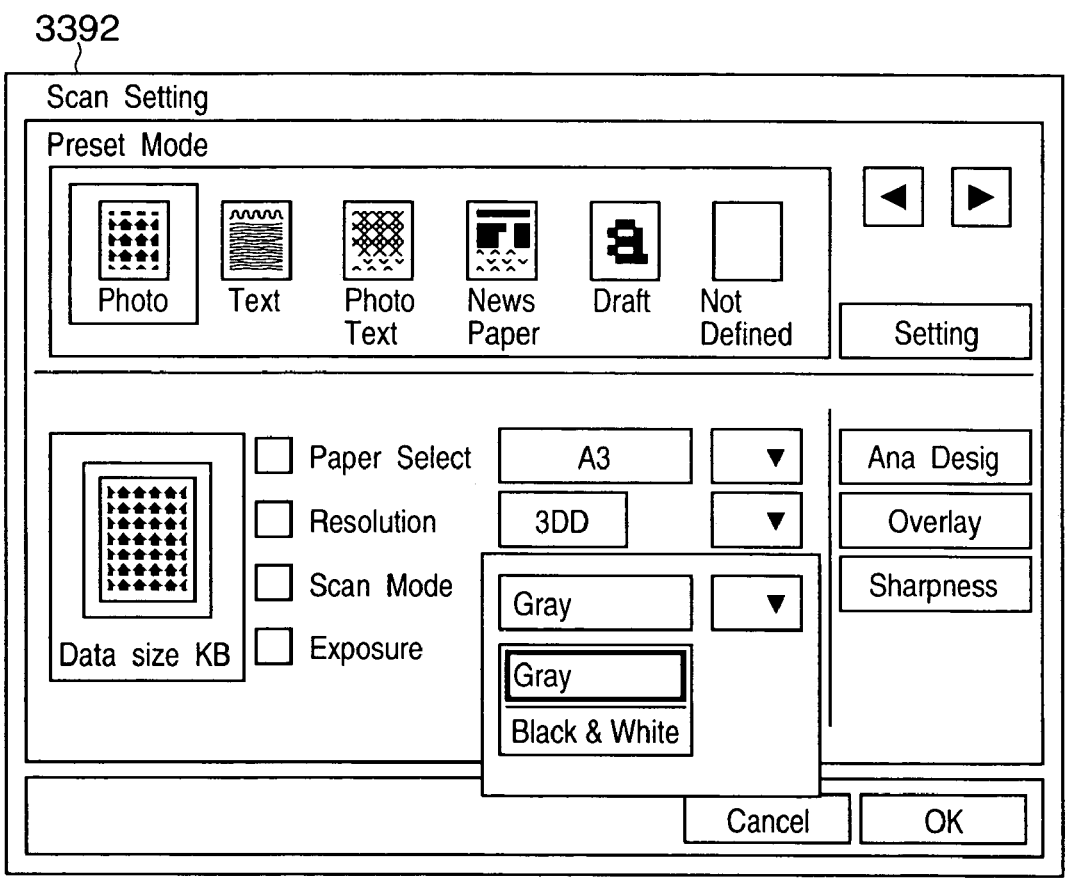
FIG. 46 shows a paper size select list displayed on the LCD display of the console shown in FIG. 3.

FIG. 46 shows the scan mode list 3392 displayed on the LCD display 3001 of the console 3000 shown in FIG. 3, and corresponds to a window in a state wherein the scan mode list is displayed as a pulldown window on the Scan Setting sub-window 3370. The user selects the scan mode used from this scan mode list.

[RETRIEVE Window]

Figure 47:
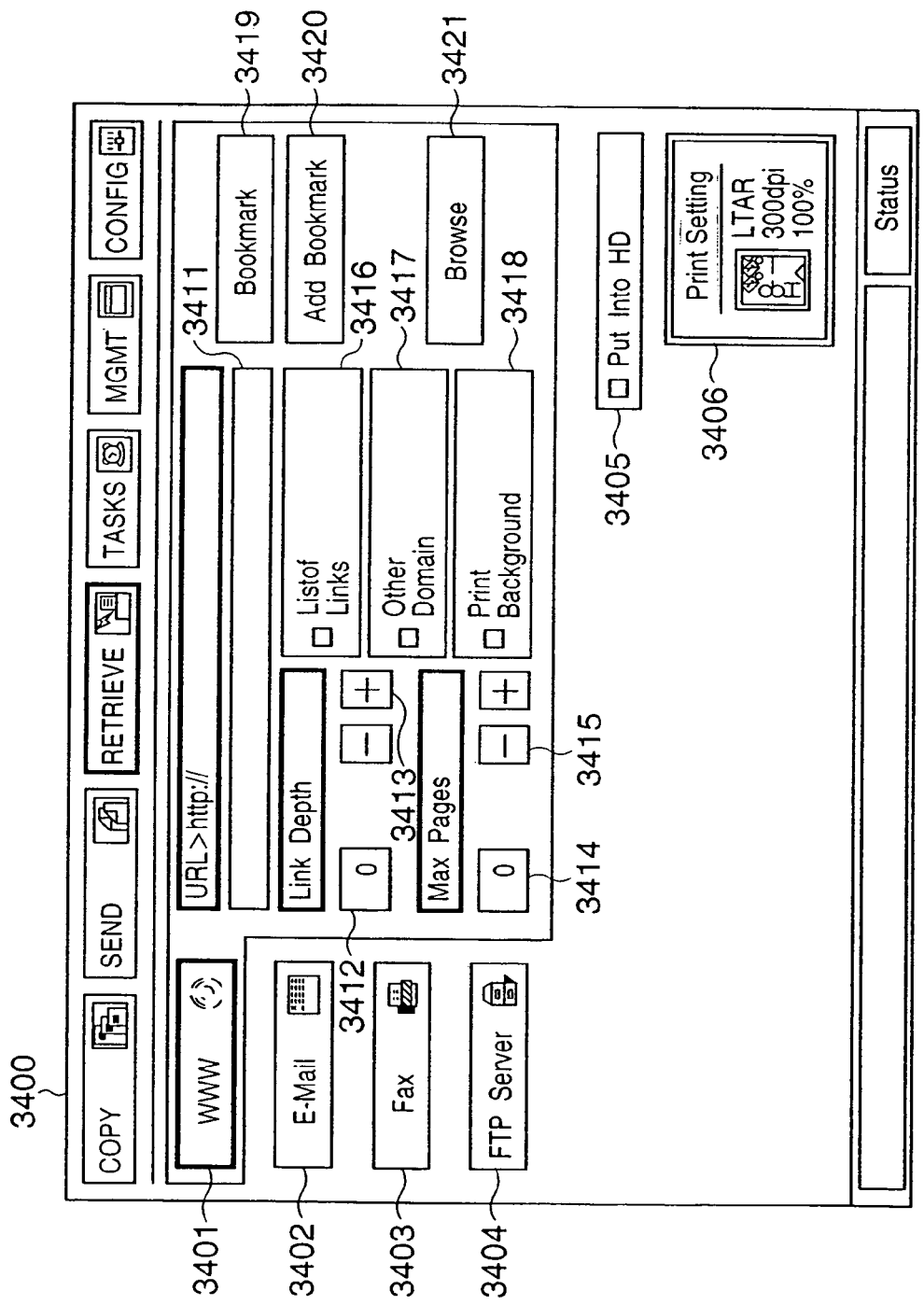
FIG. 47 shows a RETRIEVE main window displayed on the LCD display of the console shown in FIG. 3.

FIG. 47 shows a RETRIEVE main window (WWW sub-window) displayed on the LCD display 3001 of the console 3000 shown in FIG. 3.

Referring to FIG. 47, reference numeral 3400 denotes a RETRIEVE main window, which is displayed upon clicking the corresponding main tab (RETRIEVE 3013) shown in FIG. 14.

As shown in FIG. 47, the RETRIEVE main window 3400 displays a PUT INTO HD check button 3405 and PRINT SETTING button 3406, which are commonly used by WWW, E-mail, Fax, and FTP sub-tabs 3401, 3402, 3403, and 3404, and respective categories.

Upon clicking a given sub-tab (WWW 3401, E-mail 3402, Fax 3403, and FTP 3404 on the RETRIEVE main window 3400), a corresponding one of WWW, E-mail, Fax, and FTP sub-windows is displayed. In an initial state (including a reset state), the WWW sub-window is displayed, and the RETRIEVE main window 3400 shown in FIG. 47 displays the WWW sub-window.

Upon clicking the Put Into HD button 3405 common to the respective categories, the HD Setting sub-window 3330 shown in FIG. 39 is displayed. The function of this window is the same as that of the HD Setting sub-window of Send.

Figure 52:
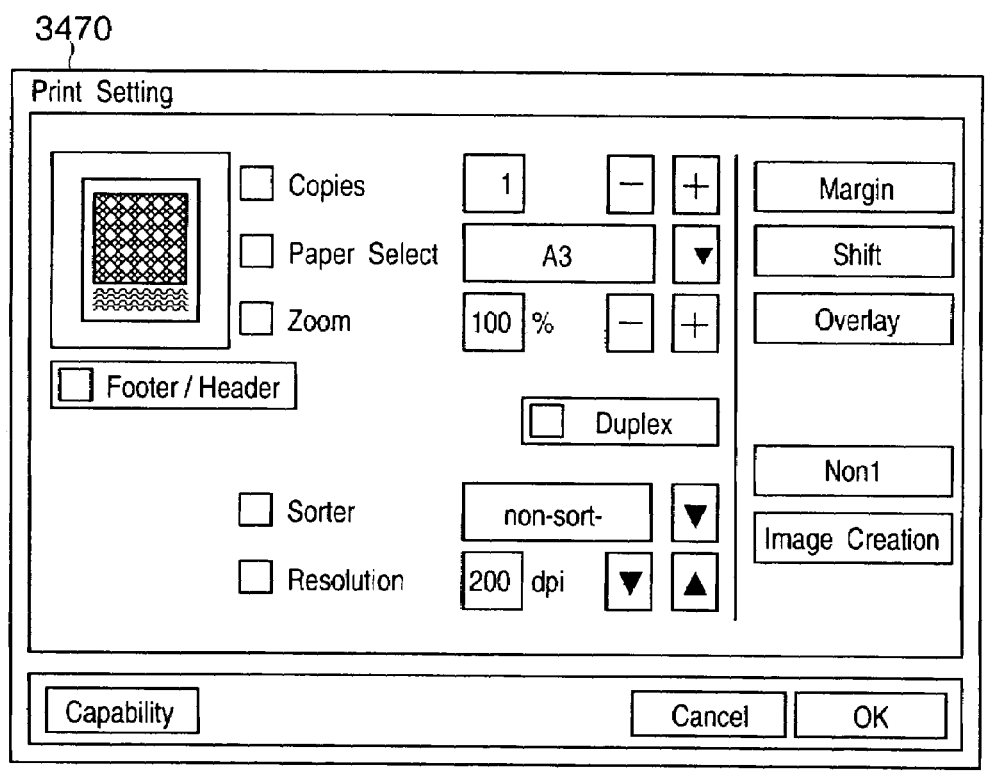
FIG. 52 shows a Print Setting sub-window displayed on the LCD display of the console shown in FIG. 3.

Upon clicking the Print Setting button 3406 common to the respective categories, a Print Setting sub-window 3470 shown in FIG. 52 is displayed. The function of this window is the same as that of the Print Out sub-window of Send.

[WWW Sub-window]

When the user presses the start button 3002 shown in FIG. 3 while the WWW sub-window is displayed, a home page is printed in accordance with settings displayed on the window. In this case, if the start button is pressed while no URL is displayed on a URL input area 3411, no function works.

Upon clicking the URL input area 3411 on the WWW sub-window, the full keyboard 3040 is displayed, and the user can directly input a URL. Upon clicking a Link Depth input area 3412 and Max Pages input area 3414, the ten-key pad 3050 shown in FIG. 34 is displayed, and the user can directly input numerical values.

Reference numeral 3413 denotes a Link Depth setting button, with which the user can set a Link Depth. Reference numeral 3414 denotes a Max Pages setting button, with which the user can set Max Pages.

Figure 48:
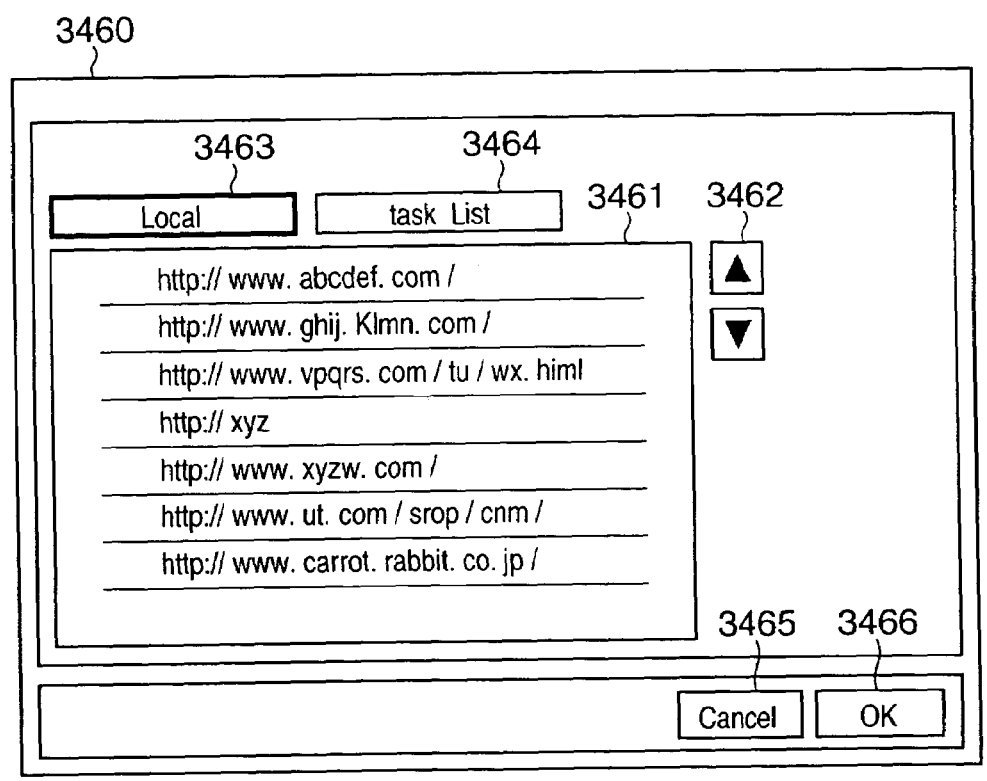
FIG. 48 shows a Bookmark sub-window displayed on the LCD display of the console shown in FIG. 3.

Upon clicking a Bookmark button 3419, a Bookmark sub-window 3460 shown in FIG. 48 is displayed.

[Bookmark Sub-window]

FIG. 48 shows the Bookmark sub-window 3460 displayed on the LCD display 3001 of the console 3000 shown in FIG. 3.

As shown in FIG. 48, a list of set bookmarks is displayed on a bookmark display area 3461 in the Bookmark sub-window 3460, and when the user clicks one of lines, the selected line is highlighted. When the user then clicks an OK button 3466, the Bookmark sub-window is closed, and a URL corresponding to the highlighted item is displayed on the URL input area of the WWW sub-window. A description of functions of other buttons in the Bookmark sub-window will be omitted.

[E-mail Sub-window]

Figure 49:
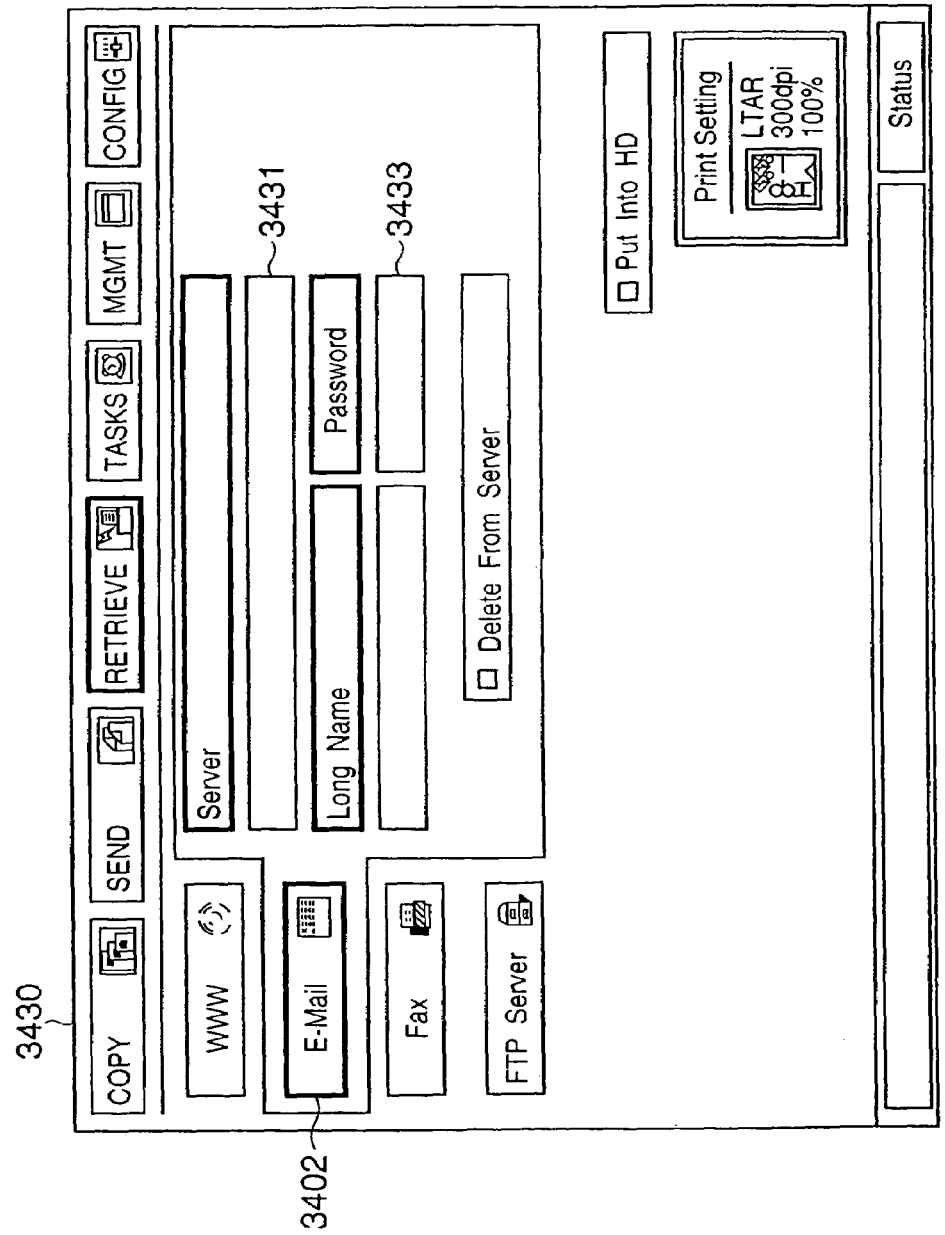
FIG. 49 shows an E-mail sub-window displayed on the LCD display of the console shown in FIG. 3.

FIG. 49 shows an E-mail sub-window displayed on the LCD display 3001 of the console 3000 shown in FIG. 3, and this sub-window is displayed upon clicking the corresponding sub-tab (E-mail 3402).

On the E-mail sub-window 3430, the user makes settings for receiving E-mails. Upon clicking each input area (a server input area 3431, Long Name input area 3432, and password input area 3433), the full keyboard 3040 shown in FIG. 33 is displayed to allow input.

[Fax Sub-window]

Figure 50:
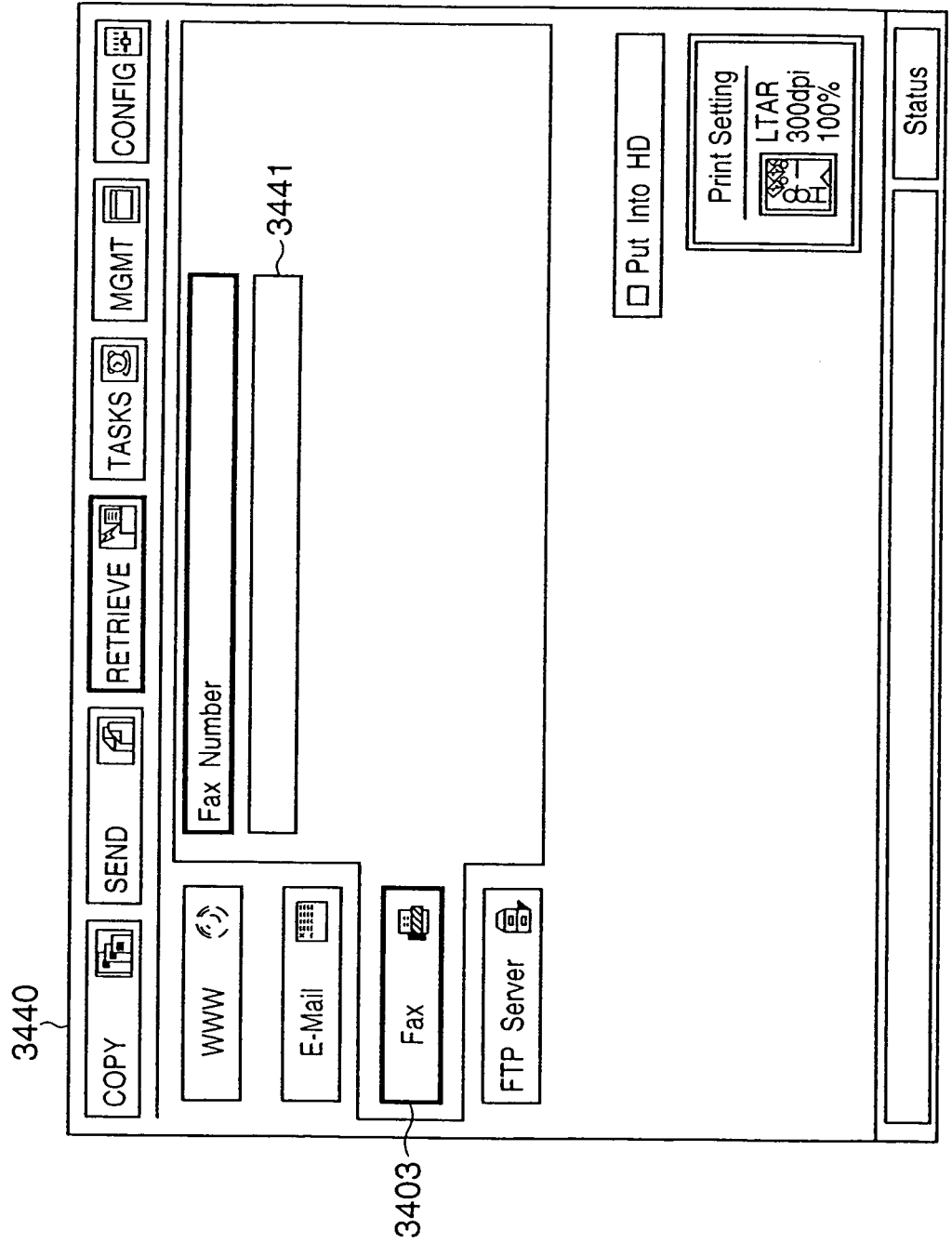
FIG. 50 shows a Fax sub-window displayed on the LCD display of the console shown in FIG. 3.

FIG. 50 shows a Fax sub-window displayed on the LCD display 3001 of the console 3000 shown in FIG. 3, and this sub-window is displayed upon clicking the corresponding sub-tab (Fax 3403).

Referring to FIG. 50, reference numeral 3440 denotes a Fax sub-window which is used to input a FAX number. Upon clicking an input area 3441, the ten-key pad 3050 shown in FIG. 34 is displayed to allow input of the FAX number.

[FTP Server Sub-window]

Figure 51:
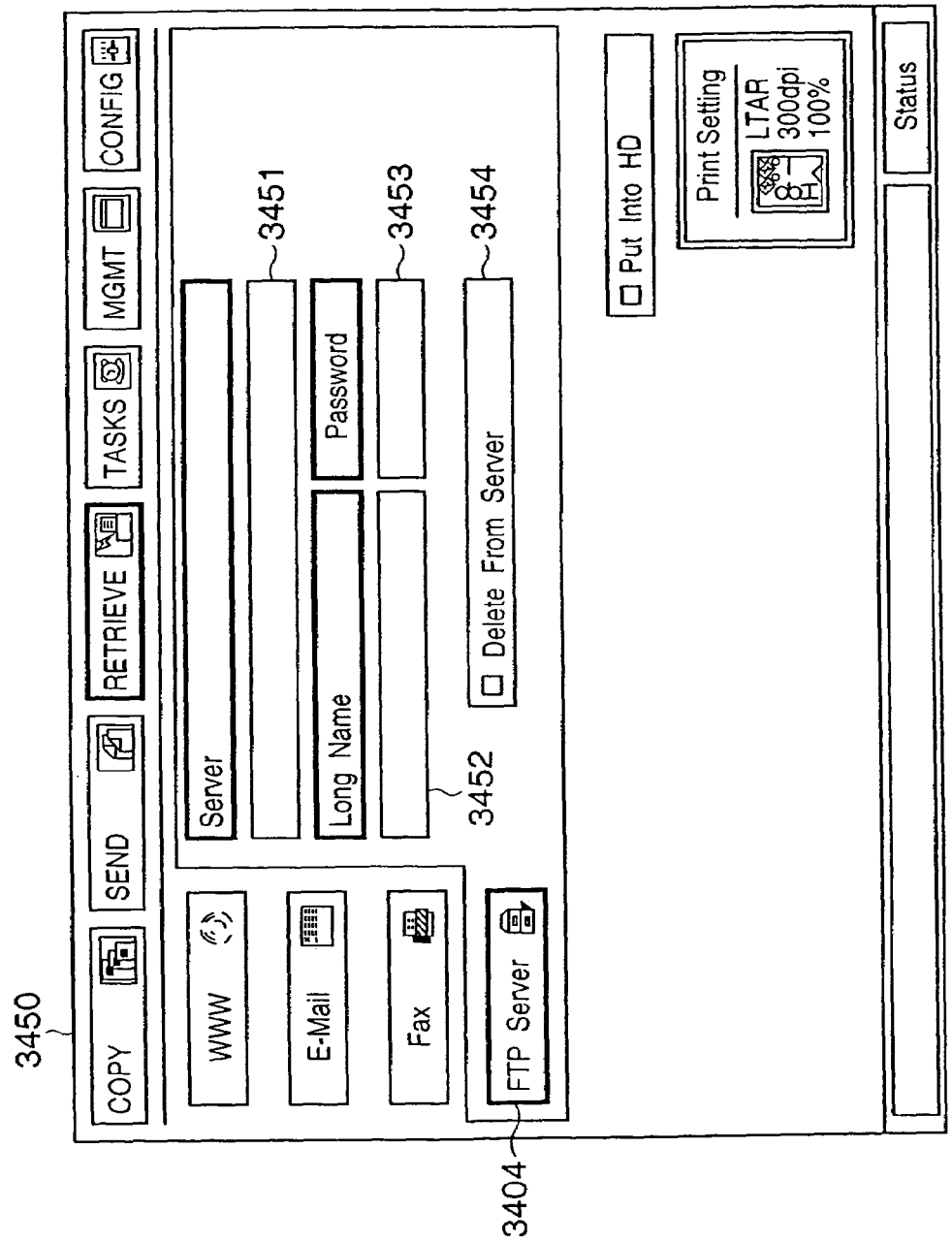
FIG. 51 shows an FTP Server sub-window displayed on the LCD display of the console shown in FIG. 3.

FIG. 51 shows an FTP Server sub-window displayed on the LCD display 3001 of the console 3000 shown in FIG. 3, and this sub-window is displayed upon clicking the corresponding sub-tab (FTP Server 3404).

In FIG. 51, reference numeral 3450 denotes an FTP Server sub-window, which is used to make setting for receiving data from a server.

Upon clicking each of input areas 3451 to 3453, the full keyboard 3040 shown in FIG. 33 is displayed to allow input.

[Print Setting Sub-window]

FIG. 52 shows the Print Setting sub-window 3470 displayed on the LCD display 3001 of the console 3000 shown in FIG. 3, and the function of this sub-window is the same as that of the Print Out sub-window (print out sub-window 3340 shown in FIG. 40) of Send.

[TASKS Window]

Figure 53:
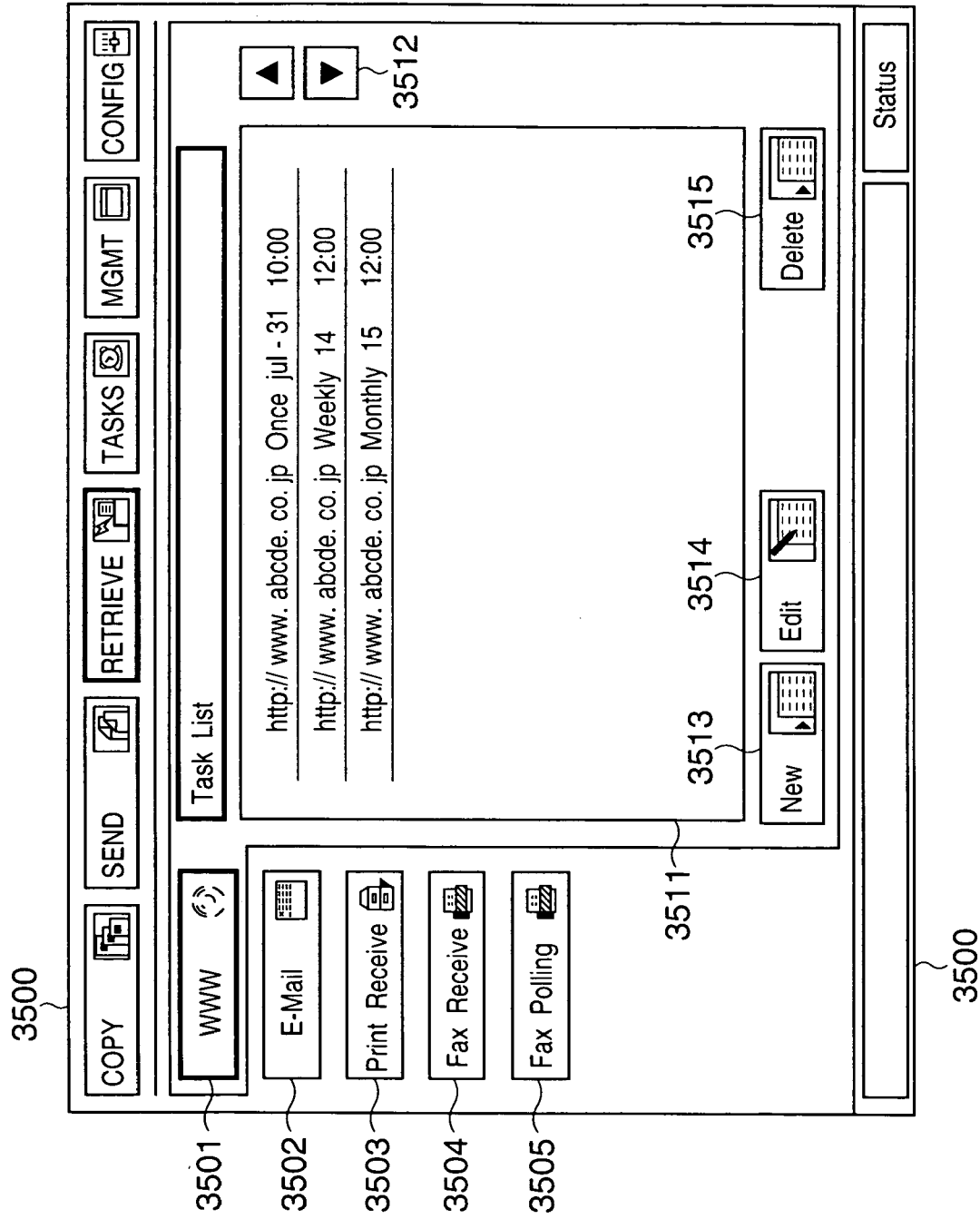
FIG. 53 shows a TASKS main window displayed on the LCD display of the console shown in FIG. 3.

FIG. 53 shows a TASKS main window displayed on the LCD display 3001 of the console 3000 shown in FIG. 3.

Referring to FIG. 53, reference numeral 3500 denotes a TASKS main window, which is displayed upon clicking the corresponding main tab (TASKS 3014) shown in FIG. 14.

When the user presses the start key 3002 shown in FIG. 3 while the TASKS main window 3500 is displayed, an automatic RETRIEVE operation is executed in accordance with parameters set on the TASKS main window 3500.

The TASKS main window 3500 displays WWW, E-mail, Print Receive, Fax Receive, and Fax Polling sub-tabs (3501, 3502, 3503, 3504, and 3505). In an initial state including a reset state, a WWW sub-window is displayed. This TASKS main window 3500 is also the WWW sub-window.

[WWW Sub-window]

On a WWW task list display area 3511, tasks held in the apparatus are displayed in the input order. The user adds select marks to tasks that must be executed in practice. Tasks without select marks are held in the apparatus as tasks but are not executed in practice.

Figure 54:
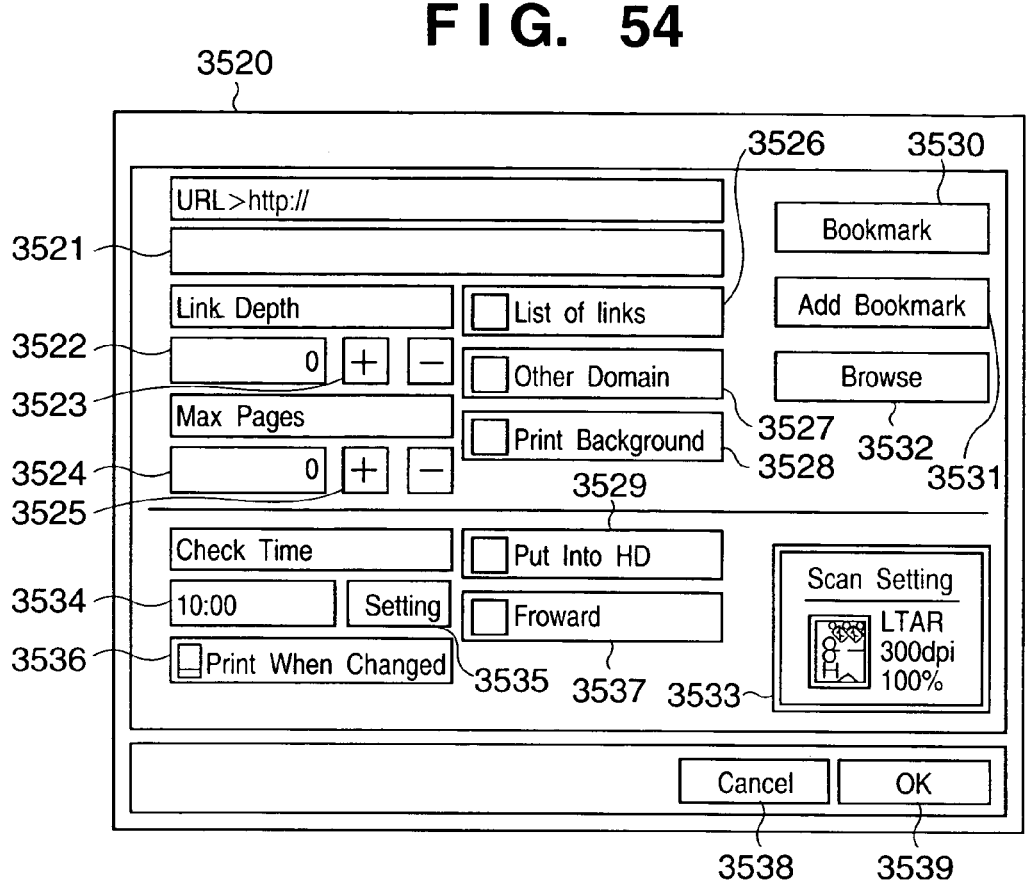
FIG. 54 shows a WWW task detailed sub-window displayed on the LCD display of the console shown in FIG. 3.

Upon clicking a New button 3513, a WWW task detailed sub-window 3520 shown in FIG. 54 is displayed to allow input of a new task. The WWW task detailed sub-window 3520 will be described later.

When the user clicks an Edit button 3514 while one task is selected from the WWW task list, the WWW task detailed sub-window 3520 (FIG. 54) that includes the selected task information is displayed, and the user can edit settings.

When the user clicks a Delete button 3515 while one task is selected from the WWW task list, the selected task is deleted.

[WWW Task Detailed Sub-window]

FIG. 54 shows the WWW task detailed sub-window 3520 displayed on the LCD display 3001 of the console 3000 shown in FIG. 3.

As shown in FIG. 54, the WWW task detailed sub-window 3520 displays components 3521 to 3533 having functions common to those on the RETRIEVE main window (WWW sub-window) shown in FIG. 47, a check time display area 3534, a check time setting button 3535, a PRINT WHEN CHANGED check button 3536, a transfer check button 3537, an OK button 3539, and a cancel button 3538. Note that a description of the components common to those on the RETRIEVE main window (WWW sub-window) will be omitted.

The check time display area 3534 has no entry when the WWW task detailed sub-window is displayed upon clicking the New button, and displays a set task execution time when the sub-window is displayed upon clicking the Edit button. Immediately after settings are made on a check time sub-window shown in FIGS. 55 to 57 (to be described later), the set task execution time is displayed.

Upon clicking the check time setting button 3535, the check time sub-window shown in FIGS. 55 to 57 (to be described below) is displayed, and the user can set the task execution timing.

[Check Time Sub-window]

Figure 55:
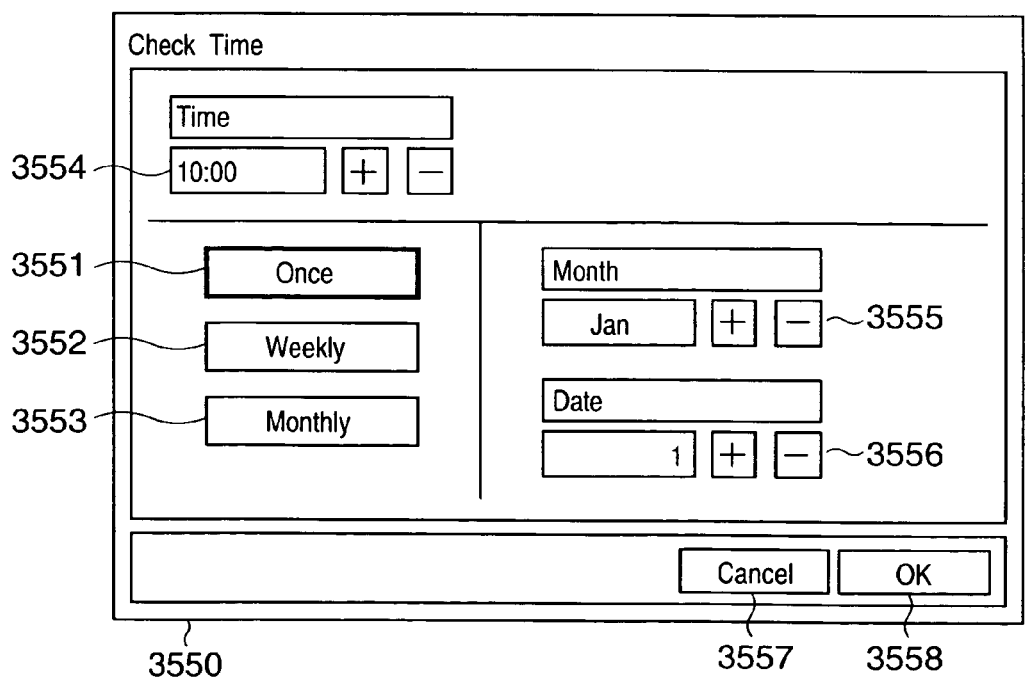
FIG. 55 shows a check time sub-window displayed on the LCD display of the console shown in FIG. 3.
Figure 56:
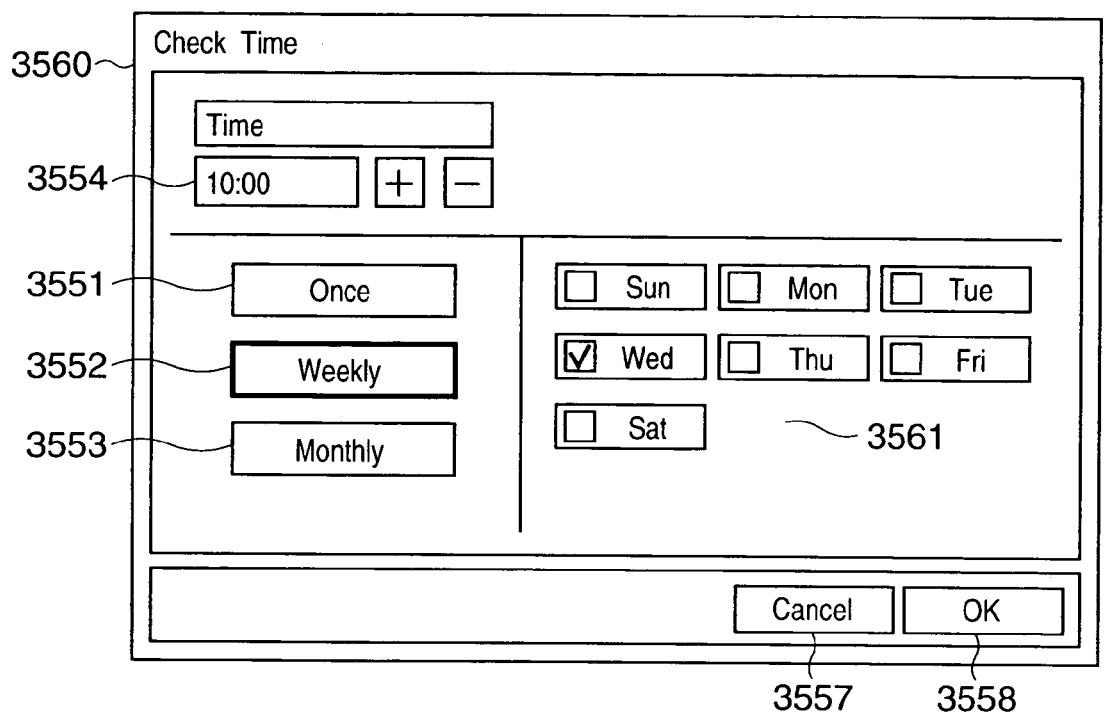
FIG. 56 shows a check time sub-window displayed on the LCD display of the console shown in FIG. 3.
Figure 57:
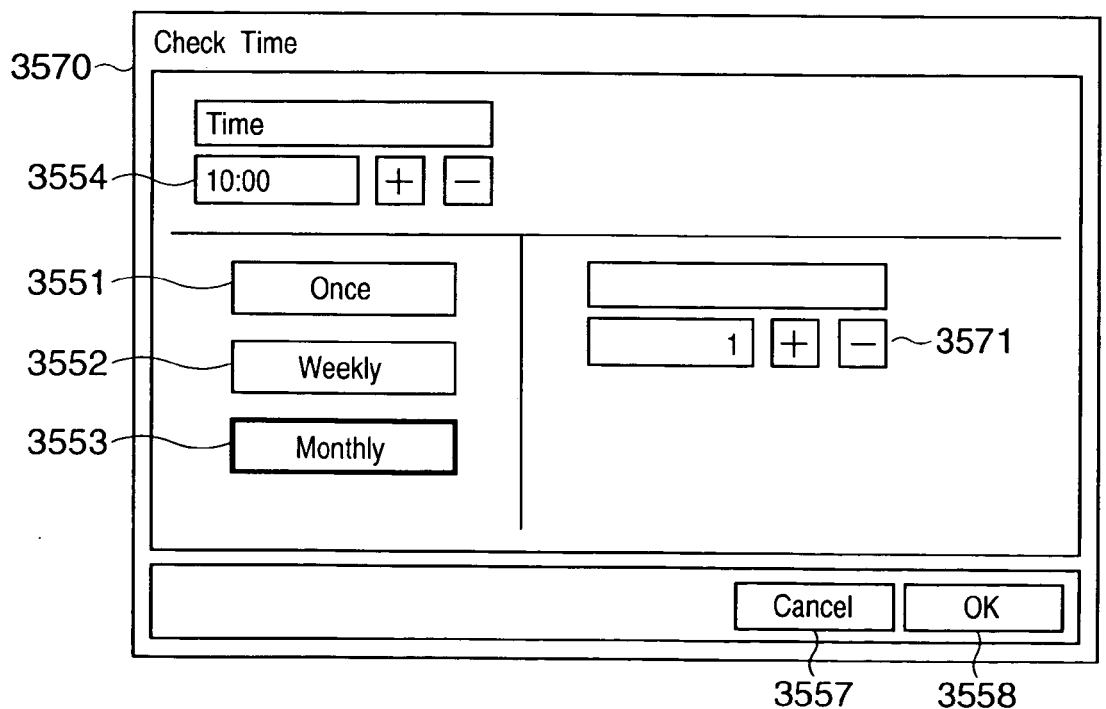
FIG. 57 shows a check time sub-window displayed on the LCD display of the console shown in FIG. 3.

FIGS. 55 to 57 show check time sub-windows displayed on the LCD display 3001 of the console 3000 shown in FIG. 3.

As shown in FIGS. 55 to 57, check time sub-windows 3550, 3560, and 3570 display schedule mode setting buttons (Once button 3551, Weekly button 3552, and Monthly button 3553), a time input area 3554, an OK button 3558, and a cancel button 3557. In addition, when the Once button 3551 of the schedule mode setting buttons is selected, a month input area 3555 and date input area 3556 are displayed, as shown in the check time sub-window (Once) 3550 in FIG. 55. Upon selection of the Weekly button 3552, day-of-the-week setting check buttons 3561 are displayed, as shown in the check time sub-window (Weekly) 3560 in FIG. 56. Upon selection of the Monthly button 3553, a date input area 3571 is displayed, as shown in the check time sub-window (Monthly) 3570 in FIG. 57.

Upon clicking each input area, the ten-key pad 3050 shown in FIG. 34 is displayed to allow input of numerical values. The day-of-the-week setting check buttons allow selection of a plurality of days of the week.

[Management Window]

Figure 58:
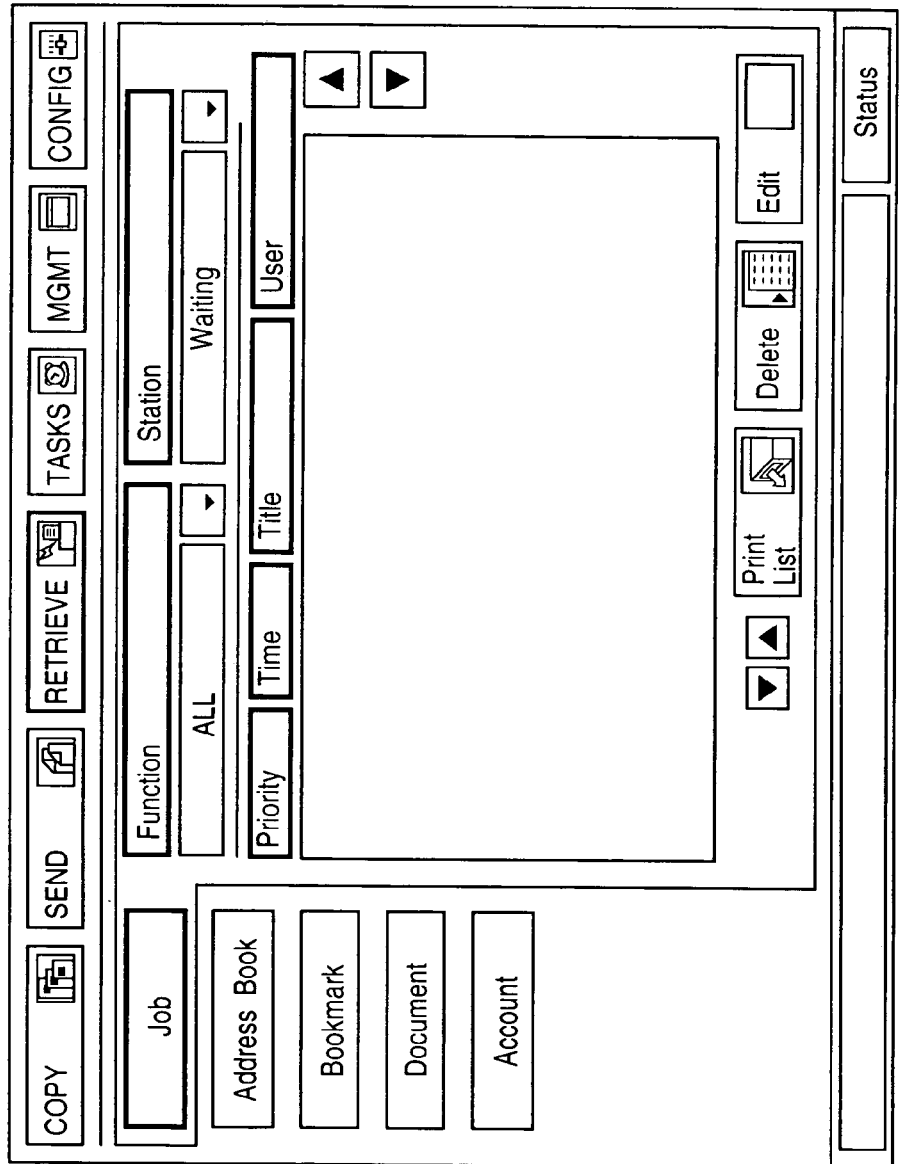
FIG. 58 shows a Management main window displayed on the LCD display of the console shown in FIG. 3.

FIG. 58 shows a Management window displayed on the LCD display 3001 of the console 3000 shown in FIG. 3.

Referring to FIG. 58, reference numeral 3600 denotes a Management window which is displayed upon clicking the corresponding main tab (MGMT 3015) shown in FIG. 14. Note that a detailed description of this window will be omitted.

[Configuration Window]

Figure 59:
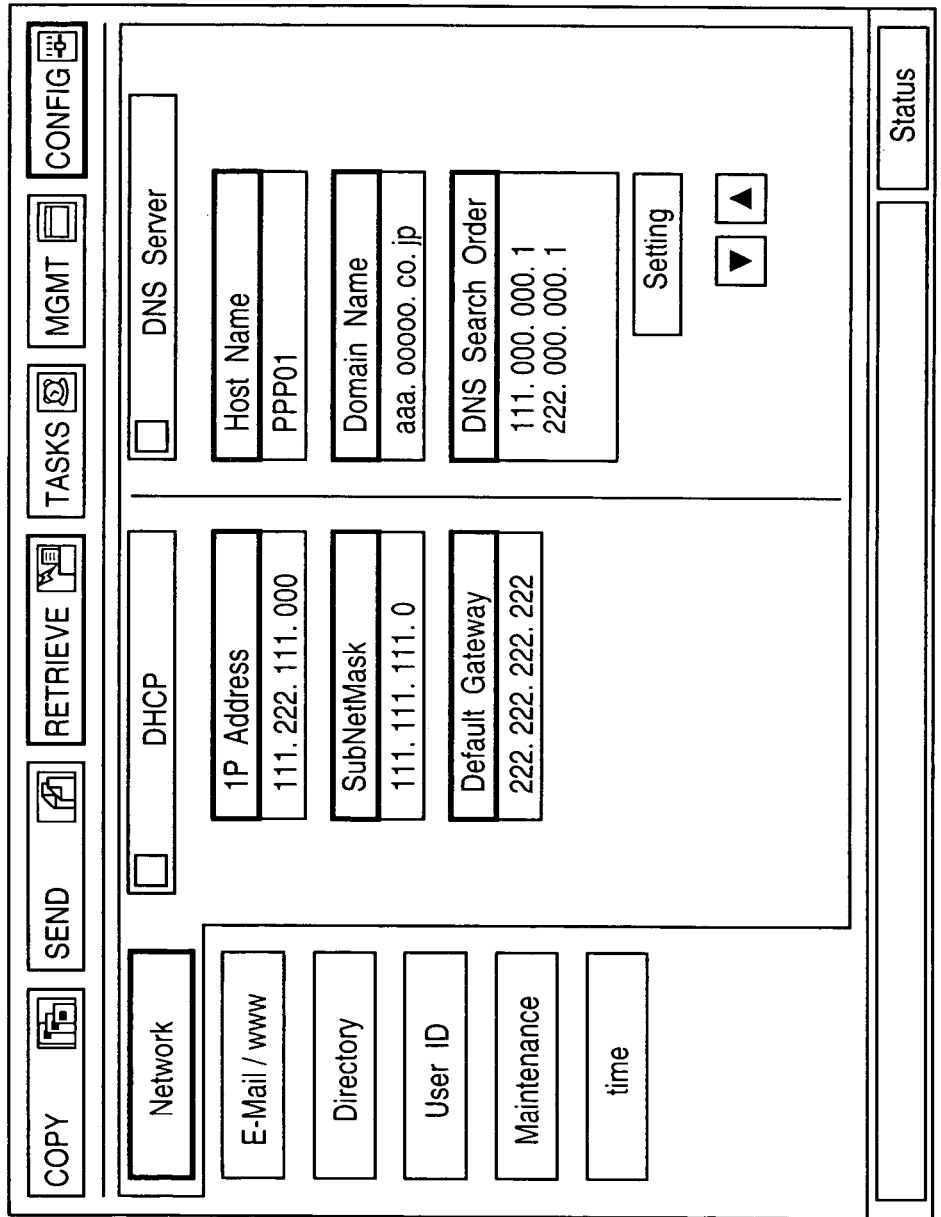
FIG. 59 shows a Configuration main window displayed on the LCD display of the console shown in FIG. 3.

FIG. 59 shows a Configuration window displayed on the LCD display 3001 of the console 3000 shown in FIG. 3.

Referring to FIG. 59, reference numeral 3700 denotes a Configuration window which is displayed upon clicking the corresponding main tab (CONFIG 3016) shown in FIG. 14. Note that a detailed description of this window will be omitted.

[Error Window]

Figure 60:
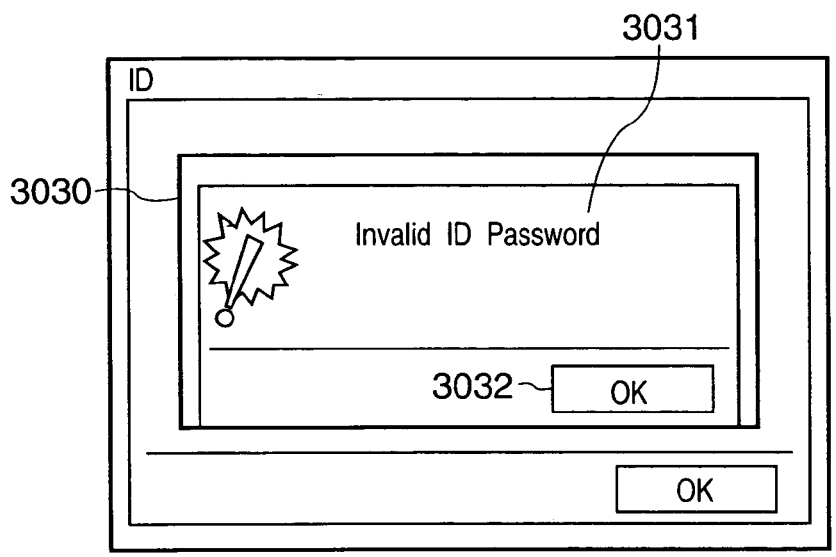
FIG. 60 shows an error window displayed on the LCD display of the console shown in FIG. 3, which is displayed when some error has occurred.

FIG. 60 shows an error window displayed on the LCD display 3001 of the console 3000 shown in FIG. 3, and this window is displayed when some error has occurred.

As shown in FIG. 60, an error window 3030 includes a message display area 3031 for displaying an error message using text, and an OK button 3032 for closing the error window. Note that this error window corresponds to an error that has occurred in response to an input on the ID input window shown in FIG. 15.

[Device Information Service (DIS)]

The image processing apparatus of the present invention defines a database which holds setting values, functions of devices (scanner, printer, and the like) status, charge information, and the like for jobs in data format, and an interface with that database as Device Information Service (to be abbreviated as DIS hereinafter) in the controller unit.

Figure 61:
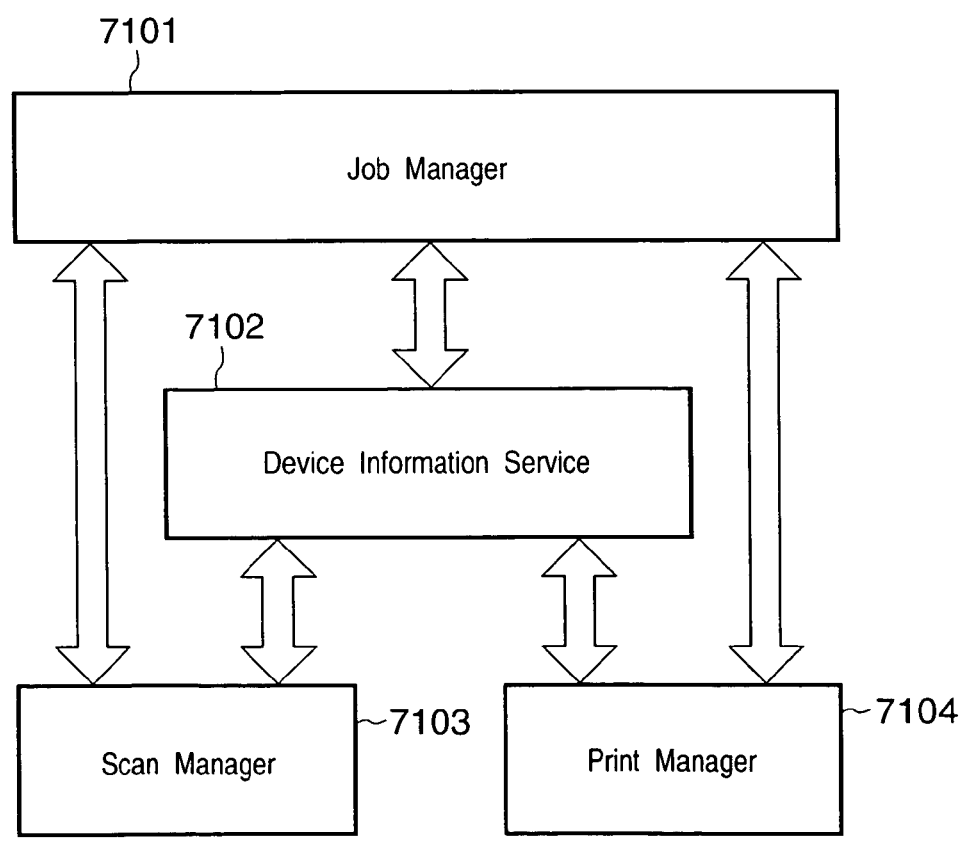
FIG. 61 is a diagram showing exchanges among a DIS, job manager, and document managers such as scan manager, print manager, and the like in the image processing apparatus to which the present invention can be applied.

FIG. 61 shows exchanges among the DIS, a job manager, and document managers such as scan manager, print manager, and the like in the image processing apparatus to which the present invention can be applied.

Referring to FIG. 61, reference numeral 7102 denotes a DIS; 7101, a job manager (JobManager); 7103, a scan manager (ScanManager) as a document manager for scan; and 7104, a print manager (PrintManager) as a document manager for print.

Basically, dynamic information such as a start command or the like of a job is directly instructed from the job manager 101 to the respective document managers (scan manager 7103 and print manager 7104), and static information such as a device function, job contents, or the like is obtained by referring to the DIS 7102. Static information, dynamic information, and events from each document manager are sent to the job manager 7101 via the DIS 7102.

When each document manager sets or retrieves data in or from the database of the DIS 7102, since the internal data format of the DIS 7102 complies with the Control API, a mutual conversion process between the data format complying with the Control API and a data format that each document manager can interpret is done.

For example, when each document manager sets status data, data unique to a device is interpreted, and is converted into corresponding data defined by the Control API, and the converted data is written in the database of the DIS 7102.

When the job manager 7101 sets or retrieves data in or from the database of the DIS 7102, no data conversion takes place between the job manager 7101 and DIS 7102.

The DIS 7102 updates event data on the basis of various kinds of event information sent from the document managers.

Figure 62:
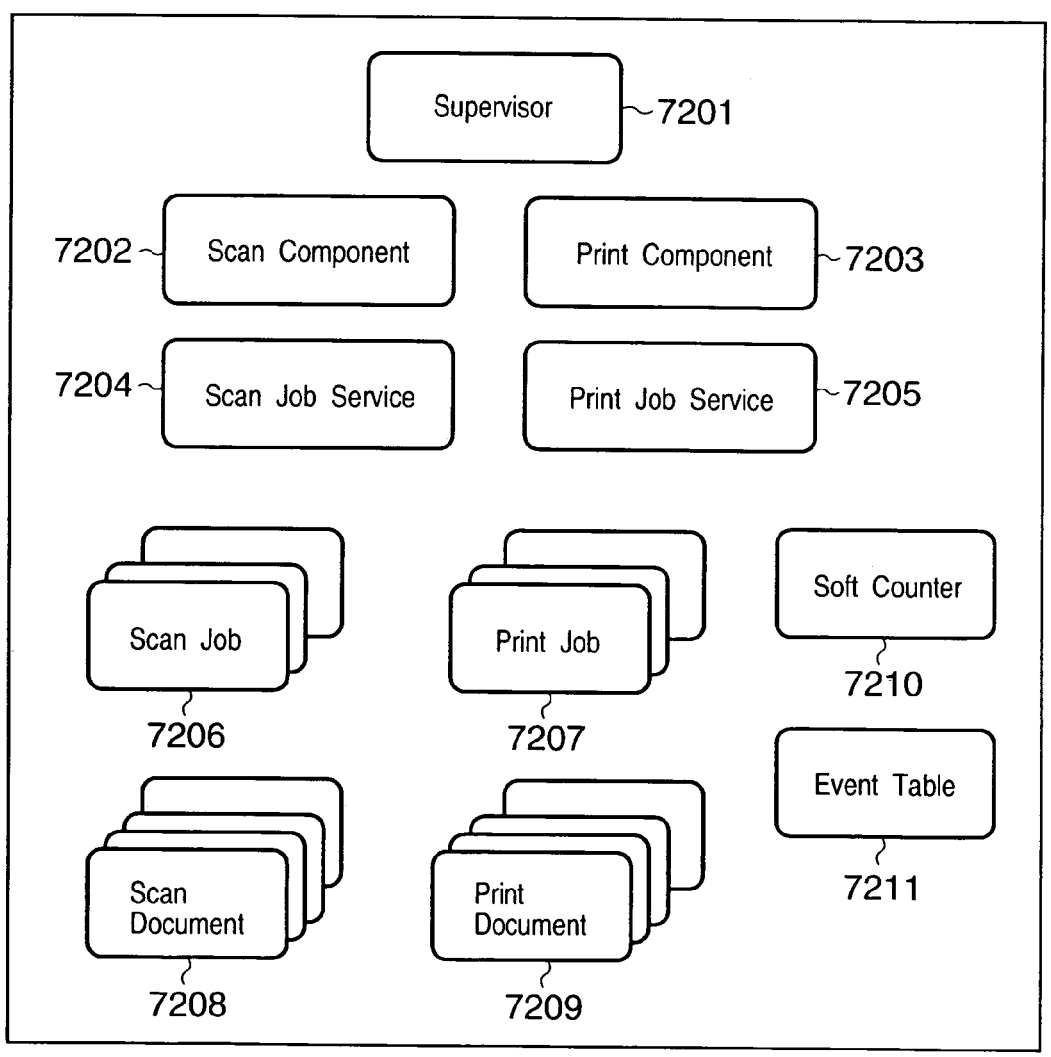
FIG. 62 shows various databases (to be abbreviated as DBs hereinafter) held in the DIS shown in FIG. 61.

FIG. 62 shows various databases (to be abbreviated as DBs hereinafter) held in the DIS 7102 shown in FIG. 61, and the respective DBs will be explained below. Note that the round-corner rectangles in FIG. 62 represent the individual DBs.

In FIG. 62, reference numeral 7201 denotes a supervisor DB (SupervisorDB), which holds status and user information for the entire apparatus, and information such as the user ID, password, and the like that must be backed up is stored in a nonvolatile storage device such as an HD device, backup memory, or the like.

Reference numeral 7202 denotes a scan component DB (Scan ComponentDB); and 7203, print component DB (Print ComponentDB). These component DBs are held in correspondence with existing components.

For example, an apparatus comprising only a printer has a print component DB alone, and an apparatus comprising a FAX holds a FAX component DB. Upon initializing each component DB, the corresponding document manager sets functions and status of that component.

Reference numeral 7204 denotes a scan job service DB (Scan job ServiceDB); and 7205, a print job service DB (Print job ServiceDB). Upon initializing such job service DB, the corresponding document manager sets functions that the apparatus can use and the support state of these functions as in the component DBs.

Job DBs (JobDB) and document DBs (DocumentDB) will be explained below.

Reference numeral 7206 denotes a scan job DB (ScanJobDB); 7207, a print job DB (PrintJobDB); 7208, a scan document DB (Scan DocumentDB); and 7209, a print document DB (Print DocumentDB).

The job and document DBs are dynamically assured and initialized by the job manager 7101 every time a job and corresponding document are generated, and required items are set.

Each document manager reads out items required for a process from the job and document DBs before the beginning of the job process, and then starts the job.

After that, upon completion of the job, the DBs of the job and corresponding document are released. Since the job has one or more documents, a plurality of document DBs are often assured for a given job.

Reference numeral 7210 denotes a soft counter (Soft Counter), which is a database for holding event information sent from each document manager. Reference numeral 7211 denotes an event table (Event Table), which is a counter table for recording scan and print counts of the apparatus.

Events sent from the document managers include status transition of a component, scan process operation end, and various errors from the scan manager 7103, and status transition of a component, print process operation end, paper jam, paper cassette open, and the like from the print manager 7104, and event IDs for identifying the individual events are determined in advance.

When each document manager has issued an event, the DIS 7102 registers the issued event ID and detailed data of that event if necessary in the event table 7211. When each document manager informs the DIS of release of an event, the DIS deletes the released event data from the event table 7211.

When the job manager 7101 performs event polling, the DIS 7102 looks up the event table 7211 to send back the currently generated event ID and its detailed data to the job manager 7101, or to send back a message indicating that no event is generated currently.

If a scan or print process operation end event is received, the counter value of the user who scanned or printed is updated. This software counter is written back to a nonvolatile storage device such as a backed-up memory device or HD device every time its value is updated, so as to prevent the value from being lost due to inadvertent shutoff of a power supply.

[Scan Operation]

Details of the scan operation of the image processing apparatus to which the present invention can be applied will be described below with reference to FIGS. 63 to 65.

Figure 63:
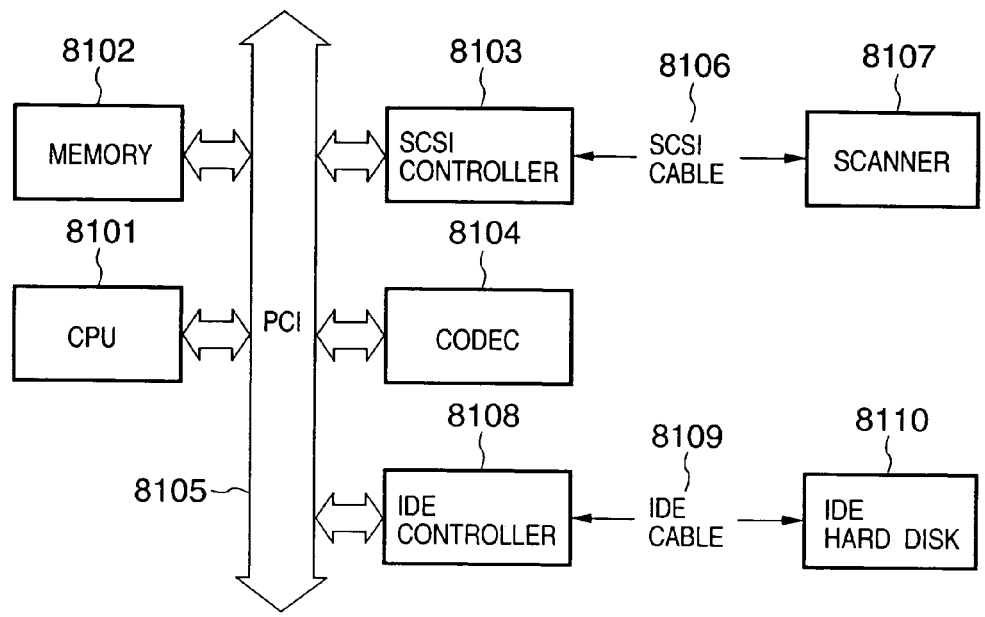
FIG. 63 is a block diagram for explaining an example of the hardware arrangement that pertains to a scan operation in the image processing apparatus to which the present invention can be applied.

FIG. 63 is a block diagram for explaining an example of the hardware arrangement that pertains to the scan operation in the image processing apparatus to which the present invention can be applied.

As shown in FIG. 63, a CPU 8101, memory (Memory) 8102, image compression/expansion board (CODEC) 8104, and SCSI I/F circuit (SCSI Controller) 8103 for providing an I/F that connects a scanner (Scanner) 8107 and this system are connected to a PCI bus 8105.

The SCSI I/F circuit 8103 and the scanner (or a scanner function unit of a copying machine having a hybrid function) 8107 are connected via a SCSI interface cable (SCSI Cable) 8106. An IDE controller (IDE Controller) 8108 is connected to the PCI bus 8105, and is connected to an IDE hard disk (IDE Hard Disk) 8110 via an IDE interface cable (IDE cable) 8109.

Figure 64:
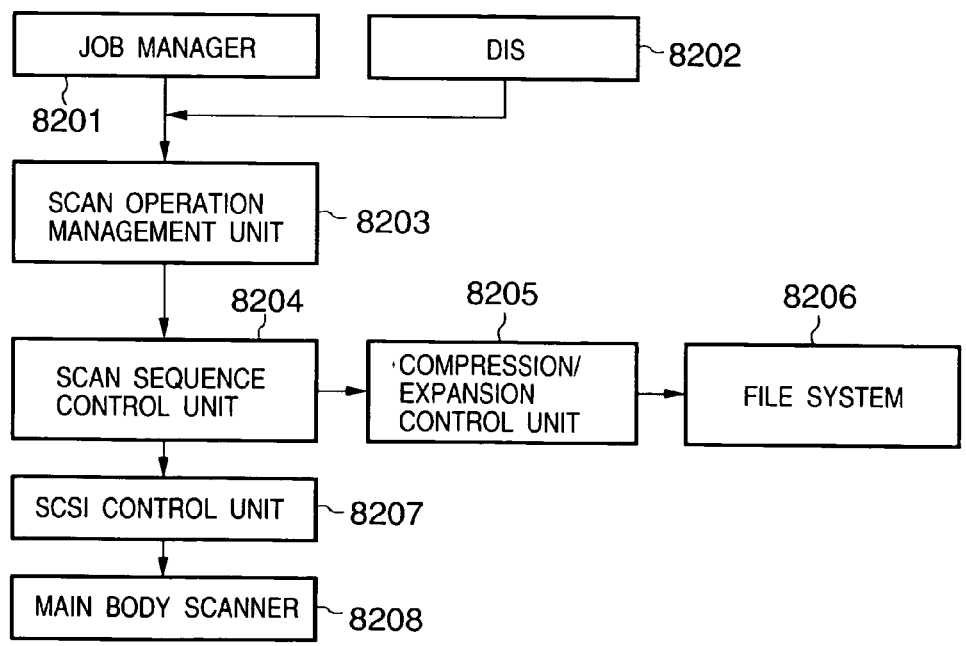
FIG. 64 is a block diagram for explaining an example of the software arrangement that pertains to a scan operation in the image processing apparatus to which the present invention can be applied.

FIG. 64 is a block diagram showing an example of the software arrangement that pertains to the scan operation of the image processing apparatus to which the present invention can be applied.

As shown in FIG. 64, reference numeral 8201 denotes a job manager (Job Manager) which has a function of categorizing and saving requests on the application level. Reference numeral 8202 denotes a DIS which saves parameters required for the scan operation from the application level. Requests from the application are saved in the memory 8102.

Reference numeral 8203 denotes a scan operation management unit for retrieving information required for the scan operation from the job manager 8201 and DIS 8202.

The scan operation management unit 8203 receives table data 8301 of a job number 8303 and document number 8304 (FIG. 65; to be described later) from the job manager 8201, and receives scan parameters 8302 from the DIS 8202 on the basis of the table data 8301 of the job number 8303 and document number 8304. In this way, the scan operation is executed under scan conditions requested from the application.

The scan operation management unit 8203 passes the scan parameters 8302 retrieved from the DIS 8202 to a scan sequence control unit 8204 in the order of document numbers. Upon receiving the scan parameters 8302, the scan sequence control unit 8204 controls a SCSI control unit 8207 in accordance with the contents of a scan image attribute 8308.

In this manner, the SCSI controller 8103 connected to the CPI bus 8105 shown in FIG. 63 operates, and sends SCSI control commands to the scanner 8107 via the SCSI interface cable 8106, thus executing the scan operation.

A scanned image is transferred to the SCSI controller 8103 via the SCSI interface cable 8106, and is stored in the memory 8103 via the PCI bus 8105. When the scan operation is complete and the image is stored in the memory 8102 via the PCI bus 8105, the scan sequence control unit 8204 issues a request to a compression/expansion control unit 8205 to compress the scanned image stored in the memory 8102 in accordance with the contents of a scan image compression format 8309 of the scan parameters 8302.

Upon receiving the request, the compression/expansion control unit 8205 compresses the image using the CODEC 8104 connected to the PCI bus 8105 in accordance with designation of the scan image compression format 8309 from the scan sequence control unit 8204. The compression/expansion control unit 8205 stores the compressed image in the memory 8102 via the PCI bus 8105.

When the compression/expansion control unit 8205 compresses the scanned image to a format designated by the scan image compression format 8309 and stores the compressed image in the memory 8102, the scan sequence control unit 8204 converts the compressed scanned image stored in the memory 8102 into a file in accordance with an image file type 8307 of the scan parameters 8302.

The scan sequence control unit 8204 requests a file system 8206 to convert the image into a file in a file format designated by the image file type 8307 of the scan parameters 8302.

The file system 8206 converts the compressed image stored in the memory 8102 into a file in accordance with the image file type 8307 from the scan sequence control unit 8204, transfers the converted file to the IDE controller 8108 via the PCI bus 8105, and then transfers it to the IDE hard disk 8110 via the IDE interface cable 8109, thus converting the compressed scanned image into a file.

When the file system 8206 stores the image file in the IDE hard disk 8110, the scan sequence control unit 8204 determines that a process for one document on the scanner 8107 is complete, and sends back a scan end message to the scan operation management unit 8203.

At this time, when a document to be scanned still remains on the scanner 8107 and a scan request from the job manager 8201 is present, the scan sequence control unit is requested to start the scan operation using the scan parameters 8302 stored in the DIS 8202.

When no document to be scanned remains on the scanner 8107 or no scan request from the job manager 8201 is present, it is determined that the scan operation is complete, and a scan end message is issued to the job manager 8201.

Figure 65:
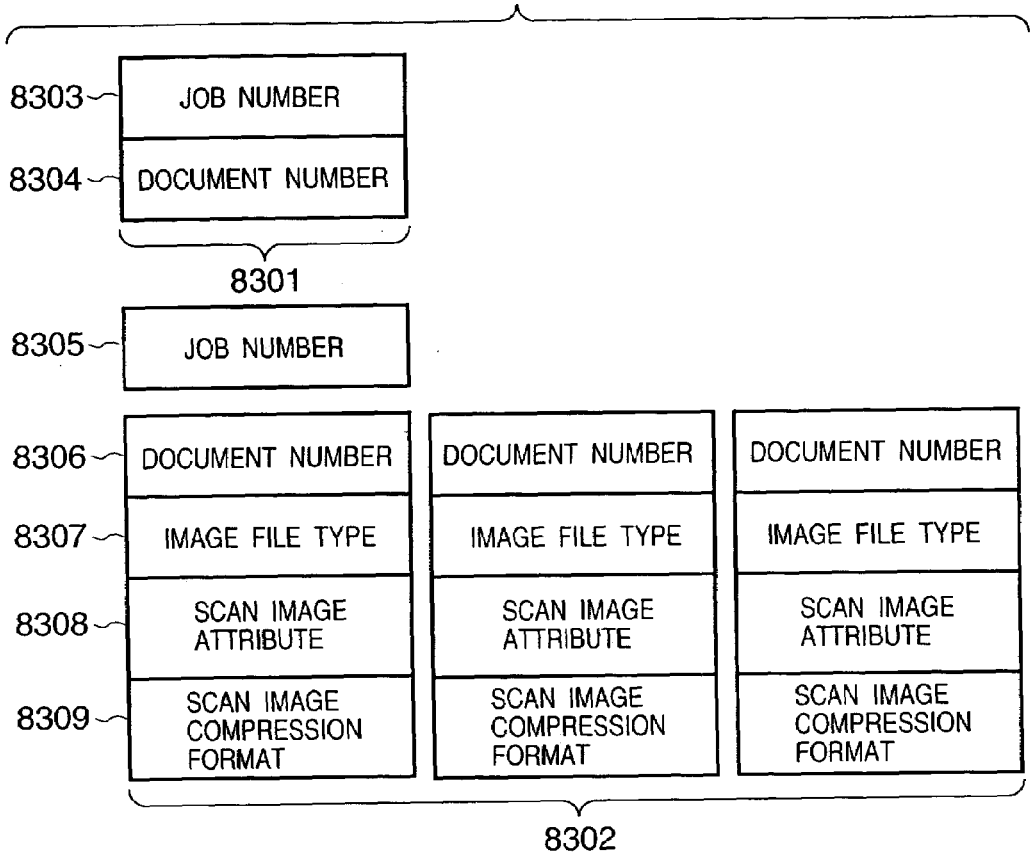
FIG. 65 shows a parameter table that pertains to a scan operation of the image processing apparatus to which the present invention can be applied.

FIG. 65 shows the parameter table that pertains to the scan operation of the image processing apparatus to which the present invention can be applied.

Referring to FIG. 65, the table data 8301 include the job number 8303 and document number 8304.

The scan parameters 8302 include a job number 8305, a document number 8306, the image file type 8307, the scan image attribute 8308, and the scan image compression format 8309.

[Print Operation]

Details of the print operation of the image processing apparatus to which the present invention can be applied will be explained below with reference to FIGS. 66 to 69.

Figure 66:
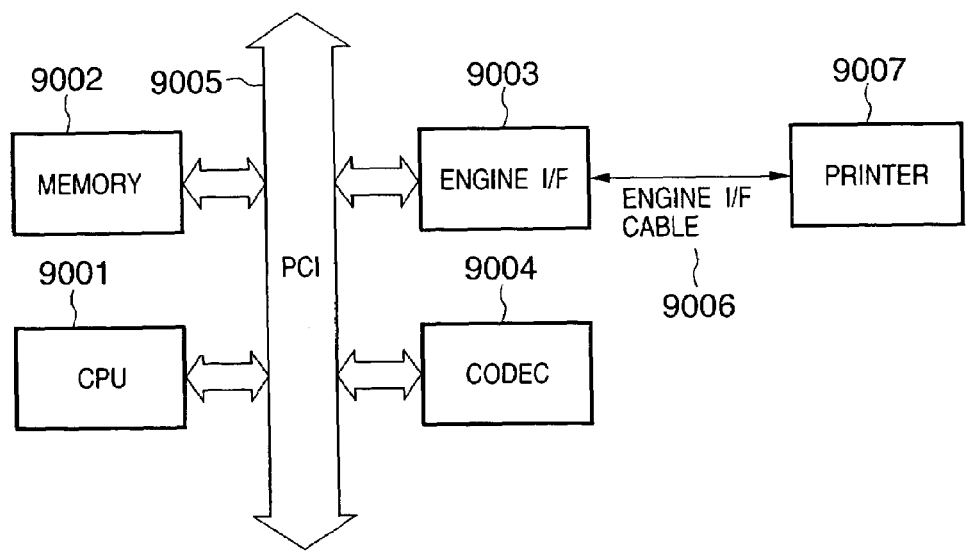
FIG. 66 is a block diagram showing an example of the hardware arrangement that pertains to a print operation in the image processing apparatus to which the present invention can be applied.

FIG. 66 is a block diagram showing an example of the hardware arrangement that pertains to the print operation in the image processing apparatus to which the present invention can be applied.

In FIG. 66, a CPU 9001, memory (Memory) 9002, image compression/expansion board (CODEC) 9004, and engine interface board (Engine I/F) 9003 for providing an I/F that connects a printer (Printer) 9007 and this system are connected to a PCI bus 9005. The engine interface board 9003 and printer (or a printer function unit of a copying machine having a hybrid function) 9007 are connected via an engine interface cable (Engine I/F cable) 9006.

The engine interface board 9003 has an internal DPRAM. The engine interface board 9003 sets parameters in the printer, reads out printer status, and exchanges print control commands via the OPRAM.

This board has a video (Video) controller, which sends image data rasterized on the PCI bus 9005 to the printer 9007 via the engine interface cable 9006 in synchronism with VCLK (Video Clock) and HSYNC signals supplied from the printer via the engine interface cable 9006.

Figure 67:
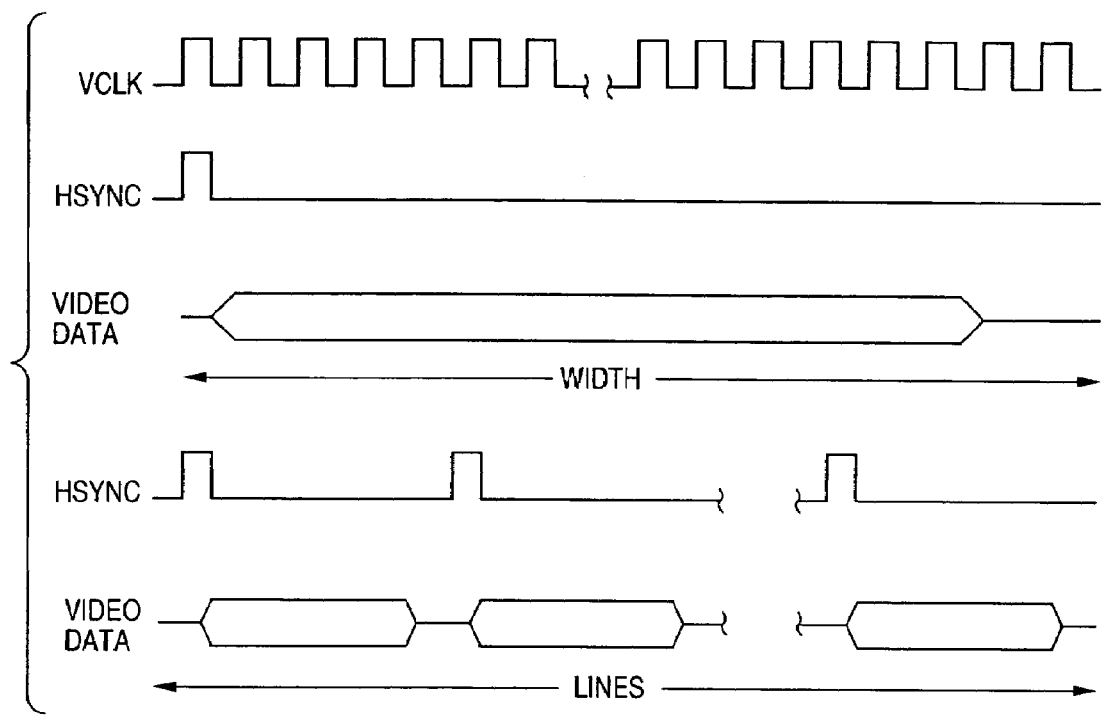
FIG. 67 is a timing chart showing the image data send timing of the image processing apparatus to which the present invention can be applied.

FIG. 67 shows the send timings of these signals.

FIG. 67 is a timing chart showing the image data send timings of the image processing apparatus to which the present invention can be applied.

As shown in FIG. 67, the VCLK signal is successively output, and the HSYNC signal is supplied in synchronism with start of one line of the printer. The video controller reads out data for the set image width (WIDTH) from a memory (SOURCE) on the PCI bus 9005, and outputs the readout data as a Video signal to the engine interface cable 9006. After the video controller repeats this process in correspondence with designated lines (LINES), it generates an IMAGE_END interrupt.

As described above, when an application program on the CPU 9001 passes a print job instruction to the Control API, the Control API passes it as a job to the job manager 7101 on the controller level.

Furthermore, the job manager 7101 stores job settings in the DIS 7102, and instructs the print manager 7104 to start the job.

Upon accepting the job, the print manager 7104 reads out information required to execute the job from the DIS 7102, and sets the readout information in the printer 9007 via the engine interface board 9003 and DPRAM.

Figure 68:
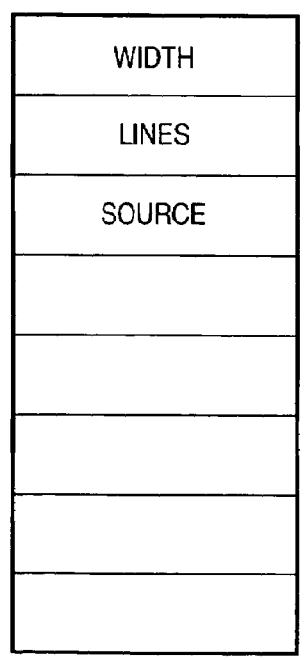
FIG. 68 is a view for explaining setting items of an engine interface board shown in FIG. 66.

FIG. 68 (to be described below) shows setting items of the engine interface board 9003, and FIG. 69 (to be described below) shows setting items, and control and states commands via the DPRAM.

FIG. 68 is a view for explaining the setting items of the engine interface board 9003 shown in FIG. 66, and the items include WIDTH, LINES, and SOURCE.

Figure 69:
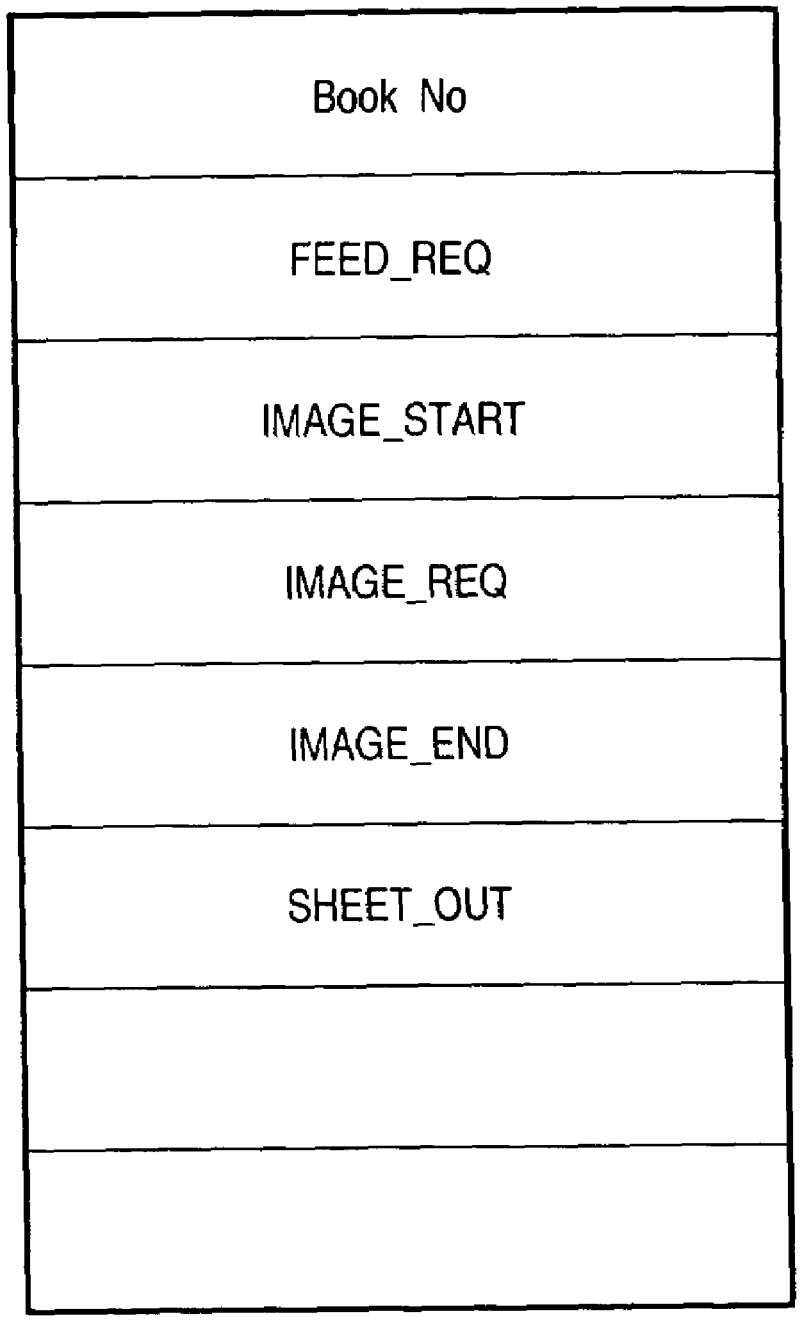
FIG. 69 is a view for explaining setting items and control and setting commands via a DPRRAM.

FIG. 69 is a view for explaining the setting items, and control and status commands via the DPRAM, and the items and commands include the number of sets of copies to be output (Book No), a paper feed request command (FEED_REQ) of an output paper sheet, an image data start message (IMAGE_START), an image data transfer request command (IMAGE_REQ), an image data end message (IMAGE_END), and an output paper exhaust end message (SHEET_OUT).

Note that this job is to print a set of two pages of non-compressed binary images having a letter size (11 inch×8.5 inch (215.9 mm×279.4 mm)), and the printer has a resolution of 600 dpi, for the sake of simplicity.

Upon receiving this job, the print manager 7104 computes the number of image bytes of the width (on the side of 8.5 (inch) in this case) by:

WIDTH=8.5×600÷8≈630 (Bytes)

The print manager then computes the number of lines by:

LINES=11×600=6600 (Lines)

The print manager sets these computed values and a SOURCE address where the received image for the first page is stored in WIDTH, LINES, and SOURCE shown in FIG. 68. At this time, the engine interface board 9003 is ready to output an image, but does not output any image data since it does not receive an HSYNC signal from the printer 9007 (but receives VCLK).

The print manager 7104 writes 1 as the number of sets of copies at a predetermined address (Book No) of the DPRAM shown in FIG. 69.

The print manager then issues a paper feed request command (FEED_REQ) of an output paper sheet for the first page, and waits for an image data transfer request command (IMAGE_REQ) from the printer 9007. Upon receiving IMAGE_REQ from the printer 9007, the print manager outputs an image data start message (IMAGE_START).

Upon receiving this message, the printer 9007 begins to output HSYNC, and the engine interface board 9003 which has been waiting for HSYNC outputs an image. The printer 9007 outputs an image data end message (IMAGE_END) upon detecting the trailing end of an output paper sheet, and outputs an output paper exhaust end message (SHEET_OUT) after the output paper sheet is exhausted.

Upon receiving IMAGE_END for the first page, the print manager 7104 sets WIDTH, LINES, and SOURCE for the second page in the engine interface board 9003, outputs FEED_REQ, and waits for IMAGE_REQ. The operation after IMAGE_REQ for the second page is received is the same as that for the first page.

[Detailed Description of Job Stop Process]

The process of the Job Manager 1519 (FIG. 12) as a job control unit when the user has pressed the STOP key during execution of a job will be explained below.

The Job Manager 1519 assures job management data required for job control for each job upon accepting a job, and holds various kinds of job information such as status, accept time, the number of sheets on which images are formed, and the like until the job is complete and is deleted.

FIG. 70 shows the format of job management data to be managed by the job manager (Job Manager) 1519.

As shown in FIG. 70, the Job Manager 1519 includes a job management table 201. The Job Manager 1519 assures a free entry from the job management table 201 upon receiving a job, and holds job data in the entry.

Reference numerals 202 and 203 denote the data format of an entry corresponding to each job, i.e., 202, data attributes; and 203, examples of values of the attributes.

Reference numeral 211 denotes a job ID which is identification information, which is automatically and uniquely assigned and appended to each job in the apparatus, and can specify the job. Reference numeral 212 denotes a job name which can be designated from the user but is not designated in the example shown in FIG. 70. Reference numeral 213 denotes a job type, which indicates, for example, copy (Copy), print (Print), facsimile (Fax), and the like. Reference numeral 214 denotes an ID of the user who input the job; and 215, a user name.

Reference numeral 216 denotes a job state which reflects the current job state. Reference numeral 217 denotes a time at which the job was accepted by the Job Manager 1519. Reference numeral 218 denotes a job execution time, which records the time elapsed after the process of the job started. Reference numeral 219 denotes job priority, which holds the process priority of the job. Reference numeral 220 denotes the number of sheets output in the job.

Reference numeral 221 denotes error information that holds information which pertains to an error that has occurred during the job process.

Note that an inquiry or manipulation associated with job information is made together with the job ID which is used to identify the job of interest, and the Job Manager 1519 specifies the job by searching the job IDs of respective entries in the job management table.

In addition to the job ID, the user can input arbitrary job information which is easier for him or her to identify using the full keyboard (FIG. 33) displayed on the LCD display 3001 of the console 3000 or a host computer (not shown) which is connected via the LAN 2011 or the like to allow a communication, and can append it to the job.

Furthermore, the process associated with the job manager (Job Manager) 1519 is executed by the CPU 2001 shown in FIG. 1 on the RAM 2002 on the basis of a program stored in the ROM 2003, HDD 2004, or another storage medium (not shown).

The first control process operation of the image processing apparatus of the present invention will be described below with reference to the flow chart in FIG. 71.

Figure 71:
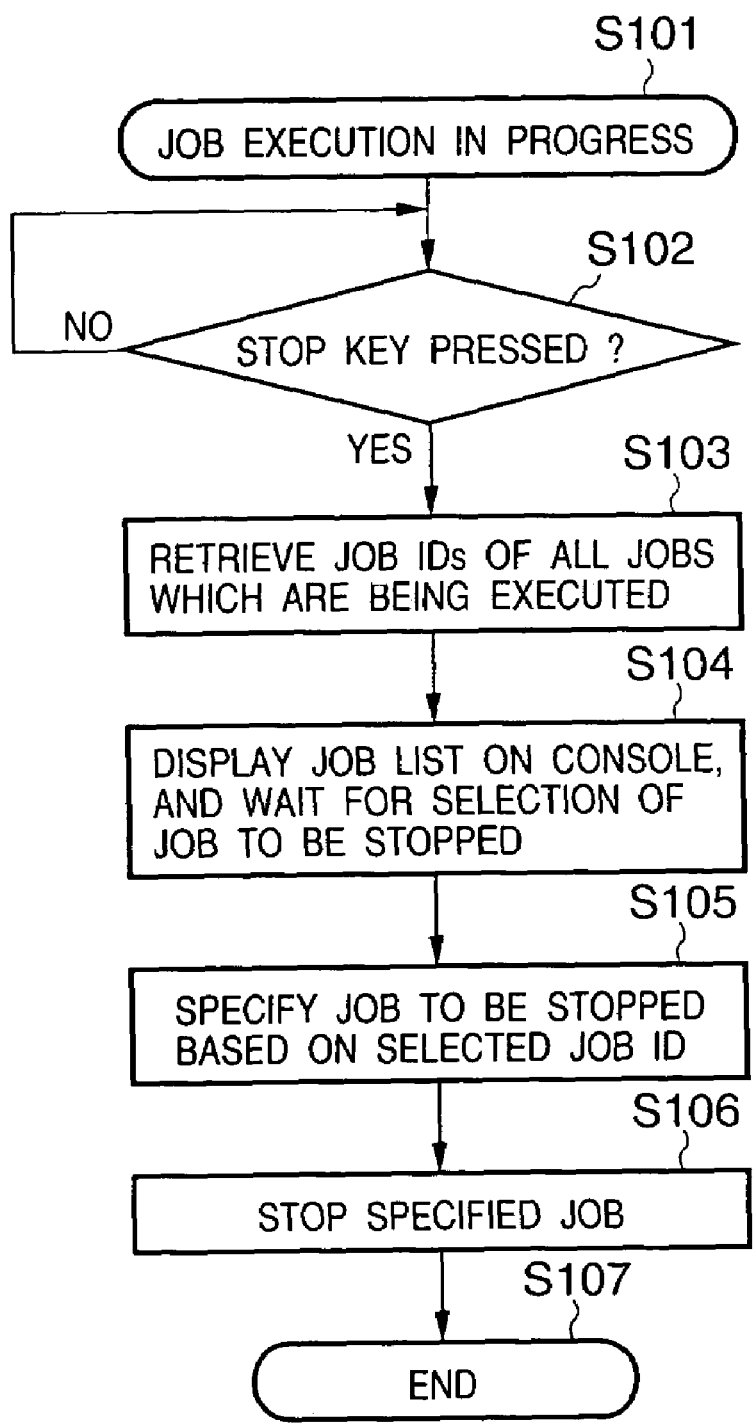
FIG. 71 is a flow chart showing the first control processing sequence of the image processing apparatus of the present invention.

FIG. 71 is a flow chart showing the first control process operation of the image processing apparatus of the present invention, and corresponds to a process when the user has pressed the STOP key 3003 shown in FIG. 3 during job execution. Note that this process is executed by the CPU 2001 shown in FIG. 1 on the RAM 2002 on the basis of a program stored in the ROM 2003, HDD 2004, or another storage medium (not shown). Also, S101 to S107 indicate steps.

If the user has pressed the STOP key 3003 during job execution (S101), the console 3000 detects this operation, and a message indicating this is sent from the console that has detected depression of the STOP key 3003 to the Job Manager 1519 (S102).

In step S103, the Job Manager 1519 searches the Job management table 201 to acquire job IDs from entries of all jobs which are being executed. In step S104, the Job Manager 1519 displays a list of jobs to be stopped on the LCD display 3001 of the console 3000 like a stop job select window 301 shown in FIG. 72 (to be described later), and waits until the user selects a job to be stopped.

The user selects a job he or she wants to stop from jobs 302, 303, 304, and 305 to be stopped displayed on the stop job select window 301 shown in FIG. 72, which waits for user's input, and determines the selected job by an OK key 306. Note that the contents of the job list displayed in this case may include arbitrary job information which is appended by the user and is easier for him or her to identify in addition to the job ID used in the job control unit of the apparatus, as shown in FIG. 72.

The job ID selected and determined on the console 3000 is sent to the Job Manager 1519, which specifies the designated job to be stopped on the basis of the job ID in step S105, and instructs the Document Manager that controls operations associated with the job to stop operation in step S106.

In step S106, the Job Manager 1519 itself executes a stop process of that job, and sends a message indicating that the job is stopped to the console 3000. The console 3000 makes display like a message window shown in FIG. 73 (to be described later) to inform the user that the designated job is stopped. In this manner, the stop process of the designated job is completed, and the processing ends in step S107.

During the processes in steps S101 to S107, jobs which are being executed other than the job that has undergone the stop process are not stopped, and can proceed with their processes. Hence, even when a plurality of jobs are being executed, only a job the user wants to stop is stopped.

FIG. 72 shows an example of the stop job select window 301 displayed on the LCD display 3001 of the console 3000 shown in FIG. 3, and this window corresponds to an input wait window that displays a list of jobs to be stopped.

In FIG. 72, reference numeral 301 denotes a stop job select window, which is an input wait window that displays a list of jobs to be stopped. Reference numerals 302 to 305 denote jobs to be stopped, from which the user selects a job he or she wants to stop. The user may select a job either by directly touching the LCD display 3001 with his or her finger or by clicking an up or down button. Reference numeral 306 denotes an OK key. Upon clicking this key, the user determines to stop a job selected from the jobs 302 to 305 to be stopped.

FIG. 73 shows an example of the message window which is displayed on the LCD 3001 of the console 3000 shown in FIG. 3 and informs that the job is stopped. The window shown in FIG. 73 corresponds to a case wherein "Copy Job 003", i.e., the job 305 to be stopped, is selected and the job manager 1519 controls to stop that job.

As described above, according to the first embodiment, the apparatus comprises job control means which can accept and parallelly execute a plurality of jobs, means for automatically appending, to an input job, identification information that can specify the job in the apparatus, display means that can display job information of the apparatus, job select means which allows the user to manually select a job, and job stop instruction means which can instruct the apparatus to stop a job during job execution.

With this arrangement, the appending means appends, to an input job, identification information that can specify each job, and when the instruction means instructs to stop a job during job execution, the display select means displays a list of all jobs which are being executed, and the control means controls to stop only the selected job. Hence, only a specific job the user wants to stop can be stopped.

Since the user can append arbitrary identification information to a job, a list of jobs which is easier for the user to understand can be displayed, thus further improving operability.

[Second Embodiment]

In the first embodiment, when the user inputs a job stop instruction, a list of all jobs which are being executed is displayed on the console 3000, the user selects a job he or she wants to stop, and only the selected job is stopped. Alternatively, when the user inputs a job stop instruction, a list of all jobs may be displayed on the console 3000 after all the jobs which are being executed are temporarily stopped, and only a job selected from the list may be stopped. That embodiment will be explained below.

[Detailed Description of Process Upon Stopping Job]

The process of the Job Manager 1519 (FIG. 12) as a job control unit when the user has pressed the STOP key during job execution will be described below.

As in the first embodiment, the Job Manager 1519 assures job management data required for job control for each job upon accepting a job, and holds various kinds of job information such as status, accept time, the number of sheets on which images are formed, and the like until the job is complete and is deleted.

The second control process operation of the image processing apparatus of the present invention will be described below with reference to the flow chart shown in FIG. 74.

Figure 74:
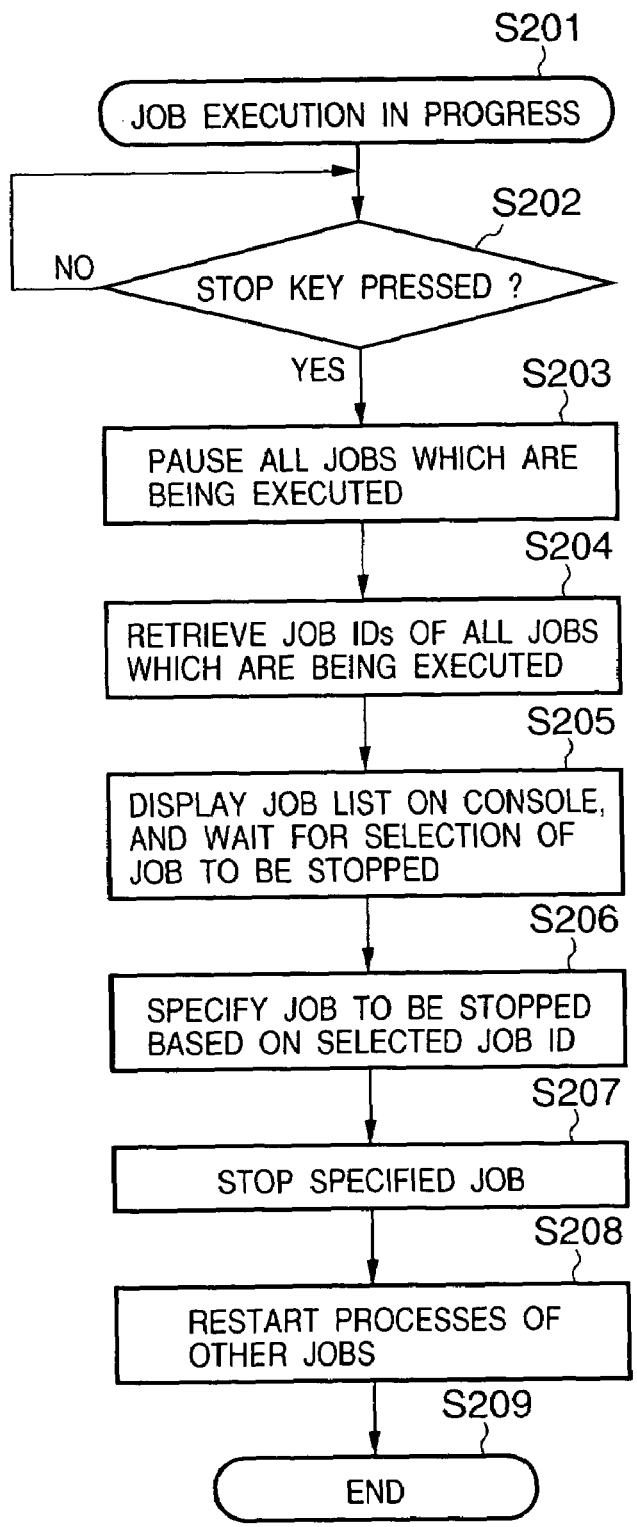
FIG. 74 is a flow chart showing the second control processing sequence of the image processing apparatus of the present invention.

FIG. 74 is a flow chart showing the second control process operation of the image processing apparatus of the present invention, and corresponds to a process when the user has pressed the STOP key 3003 shown in FIG. 3 during job execution. Note that this process is executed by the CPU 2001 shown in FIG. 1 on the RAM 2002 on the basis of a program stored in the ROM 2003, HDD 2004, or another storage medium (not shown). Also, S201 to S209 indicate steps.

If the user has pressed the STOP key 3003 during job execution (S201), the console 3000 detects this operation, and a message indicating this is sent from the console that has detected depression of the STOP key 3003 to the Job Manager 1519 (S202).

In step S203, the Job Manager 1519 searches the job management table 201 and pauses the processes of all jobs which are being executed. The Job Manager 1519 acquires the job IDs of all jobs which are being executed in step S204, displays a list of jobs to be stopped on the LCD display 3001 of the console 3000 like the stop job select window 301 shown in FIG. 72, and waits until the user selects a job to be stopped in step S205.

The user selects a job he or she wants to stop from the jobs 302, 303, 304, and 305 to be stopped displayed on the stop job select window 301 shown in FIG. 72, which waits for user's input, and determines the selected job by the OK key 306. Note that the contents of the job list displayed in this case may include arbitrary job information which is appended by the user and is easier for him or her to identify in addition to the job ID used in the job control unit of the apparatus, as shown in FIG. 72.

The job ID selected and determined on the console 3000 is sent to the Job Manager 1519, which specifies the designated job to be stopped on the basis of the job ID in step S206, and instructs the Document Manager (scanner manager, print manager, or the like) that controls operations associated with the job to stop operation in step S207. Also, the Job Manager 1519 itself executes a stop process of that job, and sends a message indicating that the job is stopped to the console 3000. The console 3000 makes display like the message window shown in FIG. 73 to inform the-user that the designated job is stopped. In this manner, the stop process of the designated job is completed.

The processes of other paused jobs restart in step S208, and the processing ends in step S209.

During the processes in steps S201 to S209, jobs which are being executed other than the job that has undergone the stop process are not stopped, and can proceed with their processes. Hence, even when a plurality of jobs are being executed, only a job the user wants to stop is stopped.

As described above, according to the second embodiment, the apparatus comprises job control means which can accept and parallelly execute a plurality of jobs, means for automatically appending, to an input job, identification information that can specify the job in the apparatus, display means that can display job information of the apparatus, job select means which allows the user to manually select a job, and job stop instruction means which can instruct the apparatus to stop a job during job execution.

With this arrangement, the appending means appends, to an input job, identification information that can specify each job, and when the instruction means instructs to stop a job during job execution, the control means pauses all jobs which are being executed, controls the display-select means to display a list of all the paused jobs, stops only the selected job, and restarts non-selected jobs. Hence, a specific job the user wants to stop can be stopped at the earliest possible timing, and an unwanted process can be prevented from being executed while the user instructs to stop a given job.

For this reason, since a specific job the user wants to stop can be stopped at the earliest possible timing, and other jobs can automatically restart, the operability for the user can be improved.

Since the user can append arbitrary identification information to a job, a list of jobs which is easier for the user to understand can be displayed, thus further improving operability.

[Third Embodiment]

In the first and second embodiments, when the user inputs a job stop instruction, a list of all jobs which are being executed is displayed on the console 3000, the user selects a job he or she wants to stop, and only the selected job is stopped. Alternatively, when the user inputs a job stop instruction, if only one job is being executed, that job may be stopped unconditionally. That embodiment will be explained below.

[Detailed Description of Process Upon Stopping Job]

The process of the Job Manager 1519 (FIG. 12) as a job control unit when the user has pressed the STOP key during job execution will be described below.

As in the first and second embodiments, the Job Manager 1519 assures job management data required for job control for each job upon accepting a job, and holds various kinds of job information such as status, accept time, the number of sheets on which images are formed, and the like until the job is complete and is deleted.

The third control process operation of the image processing apparatus of the present invention will be described below with reference to the flow chart shown in FIG. 75.

Figure 75:
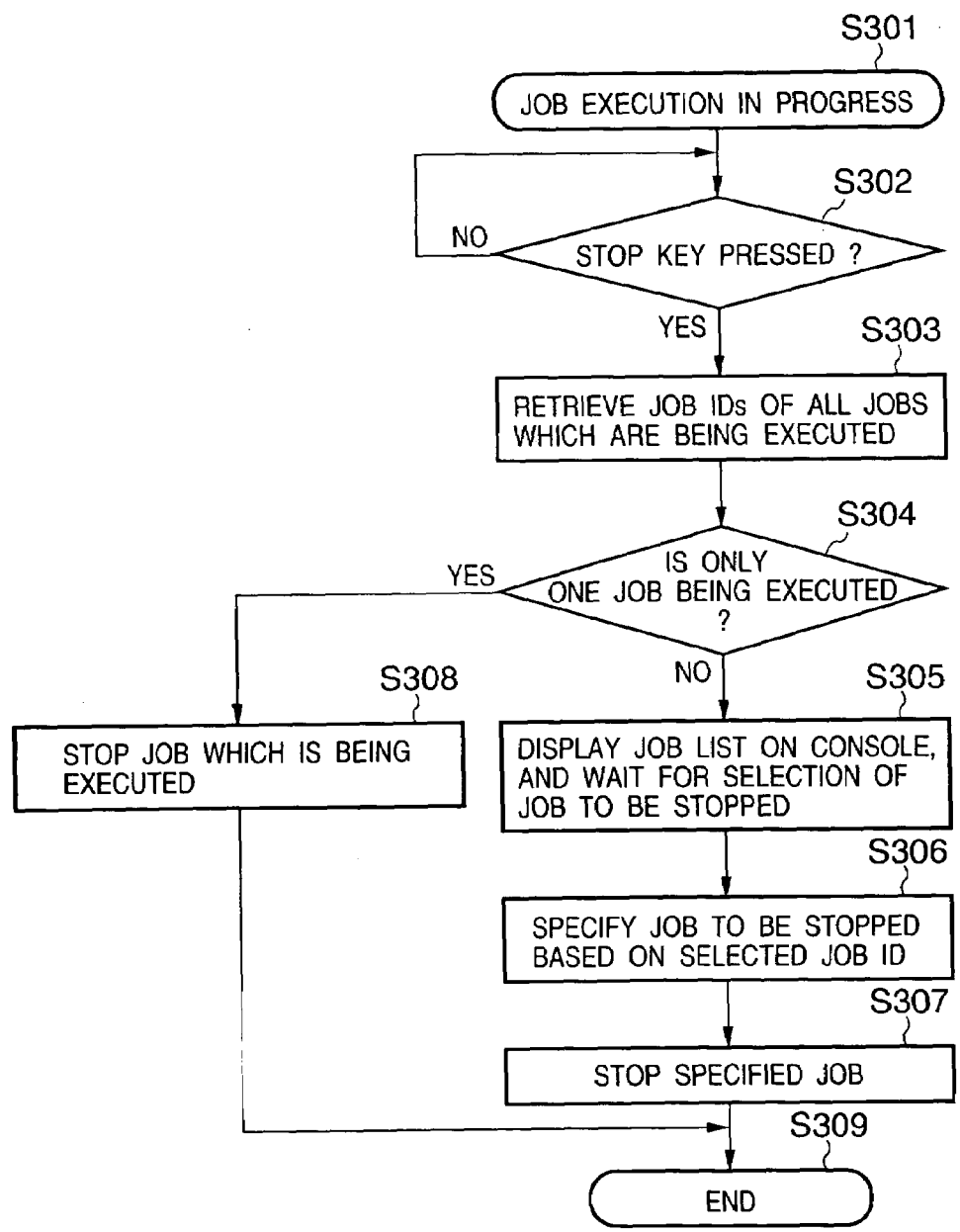
FIG. 75 is a flow chart showing the third control processing sequence of the image processing apparatus of the present invention.

FIG. 75 is a flow chart showing the third control process operation of the image processing apparatus of the present invention, and corresponds to a process when the user has pressed the STOP key 3003 shown in FIG. 3 during job execution. Note that this process is executed by the CPU 2001 shown in FIG. 1 on the RAM 2002 on the basis of a program stored in the ROM 2003, HDD 2004, or another storage medium (not shown). Also, S301 to S309 indicate steps.

If the user has pressed the STOP key 3003 during job execution (S301), the console 3000 detects this operation, and a message indicating this is sent from the console that has detected depression of the STOP key 3003 to the Job Manager 1519 (S302).

In step S303, the Job Manager 1519 searches the Job management table 201 to acquire job IDs from entries of all jobs which are being executed. It is checked in step S304 if a plurality of jobs to be stopped are being executed. If it is determined that only one job is being executed, since a job to be stopped need not be selected, the Job Manager 1519 immediately executes a stop process of that job in step S308. In this way, the stop process of the job is completed, and the processing ends in step S309.

On the other hand, if it is determined in step S304 that a plurality of jobs are being executed, the Job Manager 1519 displays a list of jobs to be stopped on the LCD display 3001 of the console 3000 like the stop job select window 301 shown in FIG. 72, and waits until the user selects a job to be stopped in step S305.

The user selects a job he or she wants to stop from the jobs 302, 303, 304, and 305 to be stopped displayed on the stop job select window 301 shown in FIG. 72, which waits for user's input, and determines the selected job by the OK key 306. Note that the contents of the job list displayed in this case may include arbitrary job information which is appended by the user and is easier for him or her to identify in addition to the job ID used in the job control unit of the apparatus, as shown in FIG. 72.

The job ID selected and determined on the console 3000 is sent to the Job Manager 1519, which specifies the designated job to be stopped on the basis of the job ID in step S306, and instructs the Document Manager that controls operations associated with the job to stop operation in step S307. Also, the Job Manager 1519 itself executes a stop process of that job, and sends a message indicating that the job is stopped to the console 3000. The console 3000 makes display like the message window shown in FIG. 73 to inform the user that the designated job is stopped. In this manner, the stop process of the designated job is completed, and the processing ends in step S309.

During the processes in steps S301 to S309, jobs which are being executed other than the job that has undergone the stop process are not stopped, and can proceed with their processes. Hence, even when a plurality of jobs are being executed, only a job the user wants to stop is stopped.

If only one job is being executed, the job to be stopped need not be designated, and the job can be stopped without user's selection.

As described above, according to the third embodiment, the apparatus comprises job control means which can accept and parallelly execute a plurality of jobs, means for automatically appending, to an input job, identification information that can specify the job in the apparatus, display means that can display job information of the apparatus, job select means which allows the user to manually select a job, and job stop instruction means which can instruct the apparatus to stop a job during job execution. With this arrangement, the appending means appends, to an input job, identification information that can specify each job, and when the instruction means instructs to stop a job during job execution, the control means stops that job if only one job is being executed. If a plurality of jobs are being executed, the control means controls the display select means to display a list of all jobs which are being executed, and controls to stop only the selected job. Hence, only a specific job the user wants to stop can be stopped. Especially, when only job is being executed, the job can be immediately stopped without forcing the user to make cumbersome operation, i.e., select that job, thus improving operability.

Furthermore, since the appending means can append arbitrary job information to an input job in addition to the identification information that can specify each job, the user can select only a specific job he or she wants to stop using the name he or she easily understands, and the selected job can be easily stopped.

If only one job is being executed, the job is immediately stopped without making the user select that job, thus avoiding complicated operations.

[Fourth Embodiment]

Figure 77:
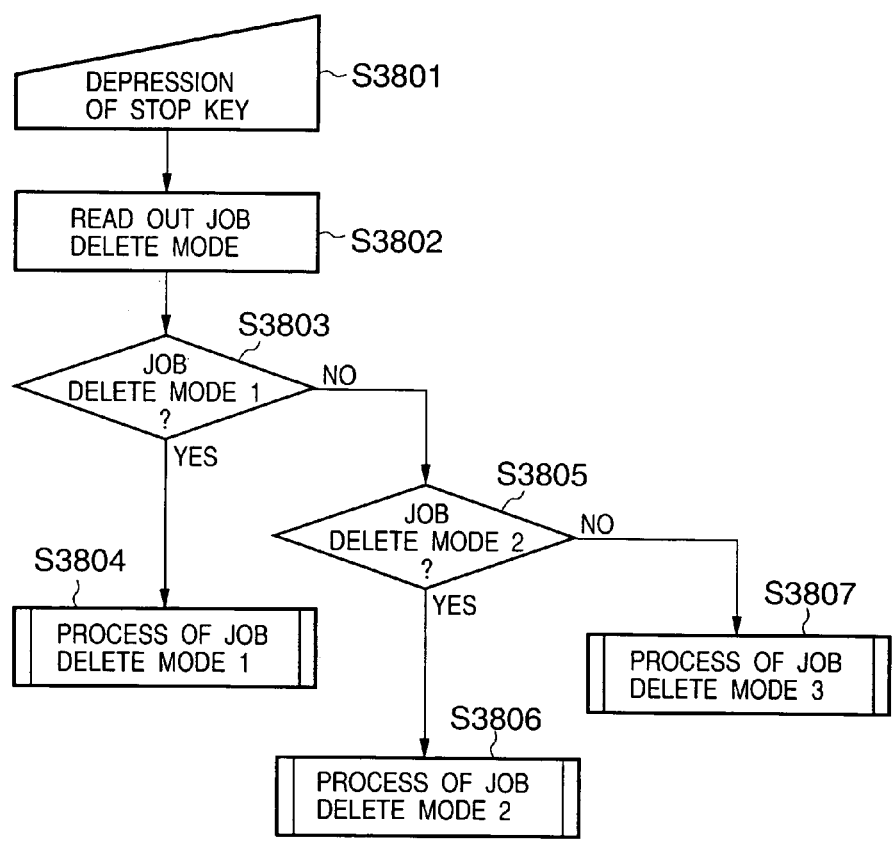
FIG. 77 is a flow chart showing processing upon depression of a stop key in a digital hybrid machine of the fourth embodiment.

In the fourth embodiment, the arrangement of the apparatus itself is the same as that in the first embodiment. The processing sequence upon pressing the stop key is different from the first embodiment. FIG. 77 is a flow chart showing the processing upon pressing the stop key. In the fourth embodiment, since a plurality of job delete modes are prepared, one of a plurality of functions to be preferentially deleted by the stop key can be set.

Referring to FIG. 77, if the stop key has been pressed (step S3801), the CPU 2001 reads out a job delete mode stored in the HDD 2004 as a job delete mode storage means (step S3802). The CPU 2001 checks if the readout job delete mode is job delete mode 1 (step S3803). If YES in step S3803, the control enters the process of job delete mode 1. If NO in step S3803, the CPU 2001 checks if the readout job delete mode is job delete mode 2 (step S3805). If YES in step S3805, the control enters the process of job delete mode 2. If NO in step S3805, the control enters the process of job delete mode 3 (step S3807). Note that the job delete mode is input in advance by the user using the ten-key pad on the console 3000. Alternatively, the job delete mode may be set by supplying parameters from another information processing apparatus connected via the network to the digital copying machine.

Details of the individual job delete modes will be described below using flow charts.

<Job Delete Mode 1>

Figure 78:
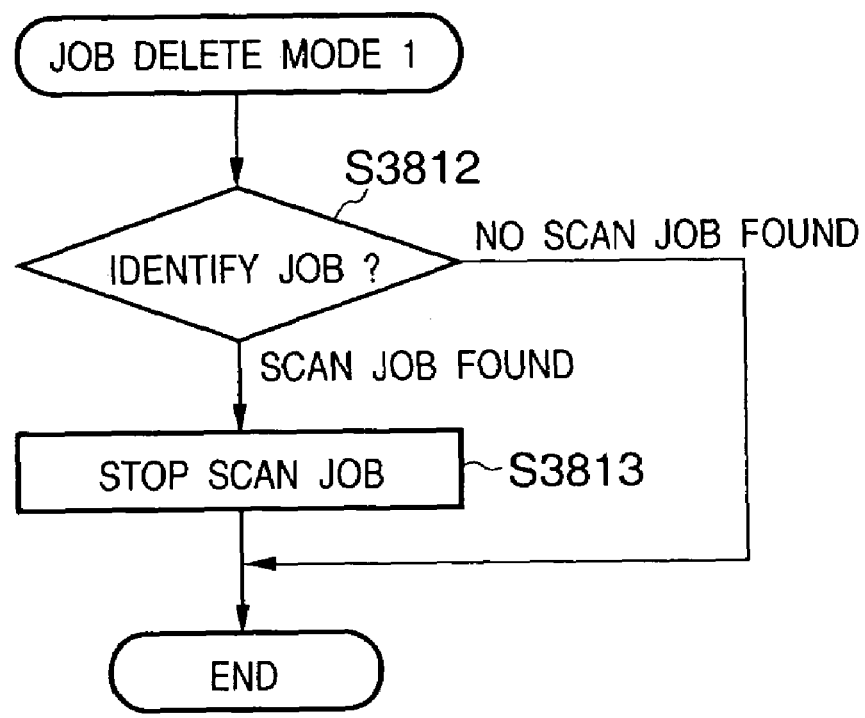
FIG. 78 is a flow chart showing processing upon depression of the stop key in the digital hybrid machine of the fourth embodiment.

If the process of job delete mode 1 starts upon depression of the stop key, the CPU 2001 checks the presence/absence of a scan job in step S3812 in FIG. 78. If a scan job is present, the CPU 2001 requests the Controller to stop a scan operation, thus stopping the scan operation. If no scan job is present, the stop process is disabled, and does not influence operations of other jobs, e.g., a print job or another communication jobs if they are present.

A job to be identified by a job identification unit is managed by the Job Manager 7101 shown in FIG. 61.

<Job Delete Mode 2>

Figure 79:
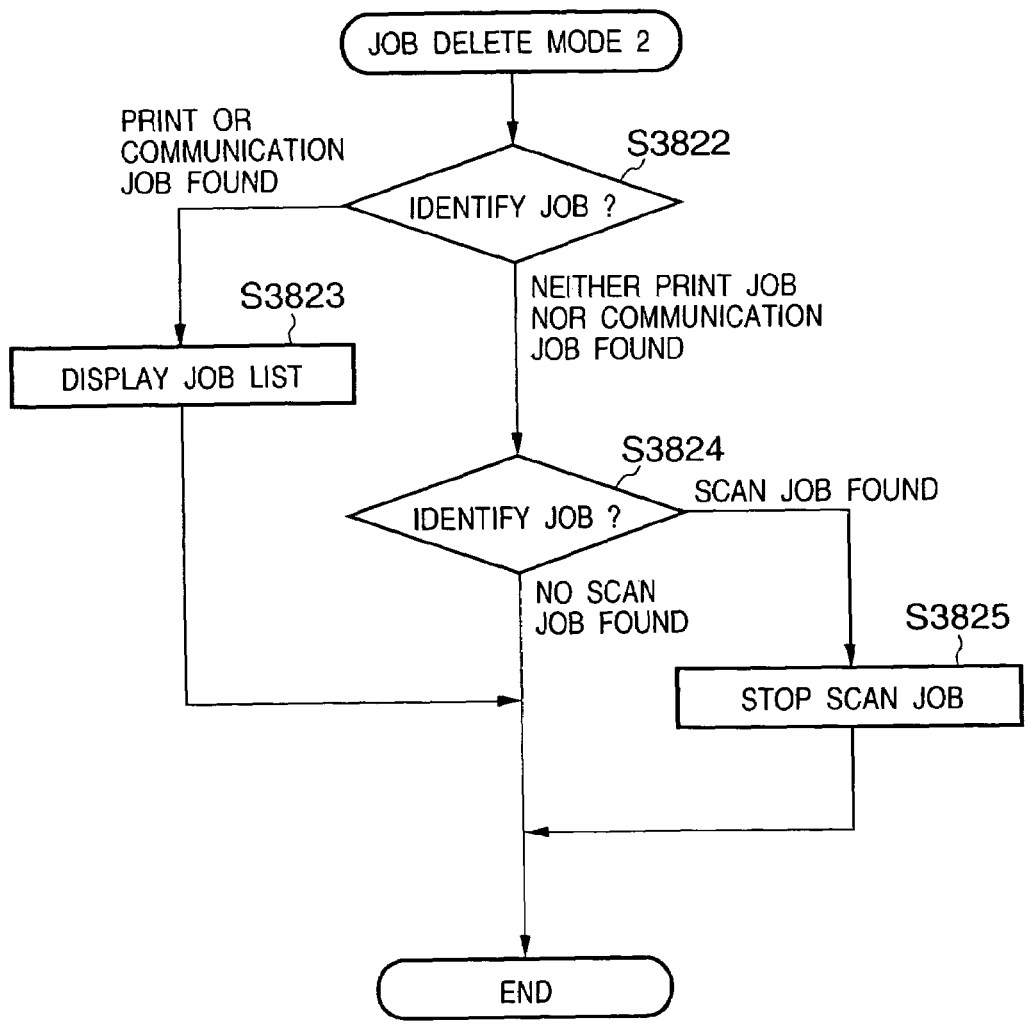
FIG. 79 is a flow chart showing processing upon depression of the stop key in the digital hybrid machine of the fourth embodiment.

If the process of job delete mode 2 starts upon depression of the stop key, the CPU 2001 checks the presence/absence of a print job in step S3822 in FIG. 79. If a print job or another communication job is present, a job list shown in FIG. 81 is displayed on the LCD display 3001 of the console shown in FIG. 3.

The operator can select one or more arbitrary jobs from the job list, and the CPU 2001 requests the Controller to stop one or more selected jobs. A job which is currently being executed is stopped, and a held or paused job is deleted. More specifically, the process shown in FIG. 71, 74, or 75 is executed in step S3823.

On the other hand, if it is determined in step S3822 that neither a print job nor another communication job is present, the CPU 2001 checks the presence/absence of a scan job in step S3824. If a scan job is present, the CPU 2001 requests the Controller to delete that scan job, thus stopping the scan operation.

Furthermore, if it is determined in step S3824 that no scan job is found, the operation of the stop key is disabled.

<Job Delete Mode 3>

Figure 80:
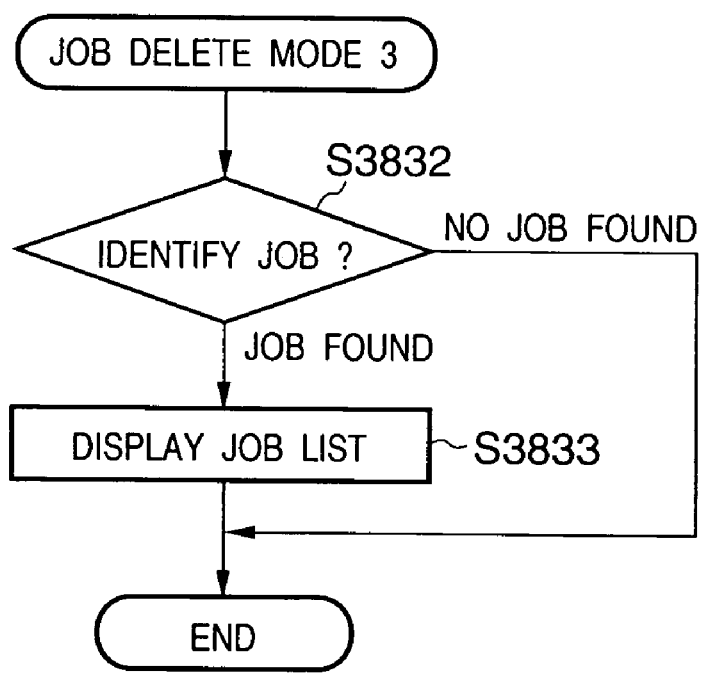
FIG. 80 is a flow chart showing processing upon depression of the stop key in the digital hybrid machine of the fourth embodiment.

If the process of job delete mode 2 starts upon depression of the stop key, the CPU 2001 checks the presence/absence of jobs in step S3832 in FIG. 80. If jobs are found, the job list in FIG. 81 is displayed. Note that the jobs in-this case include all jobs, i.e., a print job, scan job, and other communication jobs. More specifically, the process shown in FIG. 71, 74, or 75 is executed in step S3833.

The operation on the job list can be the same as that described above.

On the other hand, if it is determined in step S3832 that no jobs are found, the operation of the stop key is disabled.

In this manner, the delete mode is set in advance, and three different processes:

(1) stop a scan job if it is found, (2) display a list of print or communication jobs if they are found, and make the user select a job to be stopped from the list; or stop a scan job if the scan job alone is found, and (3) display a list of jobs, and make the user select a job to be deleted, can be selectively executed in correspondence with the set delete mode. For this reason, the stop key can be used to instruct standardized delete operation for a job or as a key for stopping a scan job like in the first embodiment. Furthermore, a scan job can be stopped if it is found, and if other jobs are found, a job to be deleted can be selected. In this manner, flexible key assignment can be made in accordance with user's convenience, and the operability can be improved.

The functions shown in the flow charts in FIGS. 71, 74, 75, and 77 to 80 in the first to fourth embodiments may be executed by a host computer on the basis of an externally installed program. In this case, the present invention is applied to a case wherein an information group including the program is supplied from a storage medium such as a CD-ROM, flash memory, FD, or the like or from an external storage medium via a network to an output apparatus.

The configuration of data processing programs which can be read out by the image processing apparatus according to the present invention will be described below with reference to a memory map shown in FIG. 76.

FIG. 76 is a view for explaining the memory map of a storage medium that stores various data processing programs which can be read out by the image processing apparatus according to the present invention.

Note that the storage medium may also store information for managing stored program groups (e.g., version information, creator, and the like), and information depending on the OS or the like as the program read side, e.g., icons used to identifiably display programs, although not shown in FIG. 76.

Furthermore, data that belong to various programs are managed in directories shown in FIG. 76. When a program or data to be installed is compressed, a decompression program may also be stored.

As described above, the objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements novel functions of the present invention, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, EEPROM, silicon disk, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention can be applied to either a system constituted by a plurality of devices or an apparatus consisting of a single apparatus. Also, the present invention can be applied to a case wherein the invention is achieved by supplying a program to the system or apparatus. In this case, when a storage medium that stores a program expressed by software for achieving the present invention is loaded into the system or apparatus, that system or apparatus can enjoy the effects of the present invention.

Furthermore, when the program expressed by software for achieving the present invention is downloaded from a database on the network via a communication program and is loaded, the system or apparatus enjoy the effects of the present invention.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   a setting unit that sets one of a plurality of modes according to a user's designation, said modes including a first mode that stops an active job without displaying a list of active jobs in accordance with a designation input to stop an operation in progress, and a second mode that displays a list of active jobs and stops a job selected by the user from the list in accordance with a designation input to stop an operation in progress;
   a determination unit that determines a mode set by said setting unit in accordance with a designation input to stop an operation in progress; and
   a control unit that causes active-job stop processing or list display processing based on a determination by said determination unit.

2. The apparatus according to claim 1, wherein said control unit stops a scanning job in a case where a set mode is the first mode.

3. The apparatus according to claim 1, further comprising a display unit that displays a list of jobs.

4. The apparatus according to claim 3, wherein said display unit displays a list of jobs in a case where a set mode is the second mode and there is a print job or a communication-related job, and
   said control unit stops a job selected from the list displayed by said display unit in a case where a set mode is the second mode and there is a print job or a communication-related job, and stops a scanning job in a case where a set mode is the second mode and there is no print job or no communication-related job.

5. The apparatus according to claim 3, wherein said display unit displays a list of jobs in a case where a set mode is the second mode and there is a job existing in said image processing apparatus, and
   said control unit deletes or stops a job selected from the list displayed by said display unit in a case where a set mode is the second mode and there is a job existing in said image processing apparatus.

6. An image processing method comprising the steps of:
   setting one of a plurality of modes according to a user's designation, said modes including a first mode that stops an active job without displaying a list of active jobs in accordance with a designation input to stop an operation in progress, and a second mode that displays a list of active jobs and stops a job selected by a user from the list in accordance with a designation input to stop an operation in progress;
   determining a mode set in said setting step in accordance with a designation input to stop an operation in progress; and
   causing active-job stop processing or list display processing based on a determination made in said determining step.

7. The method according to claim 6, wherein a scanning job is stopped in said control step in a case where a set mode is the first mode.

8. The method according to claim 6, further comprising the step of displaying a list of jobs.

9. The method according to claim 8, wherein in said displaying step, a list of jobs is displayed in a case where a set mode is the second mode and there is a print job or a communication-related job, and in said control step, a job selected from the list displayed in said displaying step is stopped in a case where a set mode is the second mode and there is a print job or a communication-related job, and a scanning job is stopped in a case where a set mode is the second mode and there is no print job or no communication-related job.

10. The method according to claim 9, wherein in said displaying step, a list of jobs is displayed in a case where a set mode is the second mode and there is a job existing in an image processing apparatus, and in said control step, a job selected from the list displayed in said displaying step is deleted or stopped in a case where a set mode is the second mode and there is a job existing in the image processing apparatus.

11. A computer program embodied in a computer-readable storage medium, said program causing a computer to execute the steps of:

setting one of a plurality of modes according to user's designation, said modes including a first mode that stops an active job without displaying a list of active jobs in accordance with a designation input to stop an operation in progress, and a second mode that displays a list of active jobs and stops a job selected by a user from the list in accordance with a designation input to stop an operation in progress;

determining a mode set in said setting step in accordance with a designation input to stop an operation in progress; and active-job stop processing or list display processing based on a determination made in said determining step.

* * * * *

UNITED STATES PATENT AND TRADEMARK OFFICE
CERTIFICATE OF CORRECTION

| | | |
|---|---|---|
| PATENT NO. | : 7,031,003 B2 | Page 1 of 1 |
| APPLICATION NO. | : 09/742414 | |
| DATED | : April 18, 2006 | |
| INVENTOR(S) | : Yuka Nagai et al. | |

It is certified that error appears in the above-identified patent and that said Letters Patent is hereby corrected as shown below:

COLUMN 29:

Line 27, "states" should read --status--.

COLUMN 33:

Line 27, "the-user" should read --the user--.

COLUMN 36:

Line 40, "in-this" should read --in this--.

Signed and Sealed this

Fifth Day of June, 2007

JON W. DUDAS
*Director of the United States Patent and Trademark Office*